(12) United States Patent
Waldron et al.

(10) Patent No.: US 8,361,171 B2
(45) Date of Patent: Jan. 29, 2013

(54) METHOD AND KIT

(75) Inventors: Keith Waldron, Norwich (GB);
Timothy Brocklehurst, Norwich (GB)

(73) Assignee: Institute of Food Research, Norwich (GB)

(*) Notice: Subject to any disclaimer, the term of this patent is extended or adjusted under 35 U.S.C. 154(b) by 668 days.

(21) Appl. No.: 12/522,501

(22) PCT Filed: Jan. 9, 2008

(86) PCT No.: PCT/GB2008/000044
§ 371 (c)(1),
(2), (4) Date: Jul. 15, 2009

(87) PCT Pub. No.: WO2008/084210
PCT Pub. Date: Jul. 17, 2008

(65) Prior Publication Data
US 2010/0071428 A1 Mar. 25, 2010

(30) Foreign Application Priority Data
Jan. 9, 2007 (GB) .................................. 0700302.3

(51) Int. Cl.
*C10L 1/00* (2006.01)
*C10L 5/42* (2006.01)
*C10L 5/44* (2006.01)
*C05F 11/08* (2006.01)

(52) U.S. Cl. .................... 44/307; 44/605; 44/628; 71/8; 71/9; 71/10

(58) Field of Classification Search ................ 71/8–10; 44/307, 605, 628
See application file for complete search history.

(56) References Cited

U.S. PATENT DOCUMENTS

| 4,337,077 | A | * | 6/1982 | Rutherford | 71/9 |
| 4,767,440 | A | * | 8/1988 | Salac | 71/23 |
| 5,337,898 | A | * | 8/1994 | Hamelers et al. | 209/10 |
| 5,501,718 | A | * | 3/1996 | Bandurski | 71/9 |
| 5,542,962 | A | * | 8/1996 | Ollerenshaw et al. | 71/10 |
| 6,245,121 | B1 | * | 6/2001 | Lamy et al. | 71/1 |
| 2011/0030431 | A1 | * | 2/2011 | Peltier et al. | 71/12 |

FOREIGN PATENT DOCUMENTS

| DE | 36 37 393 | 8/1987 |
| DE | 40 41 329 | 6/1992 |

(Continued)

OTHER PUBLICATIONS

Bailey, et al., "Interlaboratory testing of methods for assay of xylanase activity," *J Biotechnol.*, 23:257-270 (1992).

(Continued)

*Primary Examiner* — Wayne A. Langel
(74) *Attorney, Agent, or Firm* — Rodney J. Fuller; Booth Udall Fuller, PLC

(57) ABSTRACT

The present invention relates to a method for producing a plant growth medium comprising the following steps: a) providing an amount of bioorganic matter; b) contacting the bioorganic matter with one or more microbial agents capable of degrading the bioorganic matter to produce a decomposition product; and c) treating the decomposition product produced in step (b) to inhibit the degradation process prior to its completion. The invention further provides a bioreactor and a kit for performing that method, and a plant growth medium. In an embodiment, the plant growth medium is a peat-substitute material.

57 Claims, 45 Drawing Sheets

FOREIGN PATENT DOCUMENTS

Figure 1:
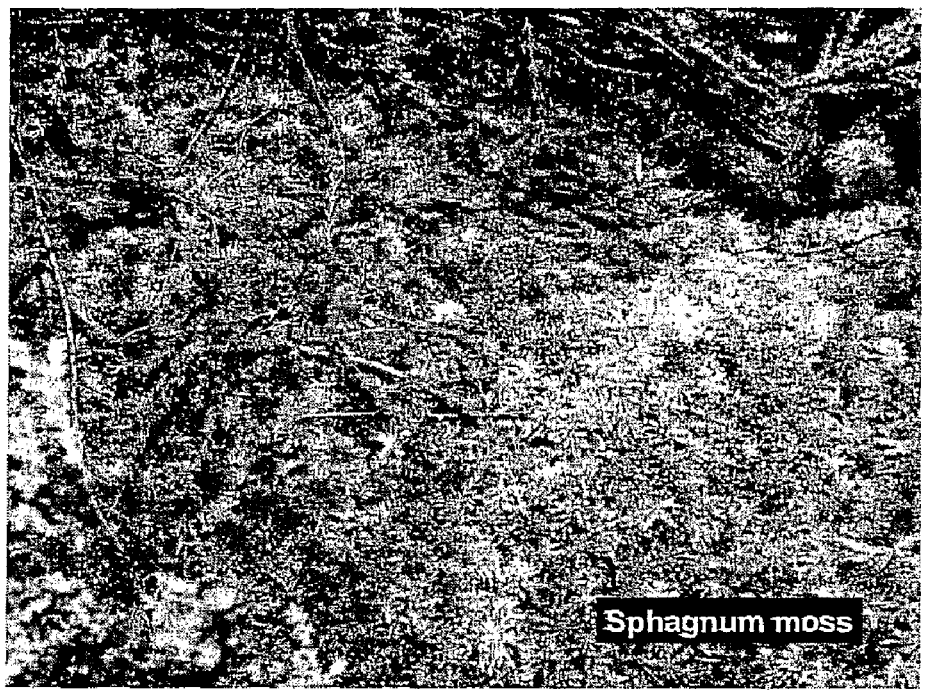

| | | |
|---|---|---|
| DE | 10 2004 003 038 A | 8/2005 |
| EP | 1 557 403 | 7/2005 |
| FR | 2 639 344 | 5/1990 |
| FR | 2 653 688 | 5/1991 |
| FR | 2 668 768 | 5/1992 |
| JP | 2000 239085 | 9/2000 |
| WO | WO/91/14358 | 10/1991 |
| WO | WO/03/004442 | 1/2003 |

OTHER PUBLICATIONS

Blakeney, et al., "A Simple and Rapid Preparation of Alditol Acetates for Monosaccharide Analysis," *Carbohydrate Res.*, 113:291-299 (1983).

Bragg, et al., "Interpretation and Advisory Applications of Compost Air-Filled Porosity (AFP) Measurements," *Acta Horticulturae*, 221:35-44 (1988).

Bragg, N. et al., "The Development of Sustainable Growing Media Components from Composted Specific Bio-Waste Streams," *Combined Proceedings International Plant Propagators' Soc.*, 55:256-258 (2005).

Briscoe, et al., "The Role of Interface Friction in the Compaction of Maize," *Tribology in Particulate Technology*, ed. Briscoe & Adams, pp. 220-233 (1987).

Chirife et al., "Some Features of the Parameter κ of the GAB Equation as Applied to Sorption Isotherms of Selected Food Materials," *J Food Eng.*, 15:75-82 (1992).

Das et al., "Moisture Effect on Compaction and Permeability in Composts," *J Environ Eng.*, 123:275-281 (1997).

Georget, et al., "A study of the effects of water content on the compaction behaviour of breakfast cereal flakes," *Powder Technol.*, 81:189-195 (1994).

Hartley, et al., "Monomeric and Dimeric Phenolic Acids Released from Cell Walls of Grasses by Sequential Treatment with Sodium Hydroxide," *J Sci Food Agric.*, 55:365-375 (1991).

Heckel, R.W., "An Analysis of Powder Compaction Phenomena," *Trans A.I.M.E.*, 221:1001-1008 (1961).

Martin-Cabrejas, et al., "Effect of Germination on the Carbohydrate Composition of the Dietary Fiber of Peas (*Pisum sativum* L.)," *J Agric Food Chem.*, 51:1254-1259 (2003).

Moates, et al., "The effect of chain length and solvent interactions on the dissolution of the B-type crystalline polymorph of amylose in water," *Carbohydrate Res.*, 298:327-333.

Ng, et al., "Physicochemical Characteristics of Onion (*Allium cepa* L.) Tissues," *J Agric Food Chem.*, 48:5612-5617 (2000).

Ollett, et al., "A comparative study of the effects of water content on the compaction behaviour of some food materials," *Powder Technol.*, 75:59-65 (1993).

Parker et al., "Texture of Chinese Water Chestnut: Involvement of Cell Wall Phenolics," *J Sci Food Agric.*, 68:337-346 (1995).

Paronen et al., "Compressional characteristics of four starches," *J Pharm Pharmacol.*, 35:627-635 (1983).

Pefferkorn, E., "Structure and stability of natural organic matter/soil complexes and related synthetic and mixed analogues," *Adv Colloid & Interface Sci.*, 73:127-200 (1997).

Rodriguez-Arcos, et al., "Ferulic Acid Crosslinks in Asparagus Cell Walls in Relation to Texture," *J Agric Food Chem.*, 52:4740-4750 (2004).

Theander et al., "Studies on Dietary Fiber. 3. Improved Procedures for Analysis of Dietary Fiber," *J Agric Food Chem.*, 34:330-336 (1986).

Van Ginkel et al., "Bulk density and porosity distributions in a compost pile," *Netherlands J Agric Sci.*, 47:105-121 (1999).

Waldron, K. Dr., "Producing high-quality horticultural growing media through the retention of plant structure in composted food processing waste," *Composting News*, 9:45-46 (2005).

Waldron, K., "Disassembly of Plant-Based Co-Products," Presentation at SCI Separations of Value Added Products in the Food Industry, SCI London conference, Mar. 30, 2006.

Waldron, K., "Producing high-quality horticultural growing media through the retention of plant structure in composted food-processing waste," Presentation at Horticulture LINK 2005, London, Feb. 24, 2005.

Waldron, K., "Producing high quality horticultural growing media through the retention of plant structure in composted food-processing waste," Presentation at Horticulture LINK 2006, Thistle Hotel, Buckingham Palace Road, Westminster, Feb. 23, 2006.

Zeytin et al., "Influences of composted hazelnut husk on some physical properties of soils," *Biores Technol.*, 88:241-244 (2003).

Author Unknown, "Compost Under Control," *The Commercial Greenhouse Grower Magazine*, Apr. 2006, [Online], http://www.actpub.co.uk/archive/GHG/2006/04/Ebook/html_print.html?image=image, Jun. 11, 2009.

Author Unknown, "Producing horticultural growing media from composted food-processing waste," *Composting News*, 9:45-46 Spring/Summer 2005.

*Advances in Biochemical Engineering/Biotechnology* (Springer-Verlag Berlin Heidelberg, 2007) 108:42-43.

International Search Report for corresponding International Application No. PCT/GB2008/000044 dated Oct. 2, 2008 (5 sheets).

Written Opinion of the International Searching Authority for corresponding International Application No. PCT/GB2008/000044 dated Oct. 2, 2008 (14 sheets).

International Preliminary Report on Patentability for corresponding International Application No. PCT/GB2008/000044 dated May 19, 2009 (25 sheets).

\* cited by examiner (a)  (b)

(a)  (b)

A

B

C

Figure 39:
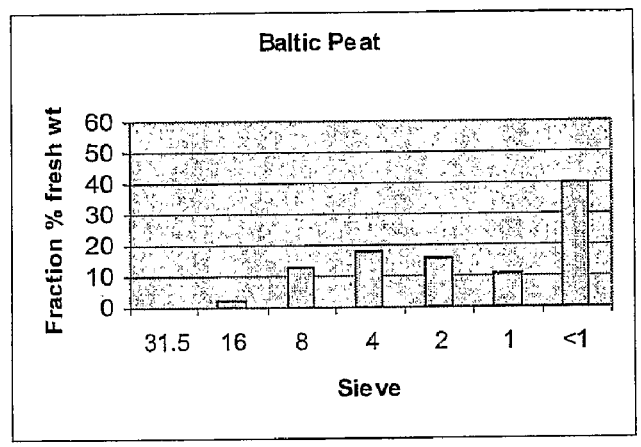
Figure 39:
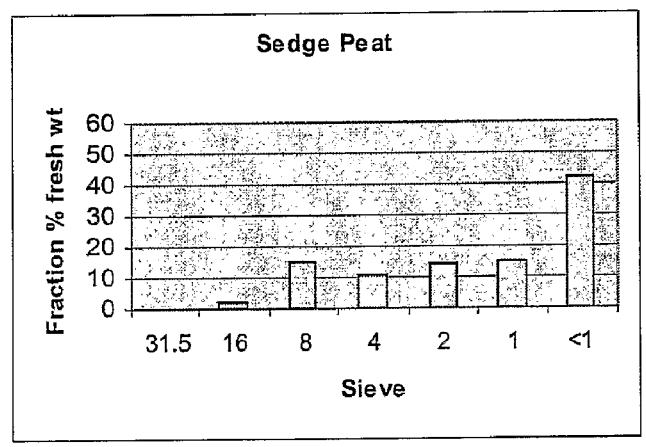
Figure 39:
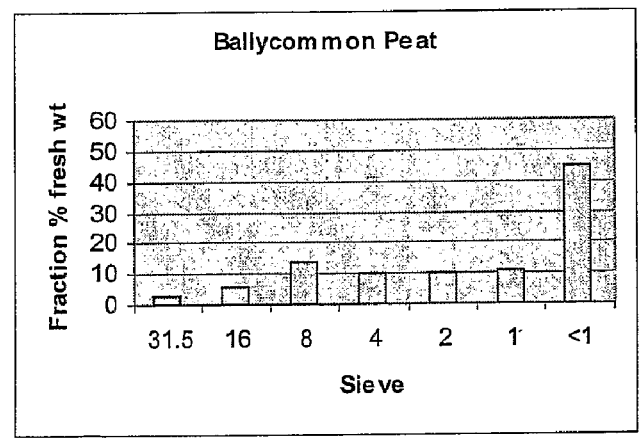

Figure 39 ctd.
D
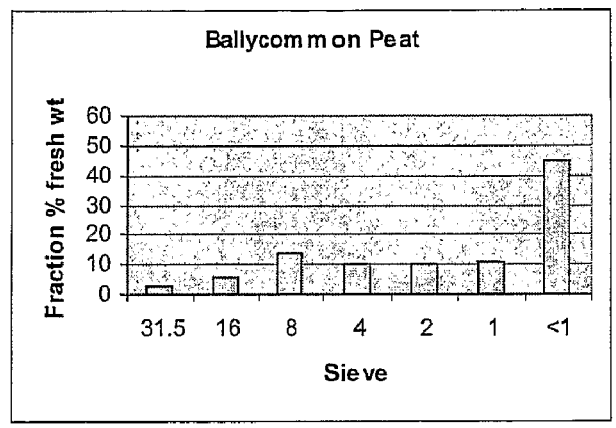
E
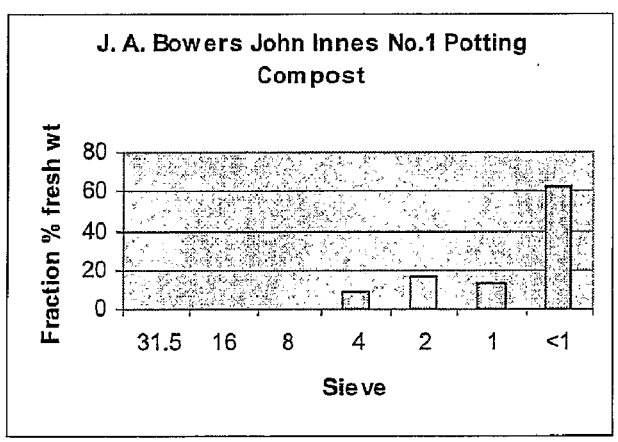
F
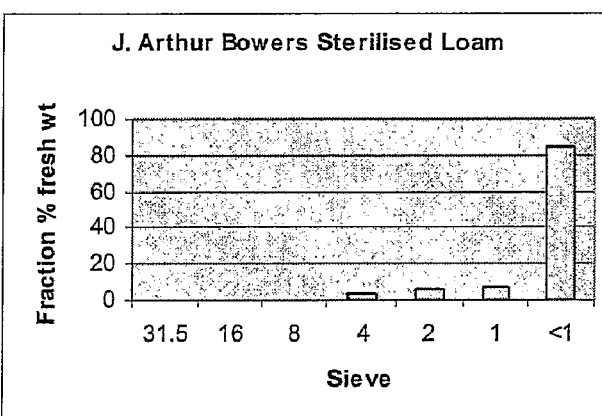

Figure 39 ctd.
G
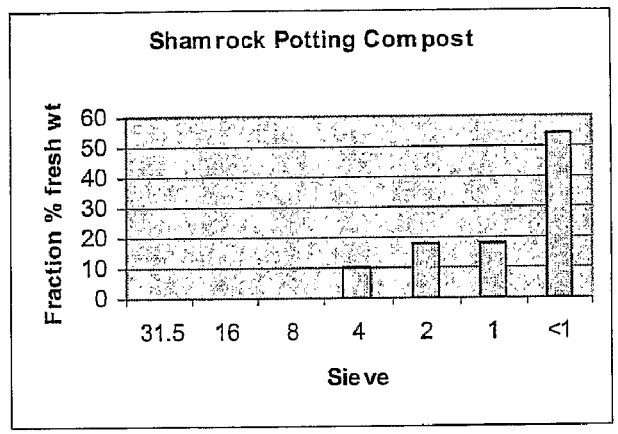
H
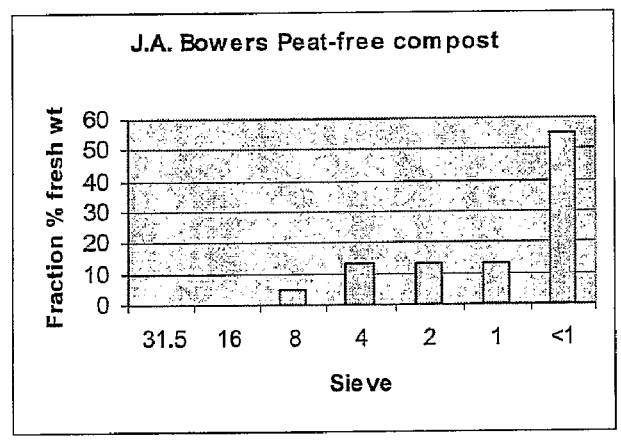
I
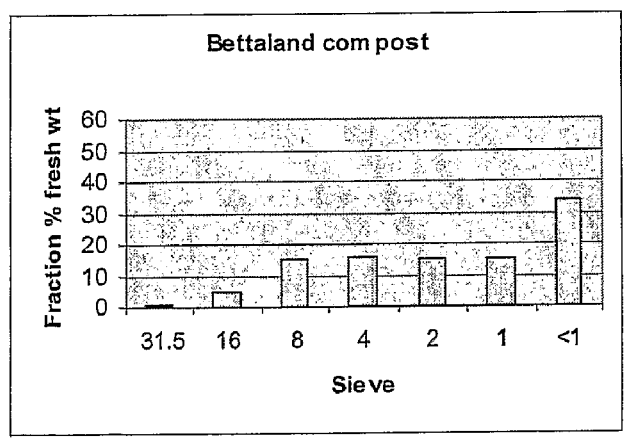

Figure 39 ctd.
J
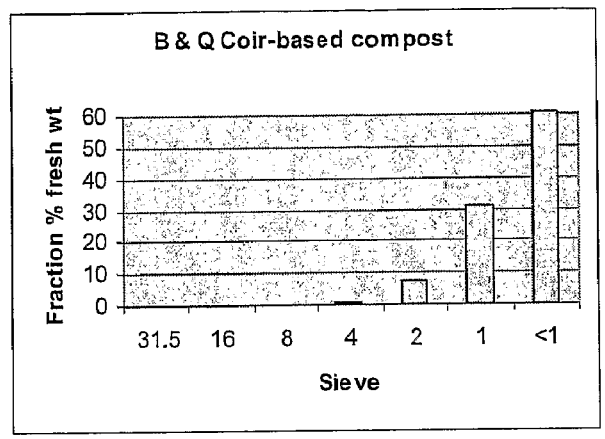
K
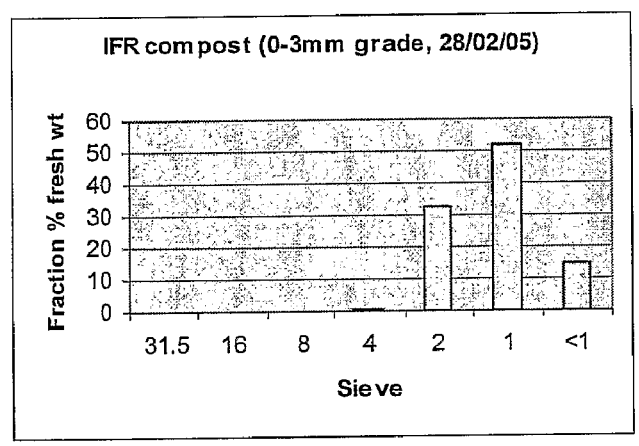
L
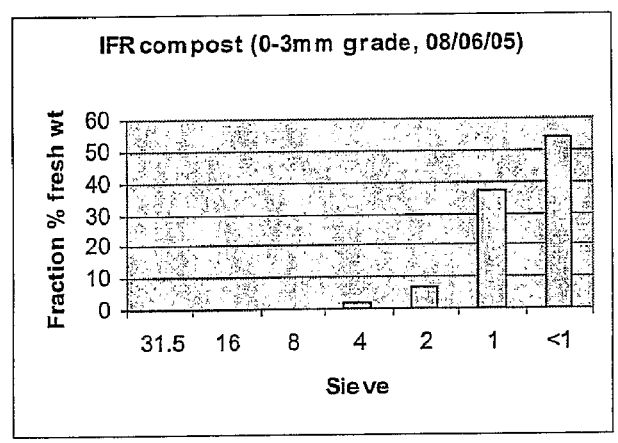

Figure 39 ctd.
M
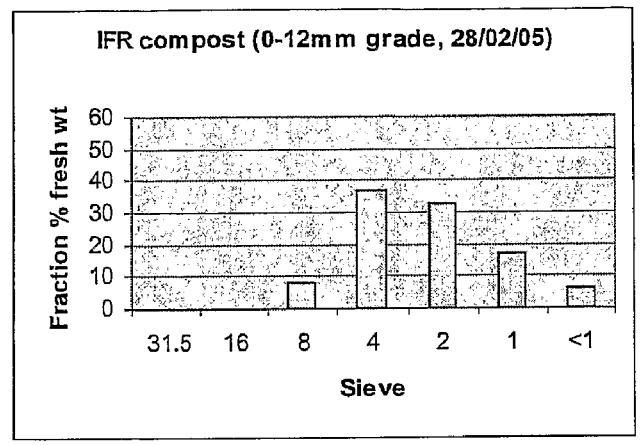
N
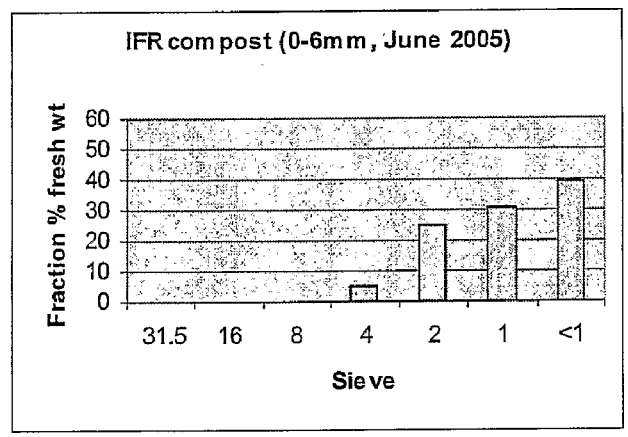
O
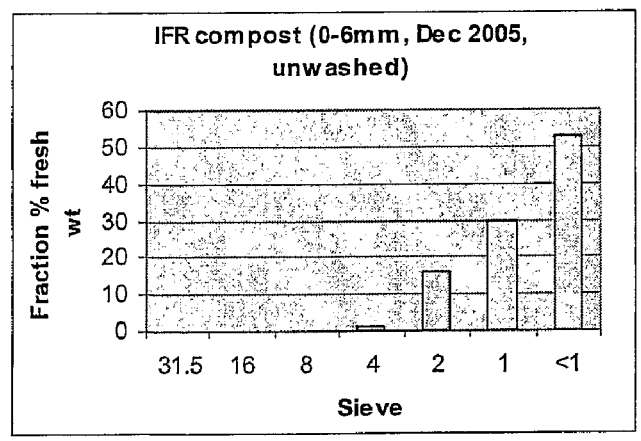

Figure 39 ctd.
P
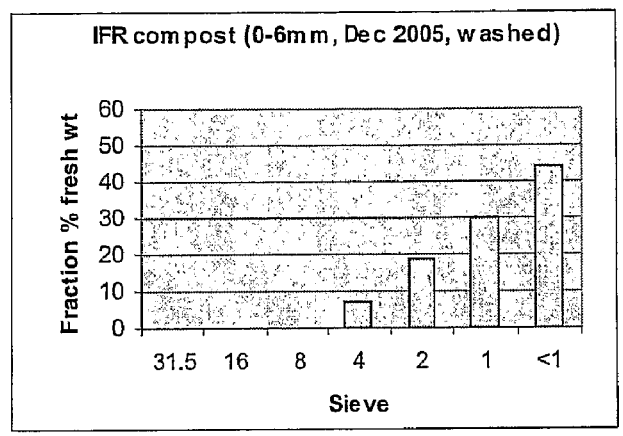
Q
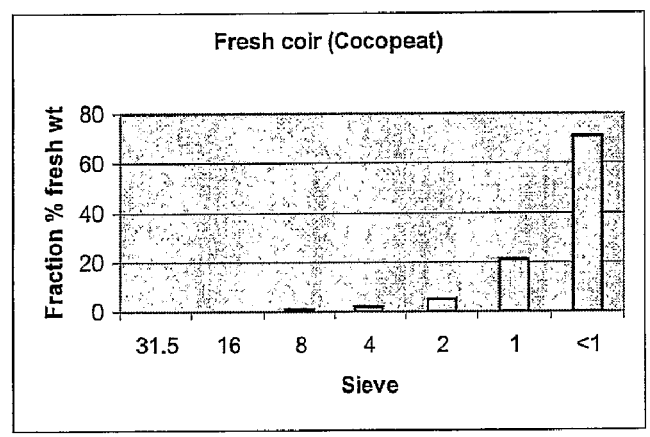
R
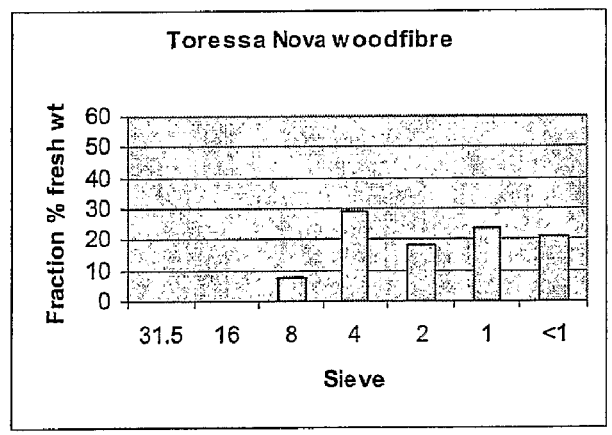

Figure 39 ctd.
S
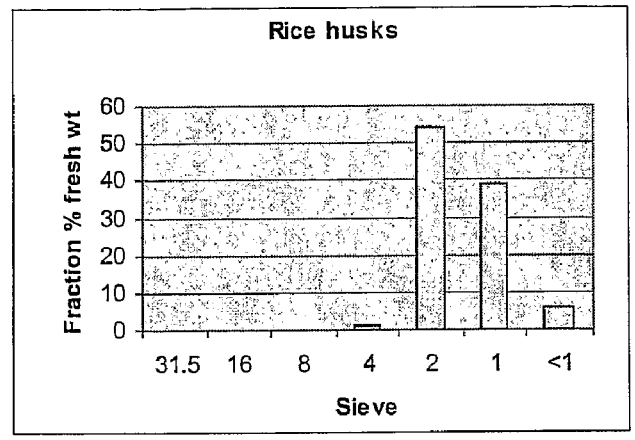
T
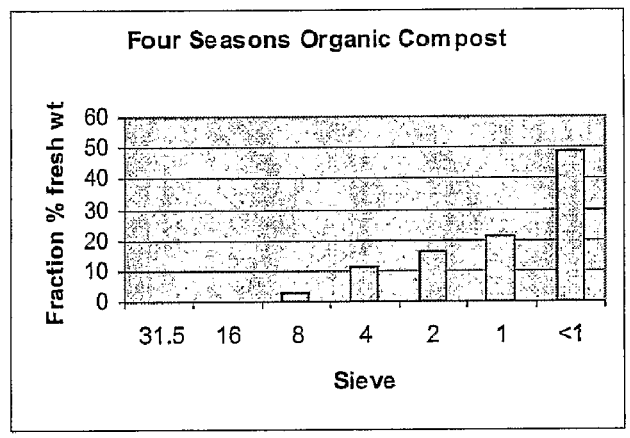
U
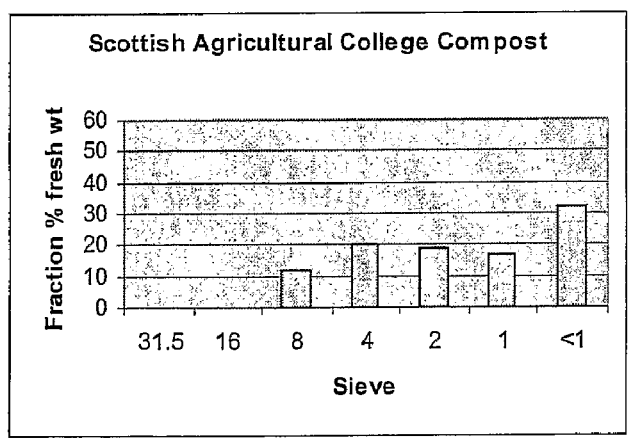

Figure 39 ctd.
V
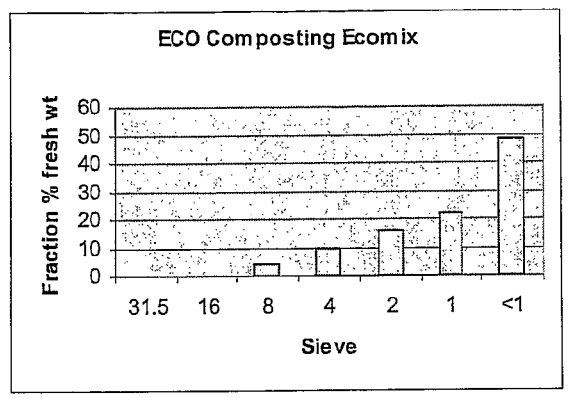
W
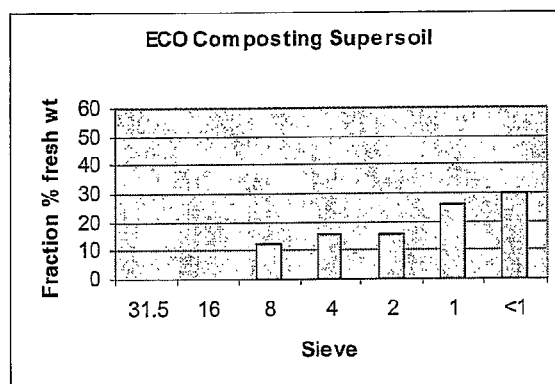
Figure 40
A
Trial 1: BG windrow cell wall sugars
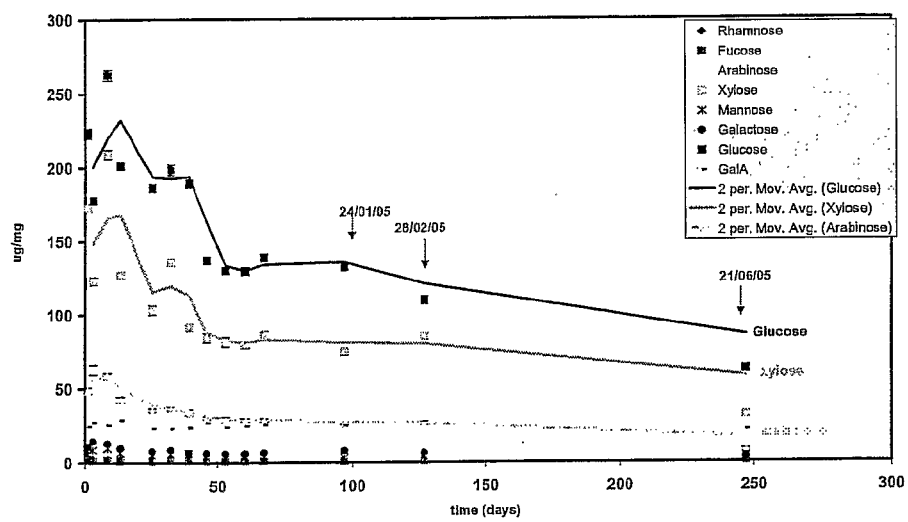

Figure 40 cts
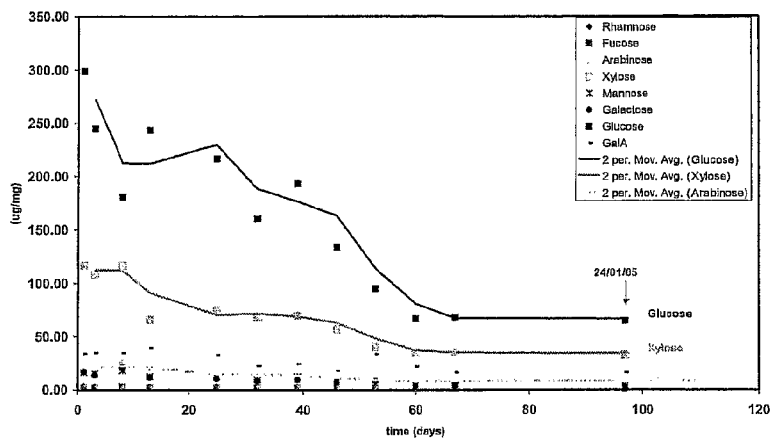
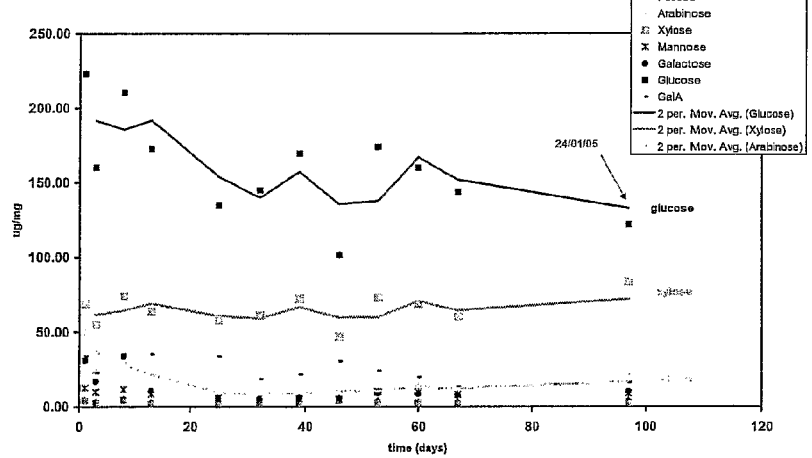
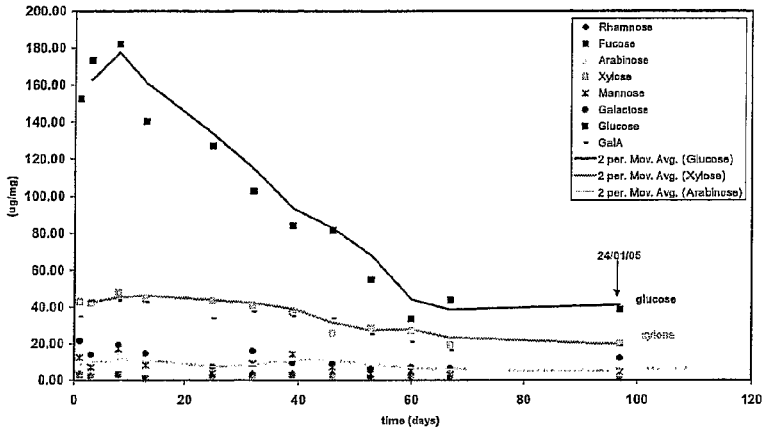

Key sugars

A

B (1)

(2)

(3)

(4)

A

B

C

Figure 45:
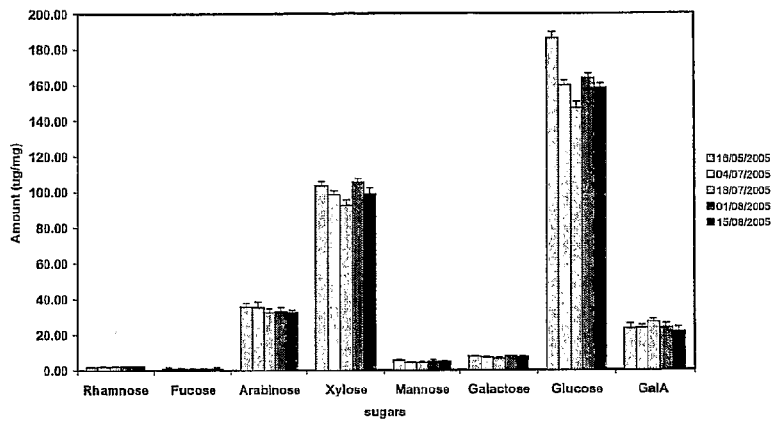
Figure 45:
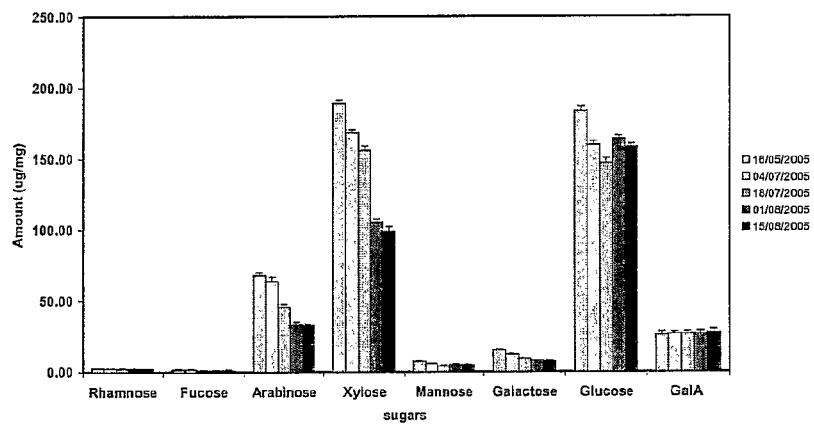
Figure 45:
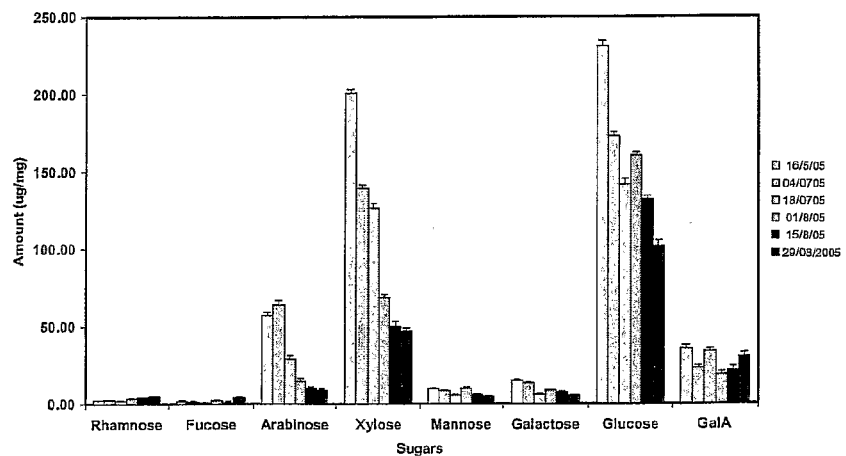

Figure 45 ctd
D
Trial 2: bg+F2 mix windrow cell wall sugars
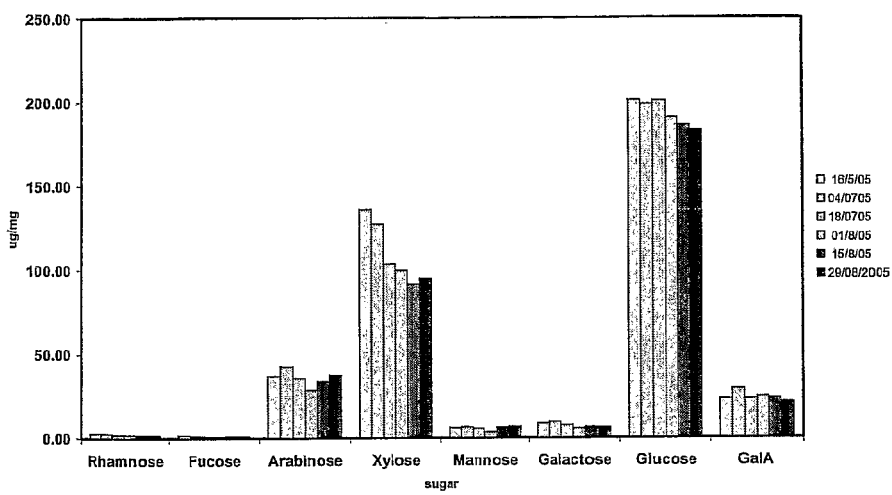
Figure 46
Onion/Straw Windrow
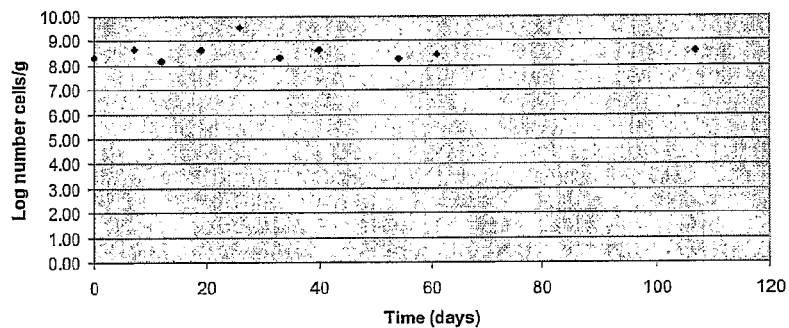
Figure 47
Onion/Straw Windrow
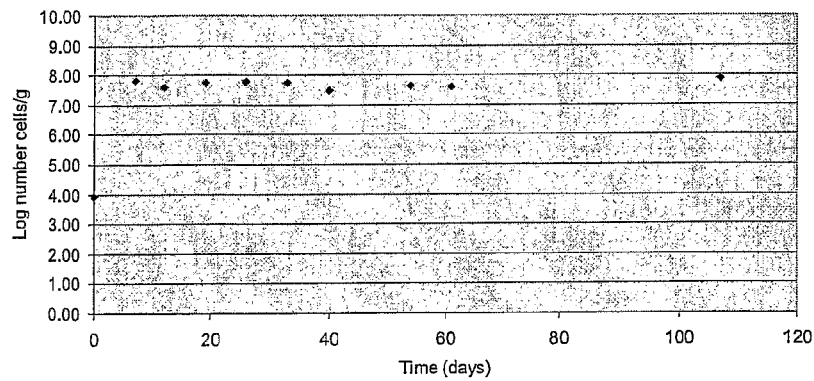

Onion/Straw Windrow

Onion/Straw Windrow

Onion/Straw Windrow

Standard Levington seeding  Standard seeding + 30% WF

Standard Levington seeding  Standard seeding + 30% IFR a) 
b)

c) 
d)

(a) (b)

% germination:   63.5            85.5            76.5            46.5

METHOD AND KIT

RELATED APPLICATION DATA

This application is the U.S. national stage of PCT/GB2008/000044 filed on Jan. 9, 2008, which claims priority to and benefit of Great Britain Patent Application No. 0700302.3 filed on Jan. 9, 2007, the content of each of which is expressly incorporated herein in its entirety by reference hereto.

FIELD OF INVENTION

The present invention relates to a method for producing a plant growth medium by composting, a kit for performing that method and a plant growth medium. In particular, the invention provides a plant growth medium that can be used as a substitute for peat (i.e. a peat-substitute material).

INTRODUCTION

The requirement for horticultural growing media has increased rapidly since the 1950's as a result of the growth of the Professional Growers industry including nursery stock, pot plants/herbs, bedding plants etc., and amateur gardening. Sphagnum peat has been used as the main constituent of growing media, and the demand has been met principally by UK peat sources, but also by increased import (30%). UK professional growers utilise approximately 1.2 million cubic metres ($m^3$) peat annually. Sphagnum peat satisfies a range of generic grower requirements. These include air porosity (10% at 1 kPa), water holding capacity (WHC; 30%-65%), low nutrient and nitrogen status (that can be regulated), good re-hydration and drainage characteristics and structural stability. All of these underpin modern water and nutrient management practices.

The current supply of peat is under threat as a result of various EU directives, particularly the Wetland Habitats Directive. In addition, targets to reduce bio-waste (e.g. landfill directive) have encouraged National Government to set aspirational targets for reducing peat use in Horticulture (90% by 2010), the hope being that the reduction will be addressed by the use of the alternative media. Major retail chains have declared support for these initiatives, and are pressurising their supply chains accordingly. However, many Growers are reluctant to change, due to bad experiences with poorly formulated peat alternatives produced in the early 1990s.

Fruit, vegetable and cereal processing co-products represent a considerable, sustainable and consistent (plant structure) resource for the development of new and high-specification compost-based growing media. However, the development of the latter has been attenuated by: 1) a paucity of knowledge of biological structure-function relationships of peat-based media and a lack of effective quality measurement; 2) a very poor understanding of the composting process in relation to the microbiological degradation of plant structure and the resultant physicochemical properties. Accordingly, the composting of processed fruit, vegetable and cereal waste needs to be understood in order that it can be controlled so as to provide optimum growing media characteristics.

The beneficial properties of peat-based growing media reflect the macro-, micro- and molecular structure of the vitrified sphagnum plants. The hollow leaves provide the high WHC, whilst phenolic-rich hydrophobic stem and leaf cell walls facilitate good drainage and appropriate ion-exchange characteristics. In contrast, composting involves microbial degradation of plant (and other) materials. For poorly lignified tissues, composting generally results in total degradation to a bacterial/sand mixture (Institute of Food Research, unpublished)—i.e. there is little or no structural material to provide a useful growing medium. Hence, most composted materials are of low value.

Against this background, the inventors have succeeded in developing a method and kit for producing high-quality horticultural growing media by the controlled composting of bioorganic matter, such as traceable, sustainable and locally-produced plant-based food processing waste (such waste is preferred because it is safe and traceable, resulting in a traceable and safe growing medium). The method enables the production of plant growth media that replicates plant-structure-dependent physicochemical (i.e. physical and chemical) characteristics found in an given plant medium, such as high-quality growing media (for example, peat). Peat, particularly that derived from sphagnum peat bogs, is known to retain a high level of plant structure, both at the tissue, cell and cell-wall length scales. It is this structure that underpins the balance of functional characteristics prized by growers, such as aeration, water-retention, good drainage and low nutrient content. Plant growth medium of other defined characteristics may also be produced using the inventors' method.

The inventors' method enables the development of growing media which is reliable, consistent and predictable for growers in various horticultural sectors, which will result in potential economic and environmental benefits from reducing the quantity of bio waste sent to landfill and the development of reliable plant growth media for the growing industry.

In addition, the inventors' method can be used to produce a peat-substitute material (i.e. a material having characteristics of peat, such as some or all of the biochemical, structural and microbiological characteristics of peat), which can be used instead of peat in applications in which peat is typically used. For example, peat has historically been used as a plant growth medium, or as a fuel (i.e. a solid or substantially solid fuel) that is burned to generate energy (for example, in power stations to generate electricity), and has potential application as a substrate for generating liquid fuel (such as bio-ethanol), Thus, the peat-substitute material produced using the inventors' method may be used as a plant growth material, a solid or substantially solid fuel or biofuel, and as a substrate for producing liquid fuel or biofuel, (such as bio-alcohol). In addition, it is well known that peat is a stable source of sequestered carbon—thus, the inventors' method may also be used to generate a product in which carbon is sequestered, potentially for long-term carbon storage.

SUMMARY OF INVENTION

Accordingly, in a first aspect, the invention provides a method for producing a plant growth medium comprising the following steps:
  a) providing an amount of bioorganic matter;
  b) contacting the bioorganic matter with one or more microbial agents capable of degrading the bioorganic matter to produce a decomposition product; and
  c) treating the decomposition product produced in step (b) to inhibit the degradation process prior to its completion.

Thus, in one aspect, the present method uses microbial activity to modify the structure of bioorganic matter so that easily-degradable material is essentially turned into microbial biomass, leaving the more difficult-to-degrade (but potentially degradable) structural components of the bioorganic matter in a decomposition product. The decomposition product may be treated to inhibit the degradation process prior to completion and stabilised to prevent further degradation, thereby retaining the residual structural components in the resulting plant growth medium. The plant growth medium is stable since, following treatment, there are insufficient levels of microbial nutrients and microbial biomass to begin or continue the decomposition process.

By "bioorganic matter" we include any organic (i.e. carbon-containing) matter derived from or produced by one or more biological organisms (such as, for example, any animal, plant, insect, fungus, yeast, moss, algae or microorganism matter) or a mixture of matter comprising matter derived from or produced by one or more biological organisms.

By "plant matter", we include any matter derived from or produced by plants, preferably, plant matter derived from agriculture-food chain residues and co-products. A range of plant matter may be used in the method of the invention; for example, higher plant matter cereal-derived materials (straw and bran from wheat, barley, rice, oats, rye; Brewers' grain, other brewing grain wastes; grass and hay; sweet corn kernels and field waste); non-graminaceous monocotyledonous-based wastes (for example, from asparagus), dicotyledonous-based materials (for example, fruit and vegetable wastes and co-products; crop residues such as stems from *brassicas* including rape, cauliflower, broccoli, calabrese, cabbage, sprouts; from legumes including peas and beans); non-food plants with suitable structuring components (for example, hemp, nettle, jute, flax, and other fibrous materials from across the world including coir) and flower wastes and stems.

By "algal matter" we include any material derived from or produced by algae, such as seaweeds (for example, kelp) and unicellular algae from fresh and salt water. By "fungal matter" we include any material derived from or produced by yeast and/or fungi, such as wastes from mushroom cultivation; waste residues from fermentation activities including waste yeasts and other alcohol and bio-alcohol production systems. By "animal materials" we include any material derived from or produced by animals, such as feathers, bone, connective tissue and meat wastes.

Preferably, the bioorganic matter used in the method of the invention is derived from plant matter (such as leaves, fruit, flowers, grain and seeds) and more preferably, is generated as waste by industry and/or households. Such waste is usually disposed of in landfill sites.

It will be understood that bioorganic matter from any source can be used in the method of the invention, provided that it comprises one or more structural components that is resistant to degradation or partially resistant to degradation and/or that it comprises one or more nutritional components that may support microbial growth (i.e. during the decomposition process) and/or plant growth (i.e. in the resulting plant growth medium).

It will be appreciated that different types of bioorganic matter can be chosen on the basis that they will contribute to the degradation process and/or the structural components that will be retained in the future growing media. For example, vascular-bundle-containing and fibrous materials (such as hemp) may provide a final fibrous meshwork which can help in creating cohesiveness and structure in the plant growth medium. Straw may provide useful fibrous material from the leaves, which degrade to leave the vascular bundles; the straw material also can partially degrade to provide fragments of lignified structure.

Preferably, the bioorganic matter used in the method of the invention comprises plant cell walls. Many monocotyledonous plants have thin layers of cells which are rich in (non-lignin) phenolic cross-links. Structural cell-wall-containing tissues including highly lignified tissues made up of thin cell layers and fibres up to 0.5 mm thick, possibly present in sheets as in the case of cereal leaves and brewers grain, or fibres, as in the case of vascular tissues. An important criterion is that these cell walls are relatively resistant to microbial degradation compared with those of fleshy vegetable and fruit tissues (where cell walls are poorly cross-linked, easily degraded).

Monocotyledonous plant wastes (such as straw, Brewers' grain, wheat bran, oat bran, rice bran and other cereal wastes) are useful for providing structural components to the bioorganic matter. Some (for example Brewers' grain) also contain suitable quantities of nutrients suitable as a source for microbial proliferation and metabolism.

Dicotyledonous plant wastes (for example, vegetable trimmings such as *brassica* leaves and leeks) contain poorly cross-linked cell walls and little lignin and provide a readily-degradable substrate which will enable the compost process to get going rapidly, resulting in a rise in temperature and accelerated degradation.

Some dicotyledonous tissues (for example, vascular bundles) are lignified, and their resistance to degradation will enable them to contribute to the retained structure. Some non-lignified dicotyledonous tissues (for example, cellulose-rich fibres in hemp, jute, flax and nettles) are also resistant to degradation, and may contribute to the final structure.

By "plant growth medium" we include a solid or semi-solid medium capable of promoting and/or increasing plant growth (and/or the germination of seeds, bulbs or tubers thereof) either when used alone or when mixed with other plant growth media, supplements and/or fertilisers to form a complex plant growth medium.

Preferably, the plant growth medium of the invention is a solid or substantially solid medium, which has the consistency of peat. By "solid or substantially solid" we include the meaning that the media is sufficiently solid to facilitate and support root growth and development, and the growth of anal organs, either when dry or when saturated with water.

It will be appreciated that the method of the invention may be used to make plant growth media having other defined characteristics, compositions and/or consistencies, as desired. For example, the method of the invention may be used to produce growth media ranging from relatively dry growing media through to wet media suitable for hydroponic uses, as are known in the art. Thus, the plant growth medium produced by the method of the invention may range from relatively "fluid" material with small particle sizes through to more entangled material with fibres of 1 to 10 cm in length (for use, for example, in robotic plant handling and propagation systems).

Preferably, the plant growth medium of the invention comprises rigid or substantially rigid components derived from the bioorganic matter so that the plant growth medium has a partially rigid or defined structure. For example, where the bioorganic matter is derived from plant matter, the resulting plant growth medium preferably contains rigid or substantially rigid structural elements from that bioorganic matter, such as plant fibres, lignified tissue or seed casings.

The term "microbial agent capable of degrading the bioorganic matter" includes any microbial agent capable of degrading (i.e. breaking down) one or more components of the bioorganic matter, thereby altering the chemical composition and/or physical structure of the bioorganic matter. Typically, such microbial agents produce intracellular and/or extracellular enzymes capable of catabolising or degrading chemical compounds in the bioorganic matter (such as, for example, proteins, carbohydrates and fatty acids), thereby generating energy and/or nutrients to support growth of the microbial agent.

For example, microbial agents capable of degrading structural components of bioorganic matter may be used to alter and/or reduce the overall level of structure in that matter. The rate of degradation may vary depending on a number of factors, including: the composition of the bioorganic matter; the type and number of microbial agents in contact with the bioorganic matter; the degradative enzymes contained within the microbial agents; and the conditions in which the microbial agents are contacted with the bioorganic matter (for example, the time, temperature, oxygen ($O_2$) and carbon dioxide ($CO_2$) levels, and hydration (i.e. water-content) levels in which the bioorganic matter and microbial agents are in contact).

Suitable microbial agents for use in the method of the invention include bacteria, moulds, fungi and yeasts. Any microorganism capable of producing one or more enzymes capable of degrading a component of the bioorganic matter can be used in the method of the invention including, for example, microorganisms that have been genetically modified to include one or more enzymes, as are known in the arts of molecular biology and microbiology.

By "decomposition product" we include matter derived from the bioorganic matter and which contains one or more components of the bioorganic matter that has not been degraded (or fully degraded) by the one or more microbial agents. For example, the decomposition product may contain one or more components of the bioorganic matter that cannot be degraded (or fully degraded) by the one or more microbial agents (for example, because the one or more microbial agents does not contain degradative enzymes capable of degrading that component).

Alternatively, or additionally, the decomposition product may contain one or more components of the bioorganic matter that has not been degraded (or fully degraded) because the one or more microbial agents of the invention has not been contacted with the bioorganic matter under conditions permitting the degradation (or complete degradation) of the one or more components—for example, the conditions may have been maintained at a temperature, or for a time, not permitting the degradation (or full degradation) of that one or more components.

Preferably, the decomposition product produced by the method of the invention comprises matter that retains one or more complex chemical components and/or one or more physical structural components of the bioorganic matter. Preferably, the decomposition product is solid or substantially solid and comprises rigid and/or substantially rigid components derived from the bioorganic matter so that, following treatment in step (c) of the method of the invention, the plant growth medium has a partially rigid or defined structure (for example, the consistency of peat). In short, the "decomposition product" includes partially decomposed bioorganic matter.

Preferably, the bioorganic matter contains or comprises one or more component resistant or substantially resistant to degradation by the one or more microbial agents. By "resistant to degradation" we include components that are completely resistant or partially resistant to degradation by the one or more microbial agents used in the method of the invention. Typically, such components are resistant to degradation (or partially resistant to degradation) because the degradative enzymes produced by the one or more microbial agents used in the method of the invention are not capable of degrading (or fully degrading) that component under the conditions in which they are contacted with the bioorganic matter. Preferably, the component is selected from the group consisting or comprising of plant cell walls, cellulose and chitin.

Preferably, the invention provides a method wherein the bioorganic matter comprises or consists of plant matter (such as matter from higher and/or lower plants) and/or animal matter and/or fungal matter and/or algal matter. For example, matter (such as fibres) from any source may be used, such as seaweed and related algae, fern-based matter, fungal biomass, matter from moss (such as sphagnum moss), and matter comprising chitin (such as material from molluscs).

Preferably, the invention provides a method wherein the plant matter is selected from the group consisting of plant matter containing phenolic cross-links, lignified plant matter and semi-lignified plant matter. More preferably, the lignified plant matter and/or semi-lignified plant matter comprises or consists of sheets and/or fibres of lignified plant matter.

Lignified and semi-lignified plant matter includes lignified vascular and related tissues (i.e. "fibres"), and lignified palea and lemma from the outer part of cereal grains (i.e. "sheets") which are present, for example, in Brewers' grain residues. Sheets of lignified matter also includes matter derived from wood shavings or other processed wood material.

More preferably, the dicotyledonous plant matter may be selected from the group consisting of lignified plant matter, vascular bundles, fibrous bundles, plant matter with little or no phenolic cross-links, plant matter with little or no lignin and non-lignified dicotyledonous plant tissue.

By "phenolic cross links" we include phenolic chemicals attached to plant cell wall components, which increase the stability of the plant cell wall and increase their resistance to degradation by microbial agents. Ferulic acid is a phenolic attached to some pectins and hemicellulosic polysaccharides in the cell wall of cereals and some vegetables. In the cereal cell walls, the cross-linking between the polymers that results from the formation of diferulic acids reduces their solubility, and increases their resistance to microbial dissolution. The cross-links help to make the wall more resistant to biodegradation. Lignin provides an even greater form of cross-linking and the walls are even more resistant to biodegradation. It will be appreciated that bioorganic matter containing phenolic cross links may provide a structural component to the resulting plant growth material.

Preferably, the ferulic acid-based cross-linking phenolics are present in a relatively low amount in the bioorganic matter and/or plant growth medium of the invention, typically less than 5% w/w and preferably, 4%, 3%, 2% or 1% (w/w). Lignin is present in many plant growth media at up to 40% to 50% (w/w) of the dry matter. Preferably, the lignin content of the bioorganic matter and/or the plant growth medium of the invention is between 40% and 50% (w/w).

Similarly, the invention provides a method wherein the plant matter is selected from the group consisting of monocotyledonous plant matter and dicotyledonous plant matter. In general, monocotyledonous plant matter provides one or more structural components to the bioorganic matter, and dicotyledonous matter provides one or more nutritional components to the bioorganic matter (although this is not always the case).

For example, the monocotyledonous plant matter may be selected from the group consisting of straw, straw leaves, cereal leaves, Brewers' grain, wheat bran, oat grain and rice bran.

Conveniently, the dicotyledonous plant matter comprises or consists of hemp and/or nettle and/or vegetable matter and/or fruit matter. Hemp fibres and nettle fibres are not significantly lignified but are resistant (or partially resistant)

to degradation due to the high crystallinity of cellulose contained therein, which may prevent or reduce degradation by the one or more microbial agents used in the method of the invention (and may thus provide a structural component to the bioorganic matter and the resulting plant growth medium).

Preferably, the vegetable matter comprises or consists of *brassica* leaves and/or leek and/or onion and/or potato.

In a preferred embodiment, the invention provides a method wherein the bioorganic matter is selected from the group comprising or consisting of Brewers' grain, straw, leaf matter and fruit matter.

Preferably, the bioorganic matter comprises or consists of: (i) a ratio of between 2.4 to 8 parts Brewers' grain:1 part straw; or (ii) a ratio of between 4 to 5 parts Brewers' grain:1 part leaf matter:between 1.8 to 3 parts straw.

Preferably, the bioorganic matter comprises or consists of:
i) a ratio of 4 parts Brewers' grain:1 part leaf matter:1.8 parts straw; or
ii) a ratio of 5 parts Brewers' grain:1 part leaf matter:3 parts straw; or
iii) a ratio of 2.4 parts Brewers' grain:1 part straw; or
iv) a ratio of 8 parts Brewers' grain:1 part straw; or
v) a ratio of 4 parts Brewers' grain:1 part fruit matter:1.5 parts straw; or
vi) a ratio of 10 parts Brewers' grain:1 part fruit matter:4 parts straw.

It will be understood that, in a preferred embodiment, the bioorganic matter comprises a defined level of carbon, nitrogen and moisture that is known to be suitable for initiating and/or supporting the decomposition process. Preferably, the carbon to nitrogen ratio is between 25 and 70, for example, 30, 35, 40, 45, 50, 55, 60 or 65. Most preferably, the carbon:nitrogen ratio is between 25 and 35. Advantageously, the moisture content is between 55% and 80%, for example 60%, 65%, 70% and 75%.

Preferably, invention provides a method wherein the bioorganic matter further comprises a nutrient source for one or more microbial agents. Conveniently, the nutrient source comprises or consists of starch and/or protein. It will be understood that the bioorganic matter itself may contain sufficient nutrients to support the growth of the one or more microbial agents; if it does not, such nutrients may be added to the bioorganic matter either prior to, or during, step (a) or (b) of the method of the invention.

Conveniently, the bioorganic matter provided in step (a) comprises one or more microbial agents capable of degrading the bioorganic matter (i.e. endogenous microbial agents). A skilled person will appreciate that the bioorganic matter itself may contain a sufficient number and/or type of microbial agents capable of degrading the bioorganic matter for use in the method of the invention. Suitable microbial agents may be provided in, for example, fleshy vegetable and fruit wastes.

Similarly, the present invention provides a method wherein step (b) comprises adding one or more (exogenous) microbial agents capable of degrading the bioorganic matter to the bioorganic matter provided in step (a). The addition of one or more microbial agents may be desirable to achieve a desired number and/or type of microbial agents capable of degrading the bioorganic matter.

For example, the invention provides a method wherein the one or more microbial agents is selected from the group consisting of pseudomonas species, aerobic thermophilic bacteria, aerobic mesophilic bacteria, yeasts and moulds.

By "aerobic thermophilic bacteria" we include bacteria capable of growth in air at 25° C., such as gram positive spore formers. By "aerobic mesophilic bacteria" we include bacteria that are capable of growing in air at 25° C., such as pseudomonas species. By "microaerophilic bacteria" we include bacteria that are capable of growing in low concentrations of oxygen, such as *lactobacillus* species.

It will be understood that any the method of the invention can be performed using any amount of bioorganic matter. Preferably, the invention provides a method wherein the amount of bioorganic matter provided in step (a) is at least 10 kg, for example at least 20 kg, 30 kg, 40 kg, 50 kg, 60 kg, 70 kg, 80 kg, 90 kg, 100 kg, 150 kg, 200 kg, 250 kg, 300 kg, 400 kg, 500 kg, 10 tonnes, 20 tonnes, 50 tonnes, 100 tonnes, 200 tonnes, 300 tonnes, 500 tonnes, 1,000 tonnes, 2,000 tonnes, 5,000 tonnes, 10,000 tonnes, 20,000 tonnes, 50,000 tonnes, 100,000 tonnes, 200,000 tonnes, 500,000 tonnes or more. Preferably, the amount of bioorganic matter provided in step (a) is at least 200 kg.

Preferably, the invention provides a method wherein step (b) is performed in a windrow. The term "windrow" is known in the art and includes a long, low, narrow pile of material for decomposition, such as compost, which may be composed of many tonnes of matter. The outer surface of the windrow is typically exposed to environmental conditions, whilst the inner parts of the windrow can have quite different conditions (for example, higher temperature and/or lower $O_2$ levels than the external environment). Windrows are therefore largely heterogeneous throughout with respect to temperature, moisture, $CO_2$ and $O_2$ levels and ratios, microbial population and external conditions (for example, rain-fall, and ambient temperature).

Similarly, the invention provides a method wherein step (b) is performed in a "controlled environment" by which we include any environment in which one or more parameters or conditions of that environment is controlled Preferably, the controlled environment allows one or more of the following conditions to be controlled: temperature; moisture content; $CO_2$ to $O_2$ ratio; pressure; shear; mixing.

The term "shear" includes mechanical or physical forces capable of disrupting and/or breaking structural elements in the bioorganic matter. Shear may be provided by mixing the bioorganic matter in the presence of baffles or other rigid elements that exert force on the mixed matter.

Preferably, the invention provides a method wherein the controlled environment comprises maintaining the bioorganic matter at a controlled temperature; conveniently, the controlled temperature is between 25° C. and 55° C. (for example, 25° C., 30° C., 35° C., 40° C., 45° C., 50° C. or 55° C.) or between 25° C. and 60° C. (for example, 25° C., 30° C., 35° C., 40° C., 45° C., 50° C., 55° C. or 60° C.). Typically, the controlled temperature is between 30° C. and 35° C.

The decomposition process is highly exothermic. In a fully insulated system, the temperature will increase and rise above the level at which the microflora can survive in a vegetative state which will result in pasteurisation of the system and a subsequent decrease in temperature to ambient. If that occurs, the system is difficult to restart, presumably because the sites for microbial attachment may be blocked by dead, attached bacteria.

In a preferred embodiment, the invention provides a method wherein the controlled environment comprises subjecting the bioorganic matter to controlled mixing. Mixing ensures that physical, microbiological, biological, chemical and environmental uniformity is maintained throughout the bioorganic matter and/or decomposition product. More preferably, controlled mixing comprises continuous mixing of the bioorganic matter or intermittent mixing of the bioorganic matter. Conveniently, intermittent mixing comprises mixing of the bioorganic matter once or twice every 24 hours or comprises slow continuous mixing.

For example, where the method of the invention is performed using a windrow, described below, controlled mixing comprises turning the windrow once or twice per week using, for example mechanical arms or forks as are known in the art. Where the method of the invention is performed using a bioreactor, controlled mixing can be performed by rotating the bioreactor; such action can also provide shear if the rotated bioreactor comprises baffles or other rigid structural members. Preferably, the invention provides a method wherein the controlled environment comprises maintaining the bioorganic matter at a controlled moisture content. Preferably, the controlled moisture content is between approximately 5% w/v (such content being defined as "dry") and approximately 100% (such content being defined as "wet"), advantageously between approximately 5% and 10%; 5% and 20%; 5% and 30%; 5% and 40%; 5% and 50%; 5% and 60%; 5% and 70%; 5% and 80%; or 5% and 90%.

Where the method of the invention is performed in a windrow, the controlled moisture content is maintained at a relatively low level in order to keep the windrow dry or substantially dry (i.e. at a water content of approximately 5% w/v).

Where the method of the invention is performed in a bioreactor, the controlled moisture content is maintained at a relatively high level so that the bioorganic matter and bioreactor contents are kept wet or relatively wet. As described below, the moisture content is maintained at such a level by ensuring that an excess of water is provided as a reservoir at the bottom of the bioreactor.

Advantageously, the invention provides a method wherein the controlled environment comprises maintaining the bioorganic matter at a controlled level of $CO_2$ and $O_2$, which is preferably controlled by aerating the bioorganic matter. Preferably, the $CO_2/O_2$ levels are controlled to ensure that the $O_2$ level is always high (for example, above 15% volume/volume) and the $CO_2$ level is always low (preferably, less than 10% volume/volume or less than 5% volume/volume).

Preferably, the controlled level of $CO_2$ is 10% volume/volume (v/v) or less, and preferably 5% v/v or less, for example 9% v/v or less, 8% v/v or less, 7% v/v or less, 6% v/v or less, 5% v/v or less, 4% v/v or less, 3% v/v or less, 2% v/v or less, 1% v/v or less, or 0% v/v. Preferably, the controlled level of $O_2$ is 15% v/v or more, for example more than 20% v/v, 30% v/v, 40% v/v, 50% v/v, 60% v/v, 70% v/v, 80% v/v, 90% v/v or a controlled level of 100% v/v.

Conveniently, the invention provides a method wherein the controlled environment is provided using a bioreactor.

By "bioreactor" we include an enclosed (or partially enclosed) vessel capable of housing the bioorganic matter and the one or more microbial agents and providing a controlled environment. Preferably, the bioreactor is capable of providing a controlled environment for performing steps (a) and (b) of the method of the invention therein. It will be appreciated that, where the method of the invention is performed using a bioreactor, it may be a continuous or batch process.

Preferably, the invention provides a method wherein the bioorganic matter is contacted with one or more microbial agents capable of degrading the bioorganic matter for a period of at least one day prior to step (c), for example at least two days, three days, four days, five days, six days, seven days, eight days, nine days, ten days, 15 days, 20 days, 30 days, 40 days, 50 days, 100 days or more.

Preferably, a period of one to ten days is used when step (b) of the method is performed in a bioreactor.

One approach for providing a controlled temperature in a bioreactor requires heat transfer through a heat exchanger. Preferably, the bioreactor comprises a heat exchanger comprising or consisting of a pipe network within which heated or cooled liquid (i.e. coolant, such as water and/or glycerol) is circulated; the temperature of the circulated liquid may be regulated externally by energy-using heaters/coolers, as required.

An industrial scale bioreactor may comprise a number of compartments for different stages of digestion, and heat may be transferred from exothermic compartments to those which require heating.

One approach for providing a physical, microbiological, biological, chemical and environmental uniformity in a bioreactor is to regularly mix the bioorganic matter and/or decomposition product during the decomposition process.

One approach for providing a controlled moisture content in a bioreactor is to provide a small pool or reservoir of water on the internal base of the bioreactor.

One approach for providing a controlled $CO_2$ and $O_2$ level in a bioreactor is to controllably pump air through the bioreactor. Preferably, the rate of aeration is kept to a minimum to prevent undue moisture and heat loss through evaporation. For example, in a bioreactor containing approximately 200 kg of bioorganic matter, between 20 and 50 litres of air/minute may provide sufficient aeration.

It will be understood that if step (b) of the method of the invention is performed using a windrow, the bioorganic matter may be contacted with one or more microbial agents capable of degrading the bioorganic matter for a period of more than ten days, for example, more than 20 days, 30 days, 40 days, 50 days, 60 days, 70 days, 80 days, 90 days, 100 days, 110 days or 120 days.

In order to determine whether the decomposition product is suitable for the production of a plant growth medium, the level of decomposition in a sample of the decomposition product may be determined. Preferably, the invention provides a method further comprising the step (b') of analysing a sample of the decomposition product produced in step (b) to determine the level of decomposition, wherein step (b') is performed during or after step (b) but before step (c).

It will be understood that any method capable of monitoring the level or extent of decomposition in a sample of the decomposition product could be used in step (b'). The level or extent of decomposition could be determined by analysing the chemical composition and/or physical structure of the decomposition product, for example one or more components that act as a marker of decomposition. For example, during decomposition one or more nutritional and/or structural components of the bioorganic matter may be altered and/or degraded by the action of the one or more microbial agents, resulting in a reduction in the amount or concentration of that one or more components which may be used to assess the level or extent of decomposition.

Methods for determining the amount or concentration of the one or more components may vary depending on the identity of the component, and suitable methods will be known to those skilled in the art—for example, remote sensing spectroscopy (for example, Fourier transform infra-red spectroscopy (FTIR), near infra-red reflectance (NIR) and nuclear magnetic resonance spectroscopy (NMR)) and analytical assays.

Preferably, the level or extent of decomposition is determined by analysing the level and/or concentration of ammonia and/or carbon dioxide ($CO_2$) produced during the decomposition process. Methods for determining the concentration or amount of ammonia or $CO_2$ in a sample are well known to those skilled in the art. Ammonia and $CO_2$ are chemicals produced by the one or more microbial agents during the decomposition process and can therefore be used to monitor the rate and/or the overall progress of the decomposition process. For example, the overall level of ammonia and/or $CO_2$ produced will increase as the decomposition process proceeds; however the rate of ammonia and/or $CO_2$ production will be highest when the decomposition process is proceeding most quickly and will decline as the rate of decomposition decreases. Thus, the level or extent of decomposition may be determined by analysing either the total amount of ammonia and/or $CO_2$ or the rate of production and the decomposition process halted when either a certain overall amount of ammonia and/or $CO_2$ has been produced, or where the rate of production of ammonia or $CO_2$ declines to a particular level.

In one preferred embodiment, step (b') comprises the sub-steps of
b'-1) providing a sample of the decomposition product;
b'-2) homogenising the sample in water; and
b'-3) detecting the level of microbial nutrients present.

As discussed above, the method of the invention preferably produces a decomposition product comprising partially decomposed bioorganic matter which may be treated to produce a plant growth medium. Preferably, the resulting plant growth medium comprises or consists of one or more structural components and is stable, insofar as no further detectable decomposition occurs.

One way of ensuring that no further detectable decomposition occurs is to produce a plant growth medium in which there is no (or substantially no) microbial biomass and/or microbial nutrients from the plant growth medium, which can be achieved by treating the decomposition product by homogenisation and washing to remove all (or substantially all) microbial biomass and microbial nutrients.

Steps (b'-1) to (b'-3) may be used to remove microbial biomass and microbial nutrients from a sample of the decomposition product and the resulting washed decomposition product can be analysed to determine whether it is possible to remove sufficient microbial biomass and/or microbial nutrients from the decomposition product to produce the plant growth medium desired. The desirable components and properties of plant growth media, and methods for determining those components and properties, are described in the accompanying Examples.

Preferably, the invention provides a method wherein the microbial nutrients comprise or consist of insoluble starch and/or protein and/or lipid and/or cell-wall structuring material. Methods for evaluating starch and/or protein and/or lipid and/or cell-wall structuring materials (such as the cell-wall sugars, rhamnose, fucose, arabinose, xylose, mannose, galactose and glucose) will be well-known to those skilled the arts of chemistry and biochemistry.

For example, protein may be measured by evaluating the total nitrogen content. Protein may be measured by measuring the nitrogen content using the Kjeldahl method and using a conversion factor such that % Protein=6.25×% N.

Starch may be measured using a starch measuring kit such as those known in the art (for example, those commercially available from Boehringer Mannheim or Megazyme—http://www.megazyme.com).

Cell-wall structuring materials may be measured by hydrolysing sugars and subsequently quantifying them as alditol acetates by Gas Chromatography, in conjunction with a gravimetric determination of acid-resistant Klason lignin. Alternatively, cell-wall structuring materials may be analysed by a simple gravimetric "fibre" analysis (using commercial kits suitable for evaluating dietary fibre).

For example, cell-wall material may be prepared and measured for its composition using methods such as those described in: Rodriguez-Arcos R. C., Smith A. C. & Waldron K. W. (2004) Ferulic acid cross-links in asparagus cell walls in relation to texture. *Journal of Agricultural and Food Chemistry*, 52 (15) 4740-4750; Martin-Cabrejas M., Ariza N., Esteban R., Molla E., Waldron K. W. & Lopez-Andreu F. (2003) Effect of germination on the carbohydrate composition of the dietary fiber of peas (*Pisum sativum* L.) *Journal of Agricultural and Food Chemistry* 51 (5) 1254-1259; Ng A., Parker M. L., Parr A. J., Saunders P. K., Smith A. C. & Waldron K. W. (2000) Physico-chemical characteristics of onion (*Allium cepa* L) tissues. *Journal of Agricultural and Food Chemistry* 48 (11) 5612-5617.

The level of microbial stability may be determined using, for example, the Solvita test which evaluates ammonia generation which is available as a commercial kit from Solvita (Coventry, UK) (http://www.solvita.co.uk).

Preferably, the invention provides a method wherein step (c) comprises or consists of removing the one or more nutrient sources from the decomposition product and/or removing and/or inhibiting the activity of the one or more microbial agents and/or degrading enzymes thereof from the decomposition product.

The inventors have surprisingly found that removing and/or inhibiting the activity of the one or more microbial agents and/or degrading enzymes thereof in the decomposition product results in a plant growth medium that does not display any further measurable or detectable decomposition.

Methods capable of inhibiting the activity of microbial agents and/or microbial degrading enzymes are known in the art, and include treatment at temperatures or pH or with chemical inhibitors (such as competitive or non-competitive enzyme inhibitors or bactericidal or bacteriostatic drugs) that reduce or prevent the activity of the microbial agent or enzyme.

For example, temperatures of 50° C. or higher may be used to inactivate vegetative mesophilic bacteria or degradative enzymes thereof; temperatures of 4° C. or less may be used to inactivate vegetative thermophilic bacteria or degradative enzymes thereof. Similarly, extremes of pH may be used to inactivate vegetative bacteria and/or degradative enzymes thereof, as is known in the art.

It will be understood that relatively small amounts of microorganisms, degrading enzymes and nutrient sources or will be tolerated in the plant growth medium. Furthermore, small quantities of microbial biomass (including, for example, associated extracellular polymers) may be beneficial in the plant growth medium, as it may provide advantageous properties (such as, for example, water retention). Preferably, the amounts of microorganisms, degrading enzymes and nutrient sources in the plant growth medium are not sufficient to begin or allow further decomposition of the plant growth medium.

In a preferred embodiment, the invention provides a method wherein step (c) comprises the sub-steps of:
(c-1) inhibiting the activity of the one or more microbial agents and/or degrading enzymes thereof in the decomposition product; and
(c-2) homogenising the decomposition product in water.

Preferably, step (c-1) comprises or consists of sterilising or pasteurising the decomposition product. More preferably, step (c-1) comprises or consists of heating the decomposition product to a temperature above the temperature in step (b). For example, it is known that treatment at temperatures in excess of 100° C. will inactivate most vegetative cells of mesophilic bacteria and enzymes thereof.

Conveniently, the invention provides a method wherein step (c-1) comprises or consists of cooling the decomposition product to a temperature below the temperature used in step (b). Preferably, the decomposition product is cooled to ambient temperature (i.e. between 20° C. and 25° C.) or to temperatures of 20° C. or below (preferably 4° C. or below) which are known to inactivate thermophilic bacteria and enzymes thereof.

It will be appreciated that the method of the invention should preferably comply with PAS 100 temperature/time requirements that are known in the art for ensuring that compost and plant growth media are free from pathogens that may pose a health risk (such as *salmonella*). Preferably, the PAS100 temperature/time requirements may be satisfied during step (b) of the method if a bioreactor is used (for example, during the decomposition process itself) or during step (c) (for example, as part of the sterilisation, washing and/or pasteurisation process).

Preferably, the invention provides a method wherein step (c-1) comprises or consists of altering the pH of the decomposition product to pH4 or less, for example less than pH3, pH2 or pH1. Acidifying the pH of the decomposition product can be performed by adding an acid, such as acetic acid (and preferably food-grade acetic acid).

Alternatively, the invention provides a method wherein step (c-1) comprises or consists of altering the pH of the decomposition product to pH10 or more, for example more than pH11, pH12, pH13 or pH14. Achieving a highly basic pH can be performed by adding a base to the decomposition product, such as ammonia and/or sodium hydroxide (and preferably food-grade ammonia or sodium hydroxide).

For example, it is known that treatment at extremes of pH will inactivate bacteria and enzymes thereof (unless those bacteria are specifically adapted to such conditions).

Preferably, the invention provides a method according wherein step (c-1) is performed prior to, or after, step (c-2) or, alternatively, wherein steps (c-1) and (c-2) are performed simultaneously.

For example, the invention provides a method wherein step (c-2) is performed using a homogeniser; more preferably, an industrial food-processing homogeniser. Step (c-2) thoroughly washes the decomposition product, thereby removing all or substantially all of the one or more microbial agents and/or degradative enzymes thereof and/or nutritional components from the decomposition product. It will be understood that it is preferable to perform step (c-2) using homogenisation but that any method capable of achieving thorough washing could be used—for example, bulk extrusion.

Homogenisation and/or washing removes soluble substrates and the bulk of the microbial biomass, leaving only poorly degradable plant structure for the resulting plant growth medium. Furthermore, washing also reduces the conductivity of the resulting plant growth medium to levels which are acceptable for plant growth.

The rate, extent and nature of homogenisation may be used to control particle size, which can provide different functional properties of the resulting plant growth medium—for example, the degree of homogenisation can influence the moisture-retaining properties of the poorly-degraded material in the resulting plant growth medium. Preferably, homogenisation is performed to generate particle sizes of between 0.5 mm and 1 cm, but the range, and the actual particle size distribution may be altered if required (for example, if a plant growth medium of different particle size or consistency is required) by creating different fractions through using a range of substrates and homogenisation conditions. Fractions can be subsequently combined and blended depending on the requirement. Peat is often modified, graded and blended in this way.

Preferably, homogenisation is performed using a Silverson Head homogeniser and the decomposition product homogenised for a period ranging from 2 seconds to several minutes (for example, 3, 4, 5, 6, 7, 8, or 9 minutes)—it will be appreciated that the precise time used can be varied depending on the structure and composition of the decomposition product and the particle size or consistency that is desired. For example, shorter homogenisation times may be used if particles, such as fibres, of between 1 and 10 cm in length are required than the homogenisation times used to generate smaller particles of less than 1 cm in size.

Conveniently, the invention provides a method wherein step (c) further comprises sub-step (c-3) of treating the decomposition product to reduce the conductivity of the resulting plant growth medium. Plant growth media with high conductivity generally result in poor seed germination and/or plant growth. Preferably, conductivity is reduced by reducing the concentration and/or amount of salts in the decomposition product which, in one embodiment, is performed by homogenising the decomposition product in water, for example, using the homogenisation conditions in sub-step (c-2). Preferably, sub-steps (c-2) and (c-3) are performed in the same step or are performed sequentially.

It will be appreciated that sub-step (c-3) is an optional step that is only necessary if the decomposition product has a conductivity that is too high to support seed germination and/or plant growth. As shown in the accompanying Examples, the conductivity of peat is between 10 and 170 mS/m, depending on the source, which is therefore suitable for use as a plant growth medium. Preferably, the decomposition product has a conductivity between 10 and 170 mS/m and, if higher, further washing and/or homogenisation steps may be performed to reduce the conductivity.

Preferably, the invention provides a method wherein step (c) further comprises sub-step (c-4) of removing moisture from the decomposition product. It will be understood that, if a solid or substantially solid plant growth medium is desired, it may be necessary to remove moisture from the homogenised decomposition product. Any method capable of removing moisture from aqueous solution or semi-solid matter which are known in the art may be used but in practice a pressing system (such as a belt-pressing system for dewatering) is preferred, as is known in the art.

Preferably, sub-step (c-4) comprises removing the "free water" from the decomposition product, by which we include removing water to a level which is less than the natural absorbent capacity of the material. Removing the free water from the decomposition product confers resistance to further decomposition. Conveniently, the moisture content of the decomposition product following sub-step (c-4) is approximately 5%.

It will be understood that the plant growth medium of the invention is a structured substrate for use by the growing industry, and that it may be supplemented or mixed with other material (such as, for example other plant growth media and/or nutritional supplements) to produce a plant growth medium with desired characteristics.

Preferably, the invention provides a method wherein step (c) further comprises sub-step (c-5) of adding slow-release fertiliser to the decomposition product. More preferably, the slow-release fertiliser comprises or consists of potassium and/or nitrogen and/or phosphorous. It will be appreciated that other minerals may be added according to the requirements of the plants to be grown in the resulting plant growth medium, and which will be known to those skilled in the art.

For example, the invention provides a method wherein sub-steps (c-1) to (c-5) are performed sequentially. Preferably, sub-steps (c-1) and/or (c-2) and/or (c-3) are performed simultaneously. Conveniently, sub-steps (c-4) and (c-5) are performed simultaneously.

Preferably, the invention provides a method wherein the plant growth medium exhibits one or more of the following properties:
i) stable (i.e. no detectable decomposition or minimal detectable decomposition);
ii) a moisture retention of 55% or more at 0.1 bar; for example, 60% or 70% or 80% or 90% or more;
iii) a water potential of −2.08 MPa or more; for example, −1.50, −1.00, −0.50, −0.25 or more;
iv) pH6.5 or less; for example, pH6, pH5, pH4, pH3, pH2, pH1 or less;
v) an electrical conductivity of 422 mS/m or less; for example, 400 mS/m, 300 mS/m, 200 mS/m, 100 mS/m, 50 mS/m, 10 mS/m or less;
vi) a bulk density value of 200 g/L or more; for example, 295 g/L, 300 g/L, 400 g/L, 500 g/L, 600 g/L or more; vii) a lignin content of 40% or more; for example, 50%, 60%, 70%, 80%, 90% or more;
viii) an air-filled porosity value of less than 40%, for example, 30%, 27.9%, 25%, 20%, 10%, 5% or less.

By "no detectable decomposition" we include the meaning that no decomposition can be detected over a period of two or three days using any of the tests for monitoring or detecting decomposition described herein—for example, no ammonia production can be detected over a period of two to three days. By "minimal detectable decomposition" we include the meaning that decomposition can be detected using any of the tests described herein but at extremely low rates of decomposition, such as over a period of years, as is found in peat (which is essentially stable, but is still subject to minimal decomposition albeit over an extremely long geophysical period).

Stability may be determined using, for example, the Solvita test which evaluates ammonia generation, as described in the accompanying Examples. The plant growth medium of the invention is stable in view of the low levels of moisture, microbial agents and degradative enzymes thereof, and microbial nutrients.

By "moisture retention" we include the ability of a material, such as the plant growth medium of the invention, to hold water after being allowed to drain.

By "water potential" we include the availability of water within the material, such as the plant growth medium of the invention, as controlled by matric potential (i.e. the attraction of water in capillaries) and water activity (i.e. the attraction of water by virtue of dissolved solutes) which is the equilibrium relative humidity divided by 100. Water potential, $\Psi$, can be related back to water activity through the following equation:

$$a_w = \exp\frac{\Psi M w}{RT}$$

wherein: R is the universal gas constant; T is the absolute temperature in Kelvin; M is the molecular weight of water (g/mol) and $a_w$ is the water activity.

By "electrical conductivity" we include the ability to conduct electricity as measured with a conductivity meter. Preferably, the electrical conductivity of the plant growth medium of the invention is between 10 mS/m and 170 mS/m; conveniently between 10 mS/m and 150 mS/m; even more preferably between 50 and 85 mS/m.

By "bulk density" we include the mass of the material at a defined moisture content divided by the volume of the same material.

By "lignin content" we include the level of Lignin as measured by standard chemical methods such as the Klason method (i.e. "Mason lignin") and the DFRC method, as known in the art and described in the accompanying Examples.

By "air filled porosity value" we include the volume of air which the material holds after free-drainage of saturating water.

Methods for determining each of the above characteristics or properties of the plant growth medium are known in the art and are described in accompanying Examples.

Preferably, the plant growth medium of the invention comprises or consists of particles of 0.5 cm or less in length and/or diameter and/or a particles of 0.5 cm to 10 cm in length.

It will be understood that the interrelationship of each of the characteristics or properties of the plant growth medium described above, in addition to those characteristics themselves, is important in producing a plant growth medium.

In a preferred embodiment, the invention provides a method wherein the plant growth medium exhibits the following properties:
i) no detectable decomposition;
ii) a moisture retention of 74.5% at 0.1 bar;
iii) a water potential of −0.30 MPa;
iv) pH 4.43;
v) an electrical conductivity of 67 mS/m;
vi) a bulk density value of 598 g/L;
vii) a lignin content of 40%;
viii) an air-filled porosity value of 11.6%.

Preferably, the invention provides a method wherein the plant growth medium exhibits the following properties:
i) no detectable decomposition;
ii) a moisture retention of 55.4% at 0.1 bar;
iii) a water potential of −2.08 MPa;
iv) pH 5.87;
v) an electrical conductivity of 422 mS/m;
vi) a bulk density value of 441 g/L;
vii) a lignin content of 43%;
viii) an air-filled porosity value of 24.2%.

In a further aspect, the present invention provides a plant growth medium obtained or obtainable by the method of the invention. Preferably, the plant growth medium exhibits one or more of the following properties:
i) no detectable decomposition;
ii) a moisture retention of 55% or more at 0.1 bar; for example, 60% or 70% or 80% or 90% or more;
iii) a water potential of −2.08 MPa or more; for example, −1.50, −1.00, −0.50, −0.25 or more;
iv) pH6.5 or less; for example, pH6, pH5, pH4, pH3, pH2, pH1 or less;
v) an electrical conductivity of 422 mS/m or less; for example, 400 mS/m, 300 mS/m, 200 mS/m, 100 mS/m, 50 mS/m, 10 mS/m or less;
vi) a bulk density value of 295 g/L or more; for example, 300 g/L, 400 g/L, 500 g/L, 600 g/L or more;
vii) a lignin content of 40% or more; for example, 50%, 60%, 70%, 80%, 90% or more;
viii) an air-filled porosity value of less than 27.9%, for example, 20%, 10%, 5% or less.

Preferably, the plant growth medium of the invention exhibits the following properties:
i) no detectable decomposition;
ii) a moisture retention of 74.5% at 0.1 bar;
iii) a water potential of −0.30 MPa;

iv) pH 4.43;
v) an electrical conductivity of 67 mS/m;
vi) a bulk density value of 598 g/L;
vii) a lignin content of 40%;
viii) an air-filled porosity value of 11.6%.

Conveniently, the invention provides a method wherein the plant growth medium exhibits the following properties:
i) no detectable decomposition;
ii) a moisture retention of 55.4% at 0.1 bar;
iii) a water potential of −2.08 MPa;
iv) pH 5.87;
v) an electrical conductivity of 422 mS/m;
vi) a bulk density value of 441 g/L;
vii) a lignin content of 43%;
viii) an air-filled porosity value of 24.2%.

The invention provides a plant growth material that is a peat-substitute material, and methods for making the same.

As discussed above, and shown in the accompanying Examples, the present invention may be used to produce a plant growth medium having characteristics of peat (including its physical consistency, decomposition stability, bulk density, water potential, electrical conductivity, pH, composition, lignin content (particularly Klason lignin, which is defined as such by the method of measurement, as used in the accompanying Examples) and its biochemical and microbiological characteristics, among others, as shown in the Examples).

Thus, by "peat-substitute material" we include a material that exhibits the same characteristic or property as (or a substantial similarity to) one or more characteristic or property of peat, thereby allowing the peat-substitute material to be successfully or effectively used instead of peat in an application in which peat is typically used or required.

For example, the peat-substitute material of the invention may exhibit the same characteristic or property as (or a substantial similarity to) one or more characteristic or property of peat, such as those defined above and in the accompanying Examples, including its physical consistency, decomposition stability, bulk density, water potential, electrical conductivity, pH, composition, lignin content and its biochemical and microbiological characteristics, among others (as discussed above and in the Examples).

In a further aspect, the invention provides the use of a bioreactor for producing a plant growth medium, preferably by controlled decomposition and, conveniently, according to the method of the invention.

By "bioreactor" we include an enclosed (or partially enclosed) vessel capable of housing the bioorganic matter and the one or more microbial agents and providing a controlled environment.

In a further aspect, the invention provides a bioreactor suitable for, or capable of, performing the method of the invention. Preferably, the bioreactor is capable of providing a controlled environment for performing steps (a) and (b) of the method of the invention therein.

Preferably, the bioreactor comprises a vessel within which an amount bioorganic matter may be contacted with one or more microbial agents in a controlled environment. In a preferred embodiment, the means is a vessel, conveniently, an enclosed (or partially enclosed) vessel capable of housing bioorganic matter. Preferably, the vessel is sealable (i.e. capable of being sealed).

Preferably, the bioreactor or vessel capacity is at least 10 kg of bioorganic matter and/or decomposition product, for example at least 20 kg, 30 kg, 40 kg, 50 kg, 60 kg, 70 kg, 80 kg, 90 kg, 100 kg, 150 kg, 200 kg, 250 kg, 300 kg, 400 kg, 500 kg, 10 tonnes, 20 tonnes, 50 tonnes, 100 tonnes, 200 tonnes, 300 tonnes, 500 tonnes, 1,000 tonnes, 2,000 tonnes, 5,000 tonnes, 10,000 tonnes, 20,000 tonnes, 50,000 tonnes, 100,000 tonnes, 200,000 tonnes, 500,000 tonnes or more. Preferably, the amount of bioorganic matter provided in step (a) is at least 200 kg.

Conveniently, the bioreactor further comprises means for controlling one or more of the following parameters of the controlled environment: temperature; moisture content; $CO_2$ to $O_2$ ratio; pressure; shear; mixing.

Advantageously, the bioreactor comprises means for providing a controlled temperature and/or controlling temperature, such as a means for transferring heat to and/or from the bioorganic matter and/or decomposition product during the decomposition process, as required. Preferably, the bioreactor comprises a heat exchanger comprising or consisting of a pipe network within which heated or cooled liquid (i.e. coolant such as water or glycerol) is circulated; the temperature of the circulated liquid may be regulated externally by energy-using heaters/coolers. The bioreactor may further comprise a number of compartments for decomposition (for example, for bioorganic matter at different stages of decomposition to be housed), and heat may be transferred from exothermic compartments to those which require heating.

Preferably, the bioreactor comprises means for mixing the bioorganic matter and/or decomposition product during the decomposition process, thereby ensuring physical, microbiological, biological, chemical and environmental uniformity. Suitable means comprises a mechanical arm or fork capable of displacing and/or moving the bioorganic matter and/or decomposition product. Alternatively, the means comprises a rotation mechanism for rotating the vessel, thereby rotating and mixing the bioorganic matter and/or decomposition product therein. Preferably, the mixing means allows regular and uniform mixing of the bioorganic matter and/or decomposition product. The action of the mixing means within the bioreactor may generate shear force on the bioorganic matter and/or decomposition product leading to shearing of the bioorganic matter and/or decomposition product.

Preferably, the means for controlling moisture content comprises a pool or reservoir of liquid, such as water, within the vessel (preferably on the internal base of the vessel) and/or a means for introducing water into the vessel, thereby maintaining the moisture content of the bioorganic matter and/or decomposition product within the vessel. For example, the means may comprise:
i) an external reservoir capable of housing fluid, such as water;
ii) an inlet providing fluid communication between the outside and inside of the bioreactor;
iii) a pipe providing fluid communication between the external reservoir and the inlet,
iv) a pump capable of pumping fluid from the external reservoir into the bioreactor.

Conveniently, the means for controlling the $CO_2$ to $O_2$ ratio comprises a means for introducing gas into the vessel and/or releasing gas from the vessel. For example, the means for introducing gas into the vessel comprises:
v) an external reservoir capable of housing gas;
vi) an inlet providing gaseous communication between the outside and inside of the bioreactor;
vii) a pipe providing gaseous communication between the external reservoir and the inlet,
viii) a pump capable of pumping gas from the external reservoir into the bioreactor.

Preferably, the bioreactor further comprises means for removing gas and/or liquid (such as waste or excess gas or liquid generated during the decomposition process) from the bioreactor. For example, the bioreactor may comprise one or more pipes in gaseous communication with the inside and outside of the bioreactor for removing waste gas from the bioreactor (such as ammonia and/or $CO_2$) and/or one or more pipes in fluid communication with the inside and outside of the bioreactor for removing waste liquid from the bioreactor (such as excess moisture and/or liquid decomposition products). Preferably, gaseous and/or liquid communication between the inside and outside of the bioreactor is regulated (for example, by one or more pump or valve) such that the flow rate and/or amount of gas and/or liquid being removed from the bioreactor is controlled.

Preferably, the bioreactor further comprises means for controlling and/or monitoring the amount, flow rate, temperature, $CO_2$ to $O_2$ ratio, moisture content and composition of the gas being introduced and/or removed from the bioreactor. Conveniently, the bioreactor further comprises means for monitoring the amount, flow rate, temperature, $CO_2$ to $O_2$ ratio and composition of the liquid being introduced and/or removed from the bioreactor. Suitable means are known in the art and described in the accompanying Examples.

The flow rate and amount of gas being introduced or removed from the bioreactor may be measured using a flow meter on the inlet or exhaust port of the bioreactor, respectively.

The flow rate and amount of liquid being introduced or removed from the bioreactor may be measured using a flow meter on the inlet or exhaust port of the bioreactor, respectively.

Preferably, the bioreactor further comprises means for controlling and/or monitoring one or more of the following parameters of the controlled environment within the bioreactor: temperature; moisture content; $CO_2$ to $O_2$ ratio; pressure; shear; mixing.

Conveniently, the means for monitoring temperature is a thermometer positioned within the bioreactor, either on an interior surface of the bioreactor or, for example, located within the bioorganic matter itself (i.e. a floating sensor). Such thermometers and sensors are known in the art.

Advantageously, the means for monitoring moisture content is a humidity sensor, which are known in the art (such as those manufactured by Vaisala).

Preferably, the means for monitoring the $CO_2$ to $O_2$ ratio comprises an infra-red sensor for monitoring $CO_2$ and a paramagnetic sensor for measuring $O_2$. Suitable infra-red sensors and paramagnetic sensors are known in the art, such as those manufactured by ADC Limited and Servomex Limited, respectively.

As discussed above, preferably the bioreactor is an enclosed (or partially enclosed) vessel and/or is sealable, thereby permitting the bioreactor to be pressurised. Advantageously the bioreactor is maintained at atmospheric pressure (i.e. a pressure of one atmosphere).

As discussed above, in a preferred embodiment, the bioreactor further comprises mixing means within the bioreactor which may generate shear force on the bioorganic matter and/or decomposition product leading to shearing of the bioorganic matter and/or decomposition product. The amount of shear force may be controlled by controlling the action of the mixing means within the bioreactor. In one embodiment, the amount of shear force may be maintained at a low or undetectable level, resulting in minimal shearing of the bioorganic matter and/or decomposition product.

In a preferred embodiment, the bioreactor further comprises a control panel for monitoring and/or controlling one or more of the following parameters of the controlled environment: temperature; moisture content; $CO_2$ to $O_2$ ratio; pressure; shear; mixing. Preferably, the conditions are controlled by computer hardware and software capable of providing an electronic readout displaying details of the conditions in the bioreactor and/or the gases and/or liquids entering or exiting the bioreactor.

It will be understood that there are already many commercial designs of enclosed composting systems, often including mixing and aeration. However, those systems have been developed to accelerate the decomposition process in order to compost matter as a waste disposal approach. No such systems have been used for the production of a plant growth medium.

Preferably, the invention provides the use wherein the plant growth medium is produced by the method of the invention, and preferably by controlled decomposition.

In a further aspect, the invention provides a kit for performing the method of the invention comprising one or more of the following:

a) a vessel for contacting bioorganic matter with one or more microbial agents capable of degrading the bioorganic matter to produce a decomposition product;

b) bioorganic matter as defined herein;

c) one or more microbial agents selected from the group consisting of pseudomonas species, aerobic thermophilic bacteria, aerobic mesophilic bacteria, microaerophilic bacteria, strict anaerobic bacteria, yeasts and moulds; and d) instructions for performing the method as defined herein.

In a preferred aspect, the invention provides a bioreactor wherein the plant growth medium is a peat-substitute material.

Advantageously, the invention provides a kit wherein the vessel in (i) is a bioreactor. More preferably, the bioreactor allows one or more of the following parameters to be controlled: temperature, moisture content, levels of $CO_2$ and/or $O_2$, aeration, mixing. Conveniently, the vessel in (i) is a bioreactor according to the invention.

For example, the invention provides a kit further comprising means for treating a bioorganic decomposition product to inhibit the degradation process prior to its completion. More preferably, the means for treating the decomposition product is a homogeniser, conveniently an industrial food-processing homogeniser.

As discussed above, a preferred feature of the method of the invention comprises thoroughly washing the decomposition product, thereby removing all or substantially all of the one or more microbial agents and/or degradative enzymes thereof and/or nutritional components from the decomposition product. It will be understood that it is preferable to perform step (c-2) using homogenisation but that any method capable of achieving thorough washing could be used—for example, bulk extrusion.

Preferably, the invention provides a kit wherein the means for treating the decomposition product further comprises a pressing system. As discussed above, a preferred feature of the method of the invention comprises removing moisture from the homogenised decomposition product. It will be understood that any method capable of removing moisture from aqueous solution or semi-solid matter which are known in the art may be used but in practice a pressing system (such as a belt-pressing system for dewatering) is preferred.

In a preferred embodiment, the invention provides a kit further comprising a means for analysing a sample of decomposition product to determine the level of decomposition.

As discussed above, the level or extent of decomposition may be determined by measuring the ammonia and/or $CO_2$ produced during the decomposition process.

Accordingly, in a preferred embodiment, the means for analysing a sample of decomposition product to determine the level of decomposition comprises a means for analysing the ammonia and/or $CO_2$ level or concentration of the decomposition product or the output from the decomposition process. Kits and/or apparatus for detecting those chemicals are well known in the art—for example, $CO_2$ may be measured using an infra-red sensor for monitoring $CO_2$ and ammonia may be measured using an ammonia electrode or using the Solvita test (as described above and in the accompanying Examples).

Alternatively, as described above, the level or extent of decomposition may be determined by homogenising the decomposition product to determine whether the resulting washed product has suitable levels of microbial agents and enzymes thereof and/or structure for use as a plant growth medium. Thus, in another preferred embodiment, the means for analysing a sample of decomposition product to determine the level of decomposition comprises a homogeniser, such as an industrial food homogeniser.

As discussed above, in one embodiment, the plant growth material is a peat-substitute material which, in view of its similar or identical properties or characteristics to peat, allows it to be used instead of peat in applications that typically use peat.

Thus, in one embodiment, the invention provides the use of a peat-substitute material as a fuel (for example, as a biofuel). It is well known that peat can be used as a solid or substantially-solid fuel that is burned to generate energy (for example, in power stations to generate electricity). Accordingly, the peat-substitute material of the invention can be used as a solid or substantially solid fuel (for example, a biofuel), that is burned to generate energy, as shown in the accompanying Examples and Figures. For example, the peat-substitute material of the invention may be burned in power stations to generate electricity, and use of the peat-substitute material in that manner will therefore reduce reliance on energy-generation using non-renewable energy sources, such as peat and fossil fuels (for example, natural gas and coal).

It will be appreciated that the peat-substitute material of the invention may need to be treated to remove sufficient liquid or moisture to permit its combustion before it can be used as a solid or substantially solid fuel (such as a biofuel); methods for doing so are provided by the present invention.

In another embodiment, the invention provides the use of a peat-substitute material as a product for storing and/or sequestering carbon. It is well known that peat is a carbon-containing material in which carbon has been stably stored or sequestered for many thousands of years.

As shown in the accompanying Examples, the plant-growth material of the invention also contains carbon, and typically a high percentage of the total composition of that material is carbon. For example, FIG. 42 demonstrates that food-waste windrow-derived material at 50-60 days comprises lignin at around 42% and FIGS. 40A and 45 additionally show that the cell-wall sugars make up approximately 30-50% of the composition of the material (of which around half is glucose and the remainder predominantly arabinoxylan hemicelluloses)—both the lignin and carbohydrate are rich in carbon. Material having a similar composition is also generated using the bioreactor (see, for example, section 3.2.5.3.).

Thus, the peat-substitute material of the invention provides a product that is rich in carbon—furthermore, the stability of that material to microbial degradation make it suitable for storing that material (and, accordingly, the sequestered carbon) on a long-term (e.g. geo-physical) time-scale. Storage of the material could, for example, be performed in underground mines.

Thus, in an embodiment, the present invention may be used to sequester carbon obtained from bioorganic matter (such as plant matter) into a stable product that can be stored, thereby removing carbon from the carbon cycle (and potentially providing a means for reducing levels of atmospheric carbon dioxide responsible for global warming).

In a further embodiment, the invention provides the use of a peat-substitute material in the production of a liquid fuel (for example a biofuel), preferably a bio-alcohol such as bio-ethanol.

As discussed above and in the accompanying Examples, the plant growth medium of the invention comprise or contain ligno-cellulosic material, typically in substantial quantities and/or concentration. It is now recognised that ligno-cellulosic material is an important substrate for bio-alcohol production, the lignin component being potentially available (once the carbohydrate has been removed for fermentation) to act as a source of fuel to provide heat to the bio-alcohol (such as bio-ethanol) production and distillation process (see, for example, *Biofuels, Advances in Biochemical Engineering/Biotechnology*, 108; series editor—T. Scheper, volume editor—L. Olssen; Springer-Verlag Pub., Berlin Heidelberg, 2007, ISBN: 978-3-540-73650-9; and references contained therein).

Thus, the peat-substitute material also has potential application as: (a) a substrate for generating liquid biofuel (such as bio-ethanol); (b) as a plant growth material; (c) a solid biofuel and/or a liquid biofuel; and (d) a product in which carbon is sequestered.

The listing or discussion of an apparently prior-published document in this specification should not necessarily be taken as an acknowledgement that the document is part of the states of the art or is common general knowledge.

Preferred, non-limiting examples which embody certain aspects of the invention will now be described, with reference to the following figures:

FIG. 1: Sphagnum moss at the surface of the peat bog.

Figure 2:
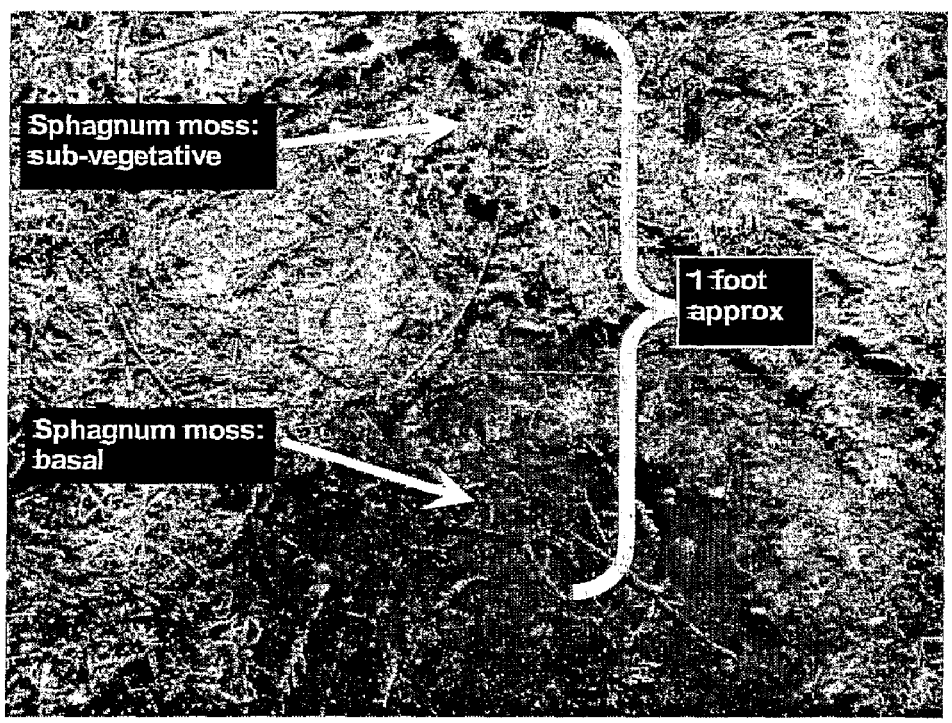

FIG. 2: Sub-layers of semi-degraded moss at the surface of the peat bog, undergoing initial stages of humification.

Figure 3:
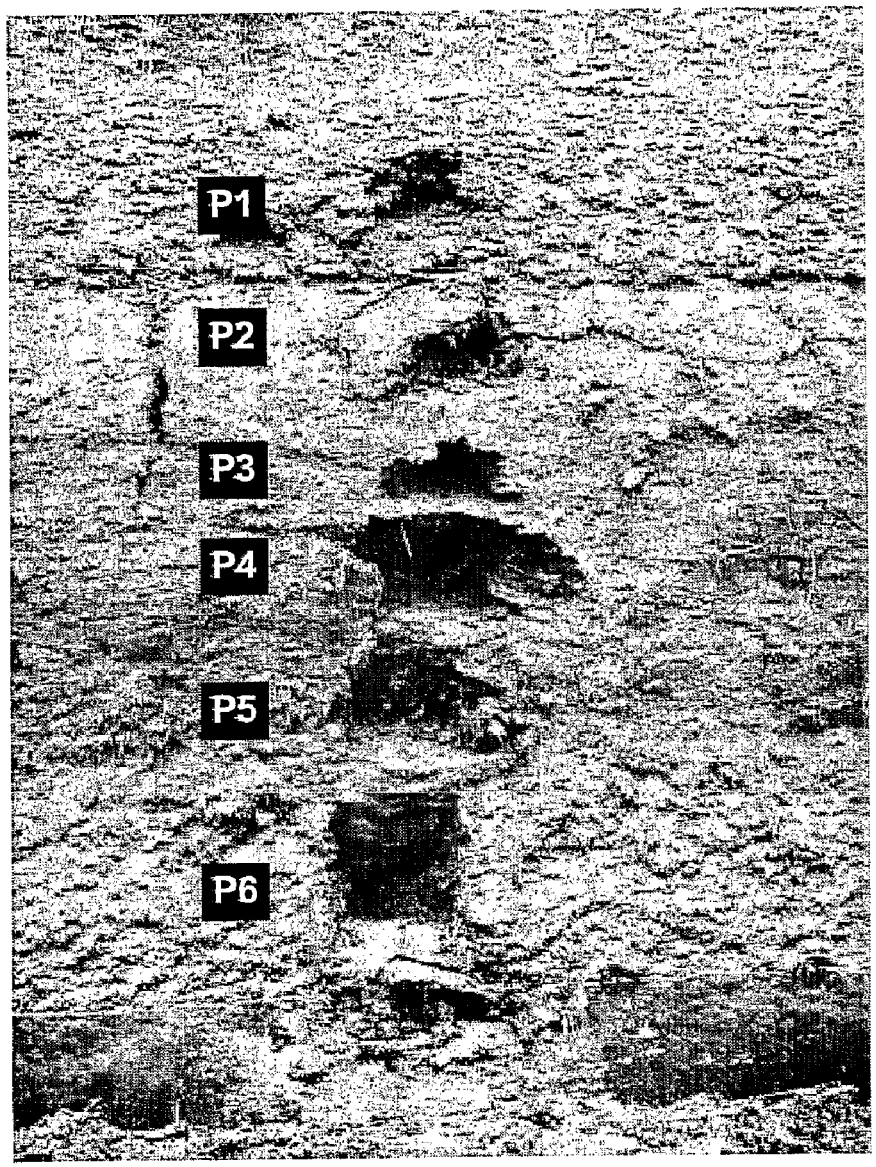

FIG. 3: Positions of sampling throughout 1.5 m bog section.

Figure 4:
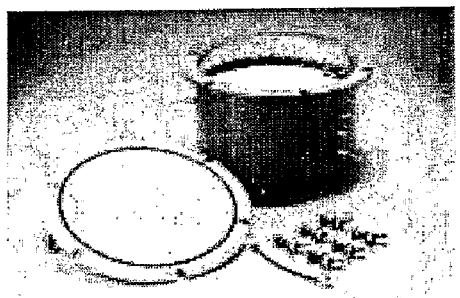

FIG. 4: Pressure plate apparatus.

Figure 5:
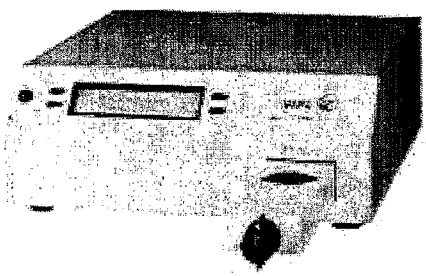

FIG. 5: Dewpoint potentiometer.

Figure 6:
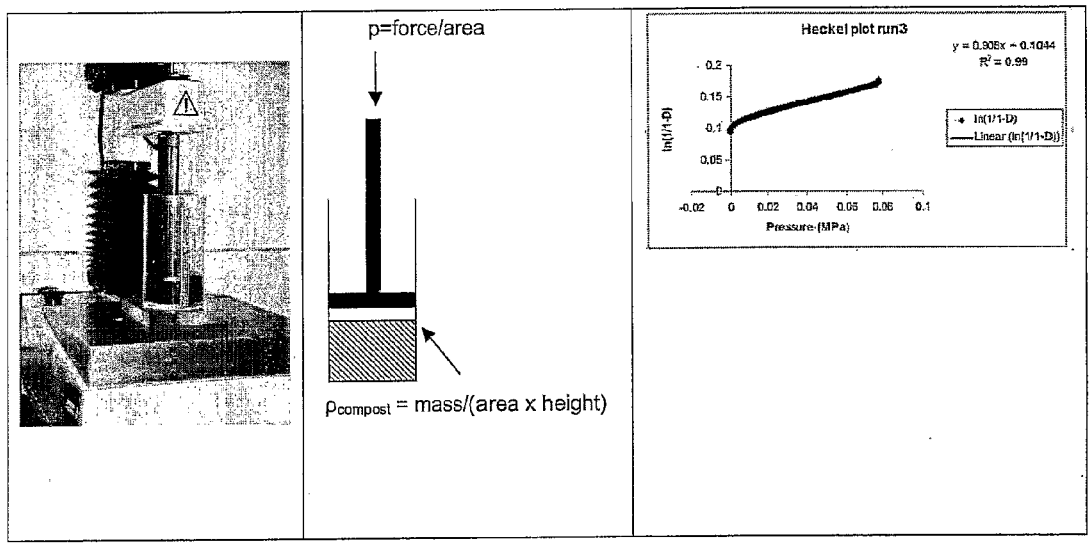

FIG. 6: Compaction measurement.

Figure 7:
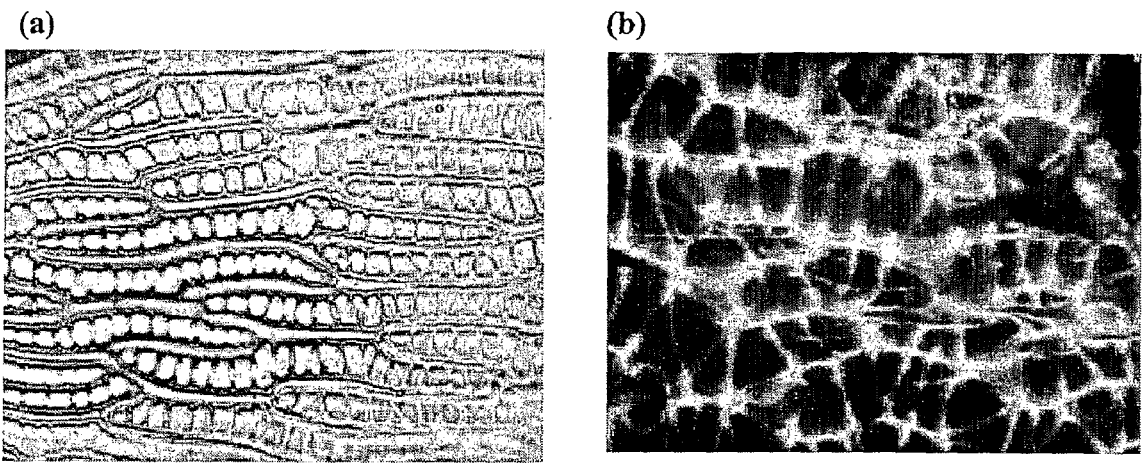

FIG. 7: Examples of light and fluorescent micrographs of sphagnum tissues from Ballycommon peat indicating cell wall phenolics—(a) Light micrograph; (b) Fluorescence micrograph FIG. 8: Examples of fluorescent micrographs of peat from Newferry bog, Bellaghy indicating cell wall phenolics—(a) Sphagnum-derived (layer 4); (b) Grass-derived (layer 5).

Figure 9:
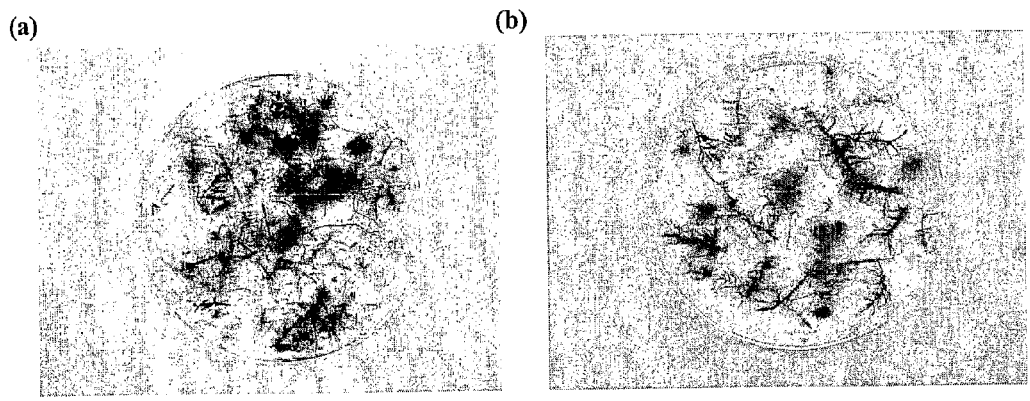
Figure 9:
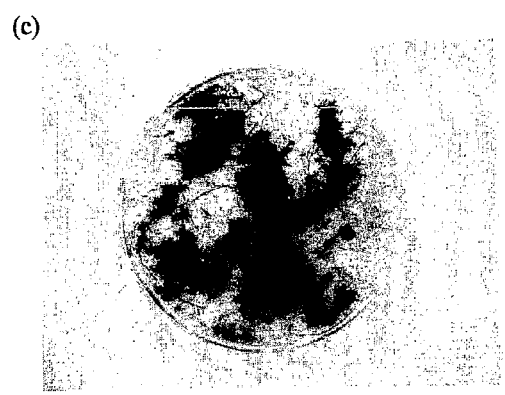

FIG. 9: Light micrographs of aerial materials from Newferry bog, Bellaghy peat bog—(a) Aerial sphagnum moss; (b) root area; (c) Basal area.

Figure 10:
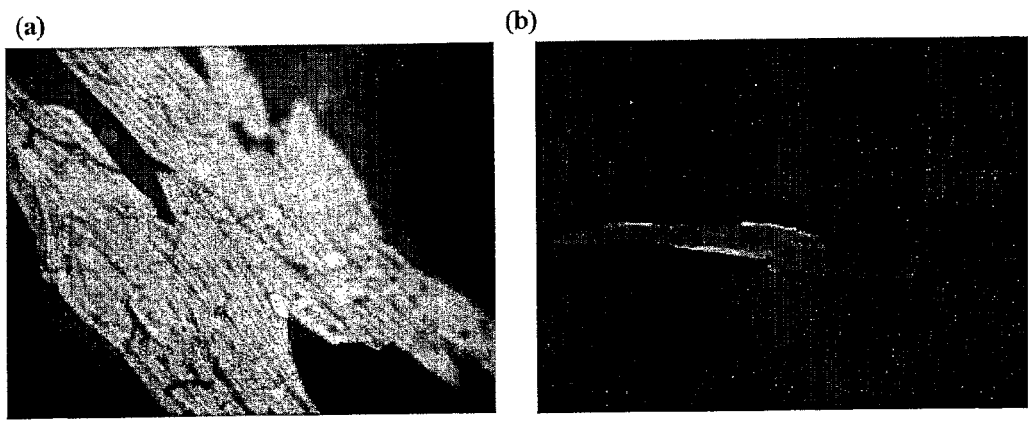

FIG. 10: Examples of light and fluorescent micrographs of woody residues from commercial growing media—(a) Woody fragments; (b) fibre.

Figure 11:
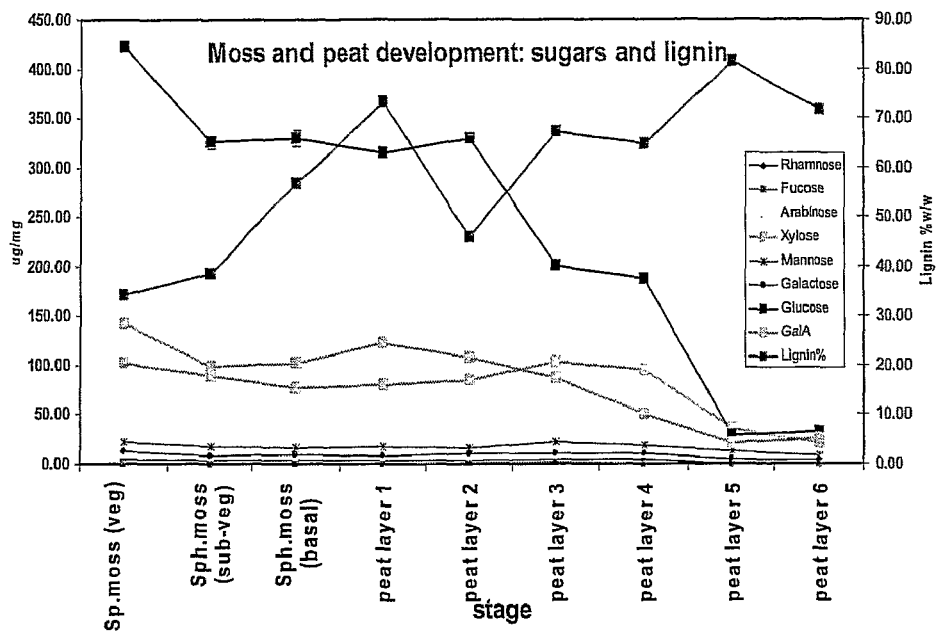

FIG. 11: Cell wall carbohydrate and lignin composition of descending moss and peat layers.

Figure 12:
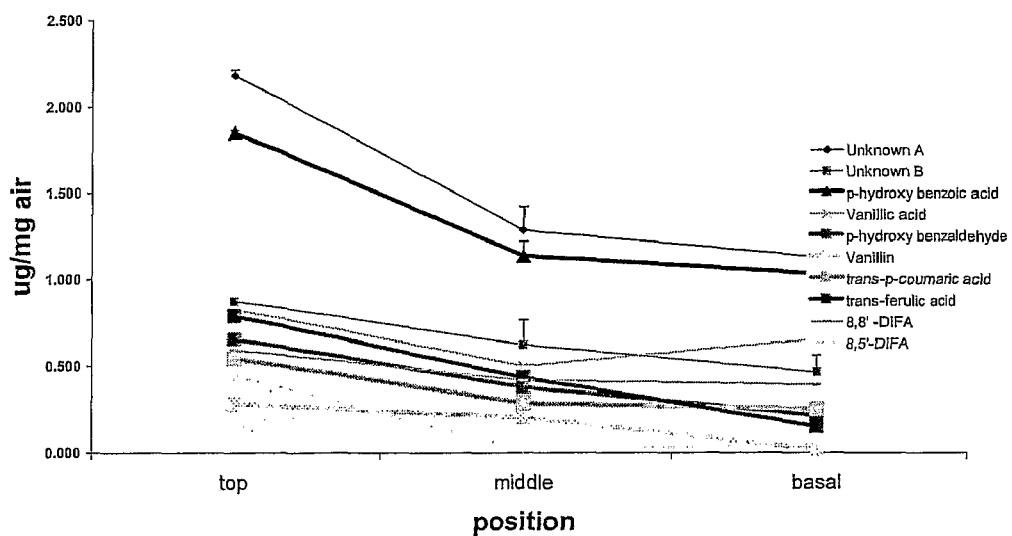

FIG. 12: Cell wall phenolic ester in descending peat layers.

Figure 13:
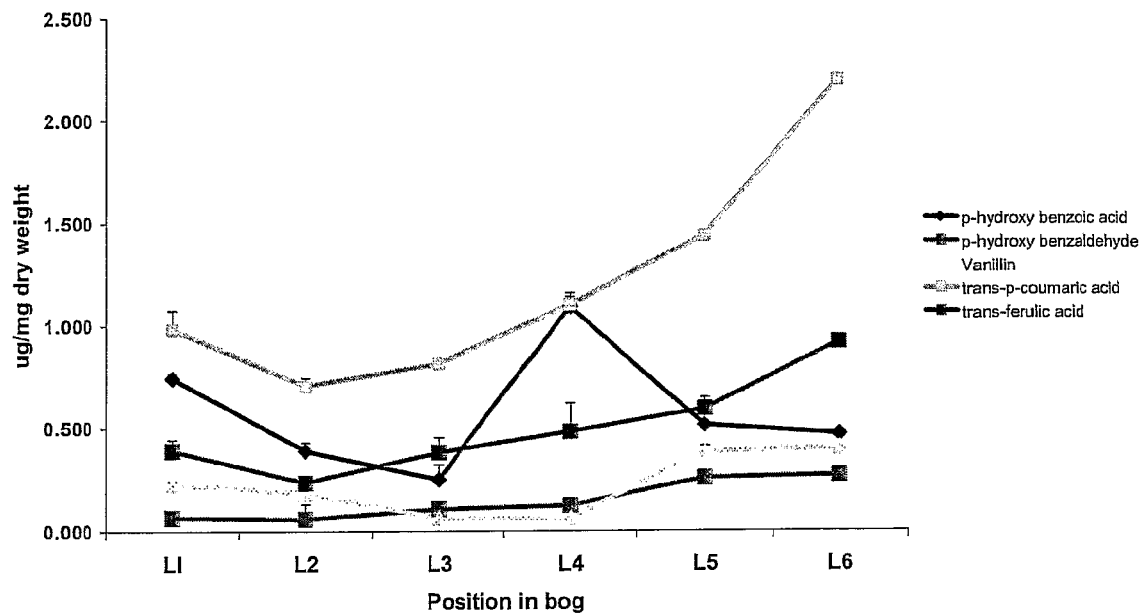

FIG. 13: Phenolic composition of peat samples from different depths of peat bog.

Figure 14:

FIG. 14: Typical 25-30 m³ windrow.

Figure 15:
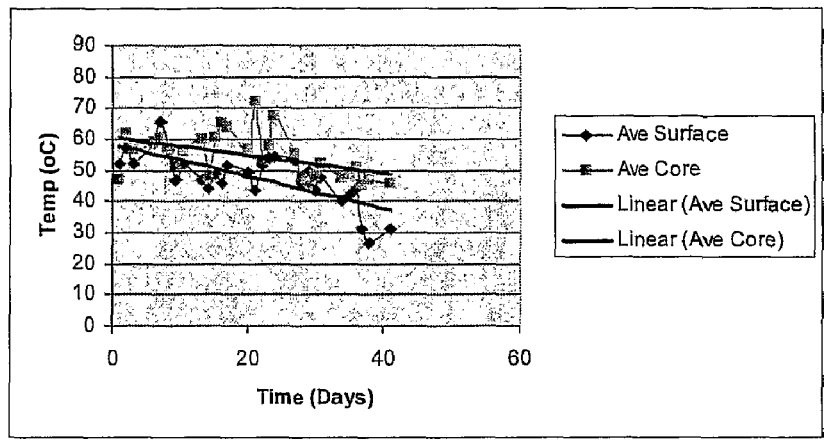

FIG. 15: Average surface and core temperatures (and linear regression fits of these temperatures) in the first trial windrow composed of onion and straw.

Figure 16:
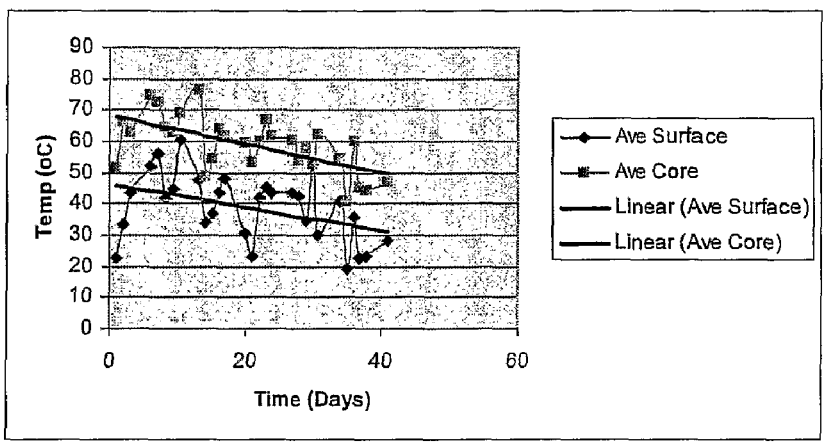

FIG. 16: Average surface and core temperatures (and linear regression fits of these temperatures) in the first trial windrow composed of leafy greens and straw.

Figure 17:
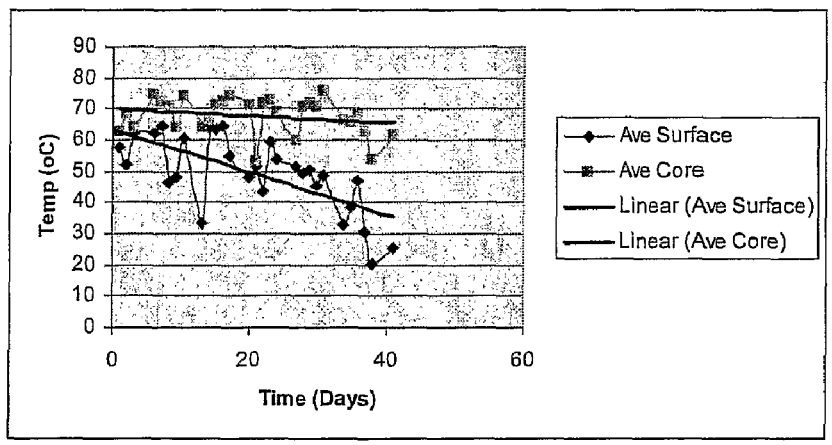

FIG. 17: Average surface and core temperatures (and linear regression fits of these temperatures) in the first trial windrow composed of brewers' spent grain and straw.

Figure 18:
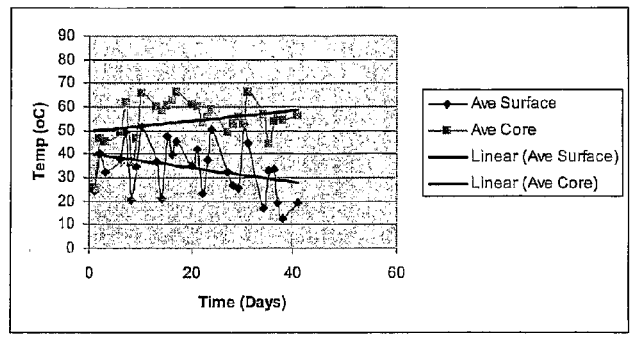

FIG. 18: Average surface and core temperatures (and linear regression fits of these temperatures) in the first trial windrow composed of melon and straw.

Figure 19:
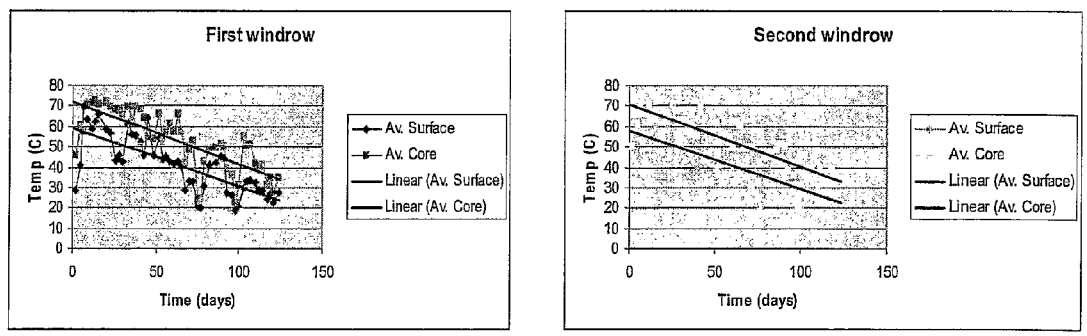

FIG. 19: Average surface and core temperatures (and linear regression fits of these temperatures) in the second trial windrow composed of brewers' spent grain, straw and leaf (Brewer's Grain+Leaf 1).

Figure 20:
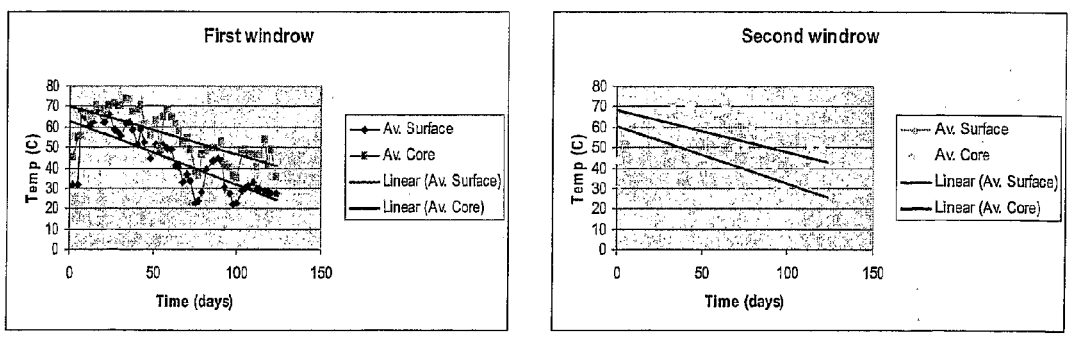

FIG. 20: Average surface and core temperatures (and linear regression fits of these temperatures) in the second trial windrow composed of brewers' spent grain, straw and leaf (Brewer's Grain+Leaf 2).

Figure 21:
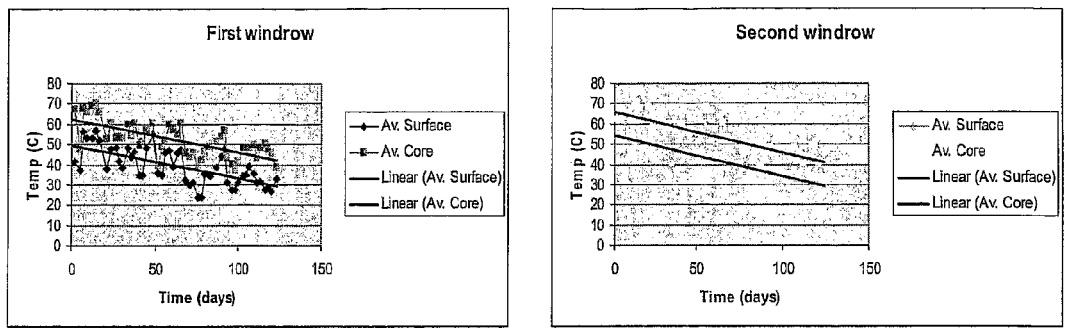

FIG. 21: Average surface and core temperatures (and linear regression fits of these temperatures) in the second trial windrow composed of brewers' spent grain and straw (Brewer's Grain mix).

Figure 22:
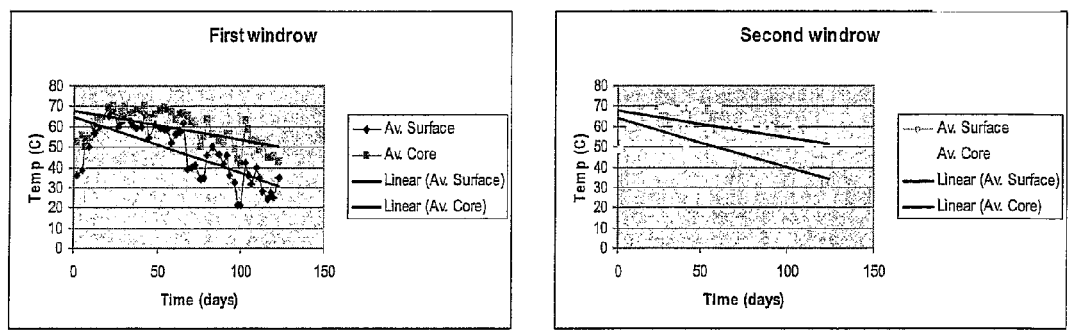

FIG. 22: Average surface and core temperatures (and linear regression fits of these temperatures) in the second trial windrow composed of brewers' spent grain and straw (High Brewer's Grain test).

Figure 23:
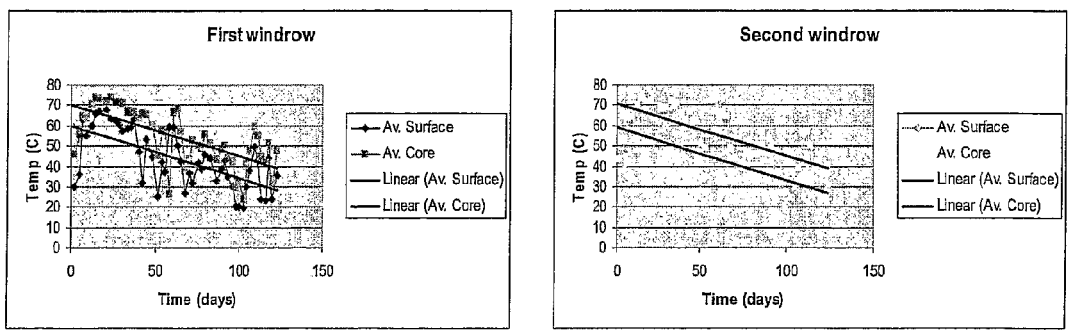

FIG. 23: Average surface and core temperatures (and linear regression fits of these temperatures) in the second trial windrow composed of brewers' spent grain, straw and fruit (Brewer's Grain+Fruit 1).

Figure 24:
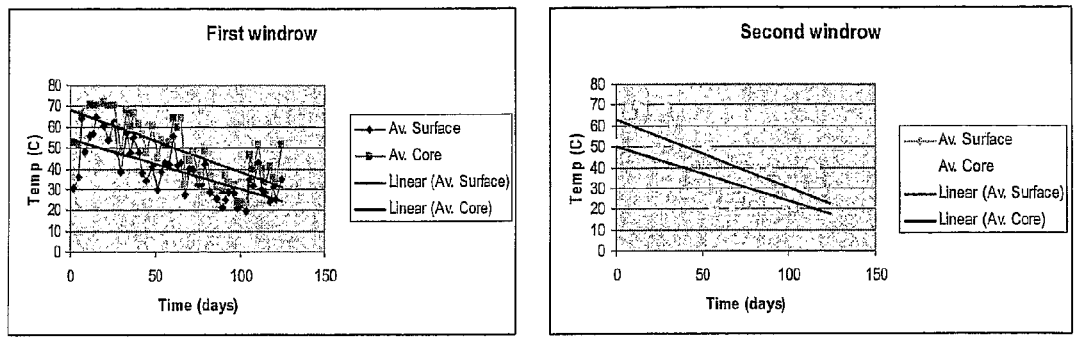

FIG. 24: Average surface and core temperatures (and linear regression fits of these temperatures) in the second trial windrow composed of brewers' spent grain, straw and fruit (Brewer's Grain+Fruit 2).

Figure 25:
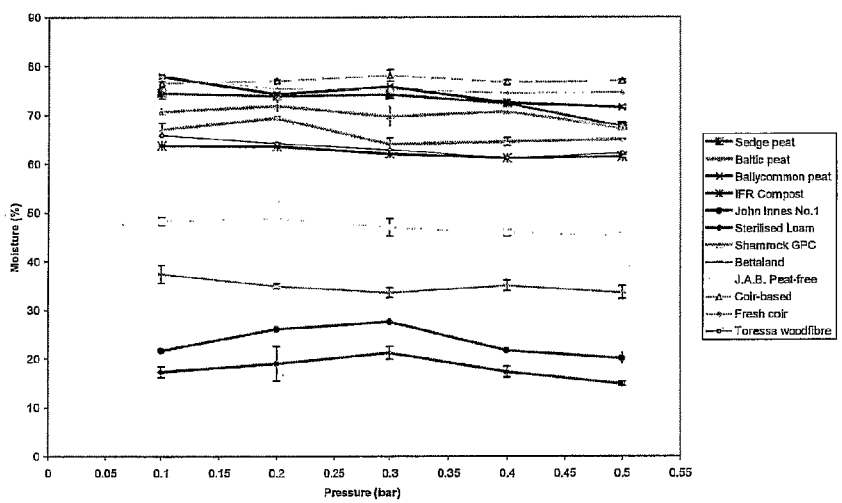

FIG. 25: Water availability characteristics of a range of peats and growing media.

Figure 26:
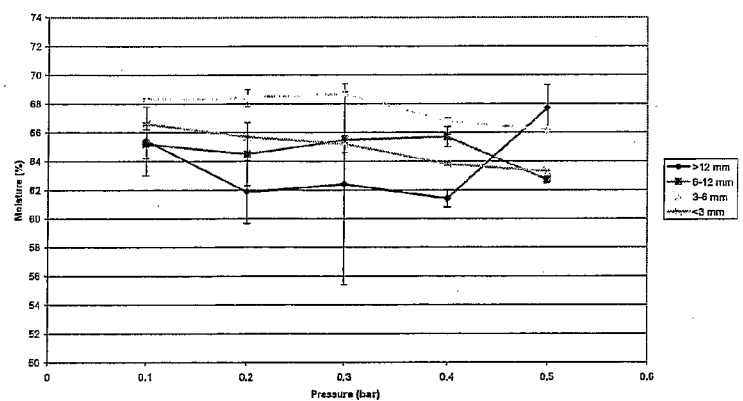

FIG. 26: Water availability curves for sieved fractions from IFR compost (28 Feb. 2005).

Figure 27:
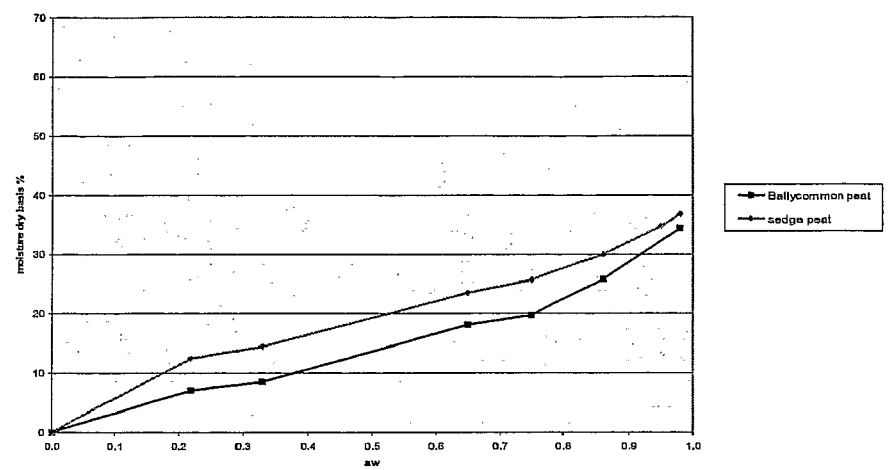

FIG. 27: Sorption isotherms for Ballycommon & sedge peats.

Figure 28:
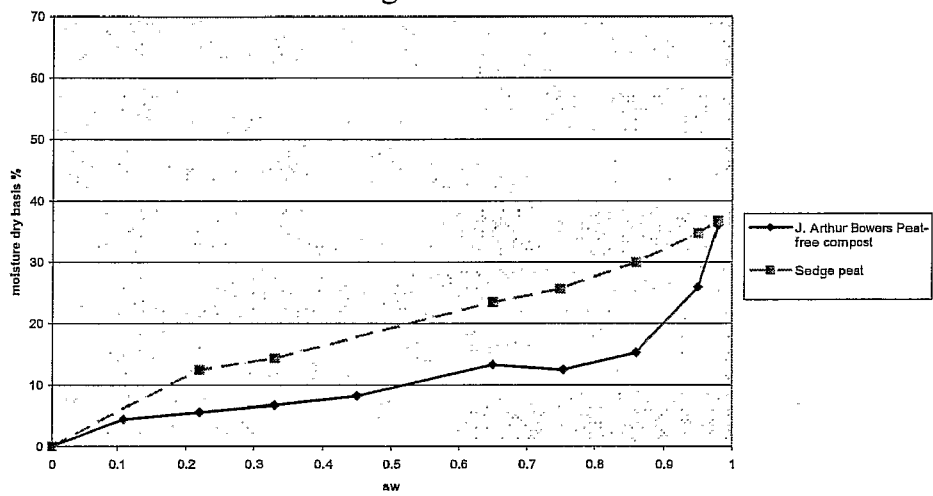

FIG. 28: Sorption isotherm for J. Arthur Bowers Peat-free compost.

Figure 29:
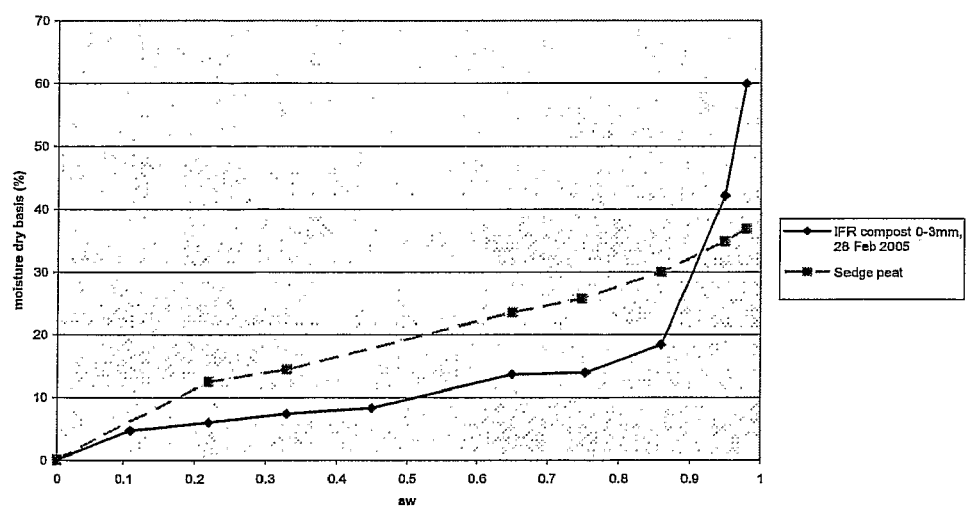

FIG. 29: Sorption isotherm for IFR compost (0-3 mm, 28 Feb. 2005).

Figure 30:
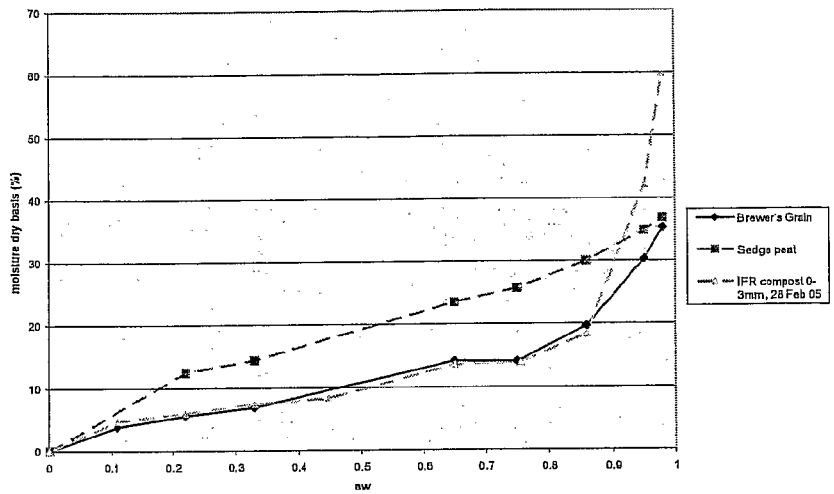

FIG. 30: Sorption isotherm for Brewer's Grain.

Figure 31:
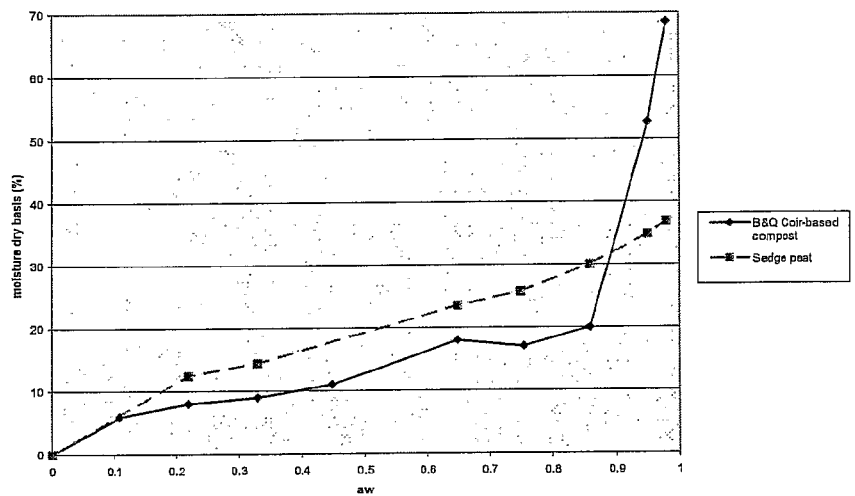

FIG. 31: Sorption isotherm for B&Q coir-based compost.

Figure 32:
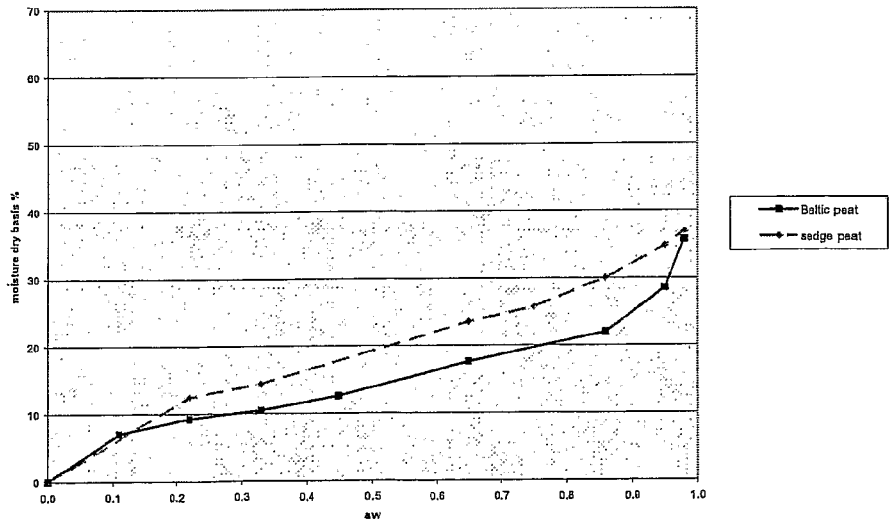

FIG. 32: Sorption isotherm for Baltic peat.

Figure 33:
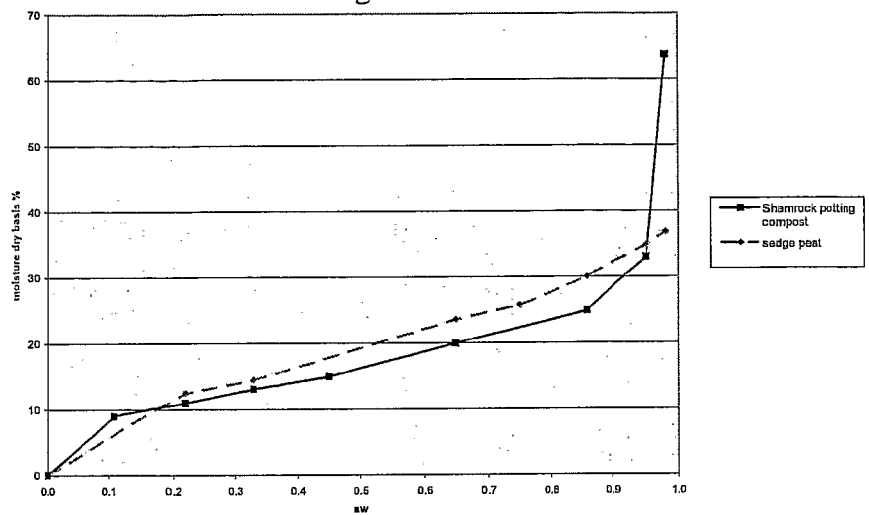

FIG. 33: Sorption isotherm for Shamrock potting compost.

Figure 34:
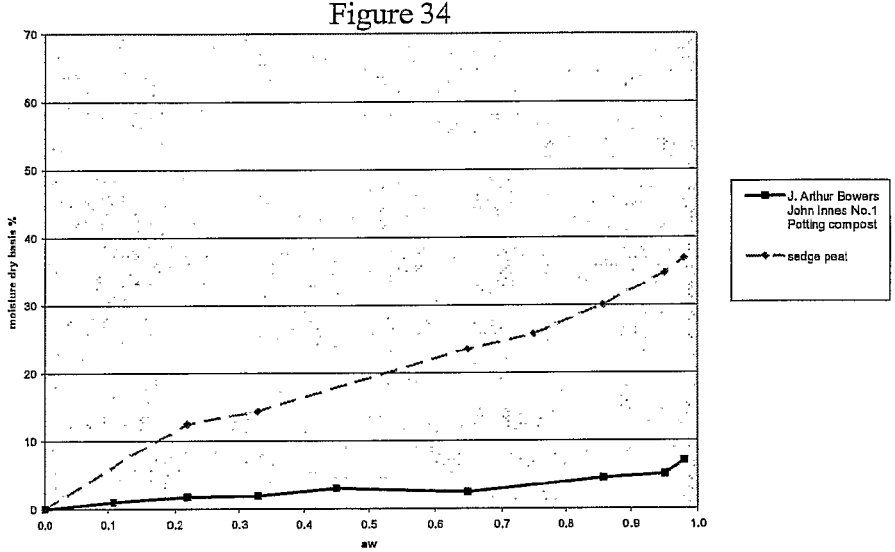

FIG. 34: Sorption isotherm for J. Arthur Bowers John limes No. 1 potting compost.

Figure 35:
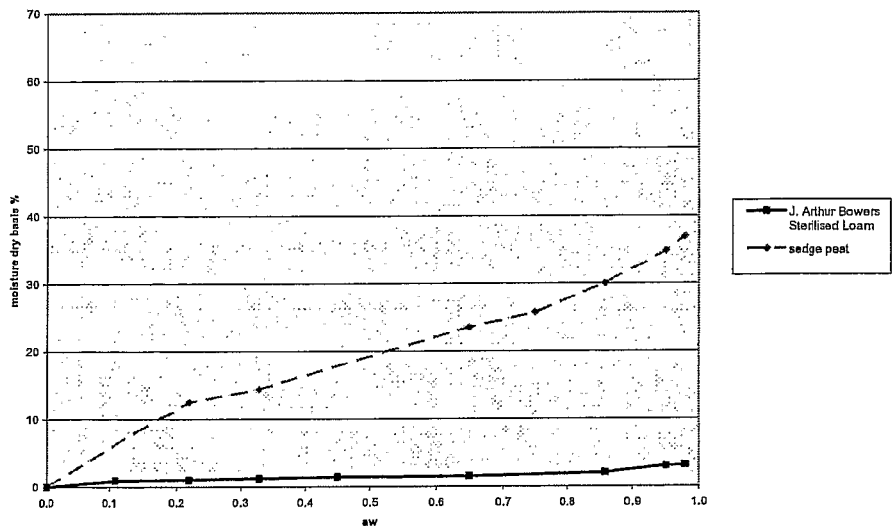

FIG. 35: Sorption isotherm for J. Arthur Bowers Sterilised loam.

Figure 36:
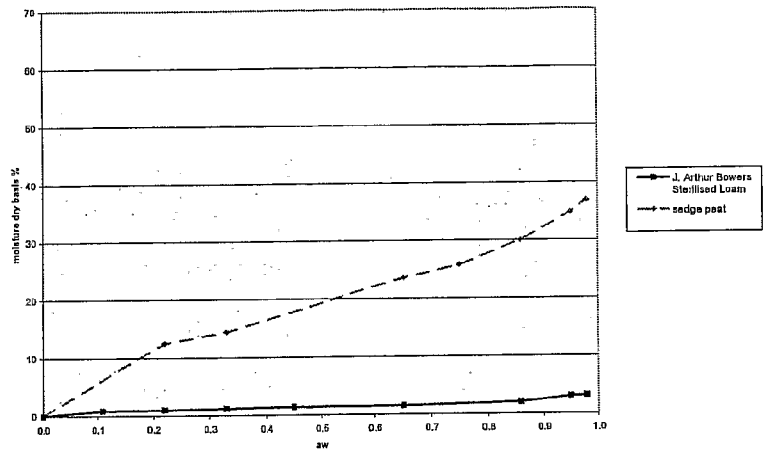

FIG. 36: Sorption isotherm for J. Arthur Bowers Sterilised loam.

Figure 37:
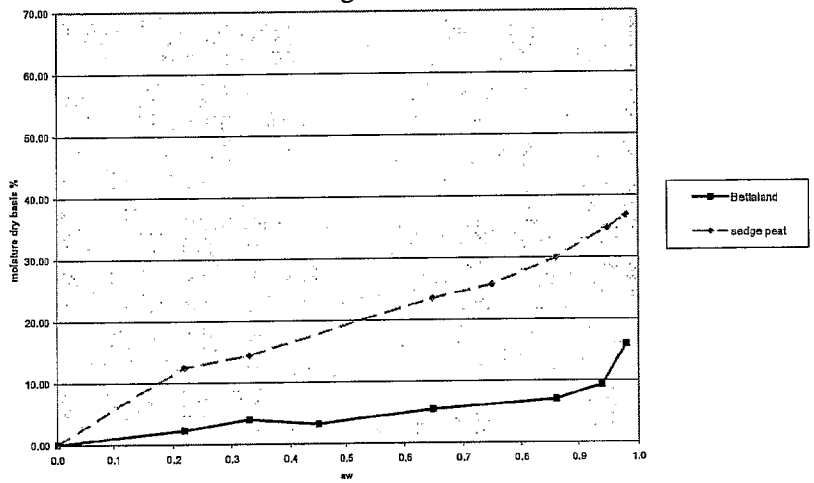

FIG. 37: Sorption isotherm for Bettaland compost.

Figure 38:
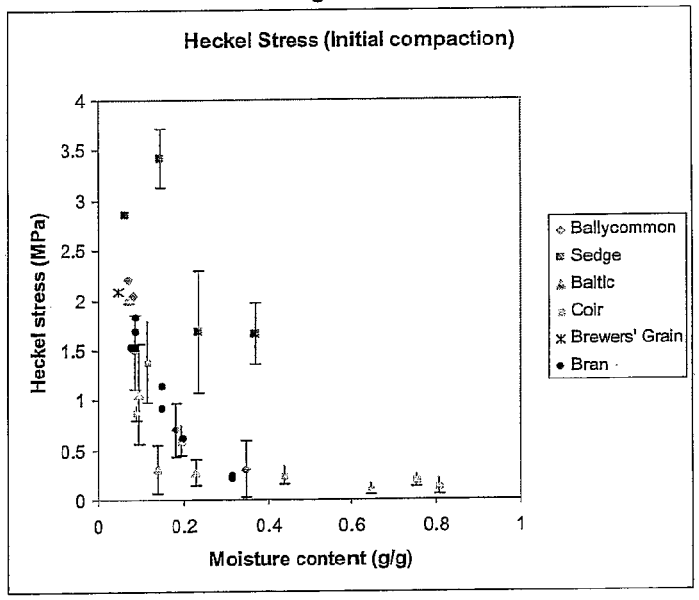

FIG. 38: Compaction data.

FIG. 39: Particle size distributions of selected samples.

FIG. 40: Changes in cell wall composition of composted food processing wastes and straw. Key to main lines: Dark blue: glucose; Light blue: xylose; Yellow: arabinose.

Figure 41:
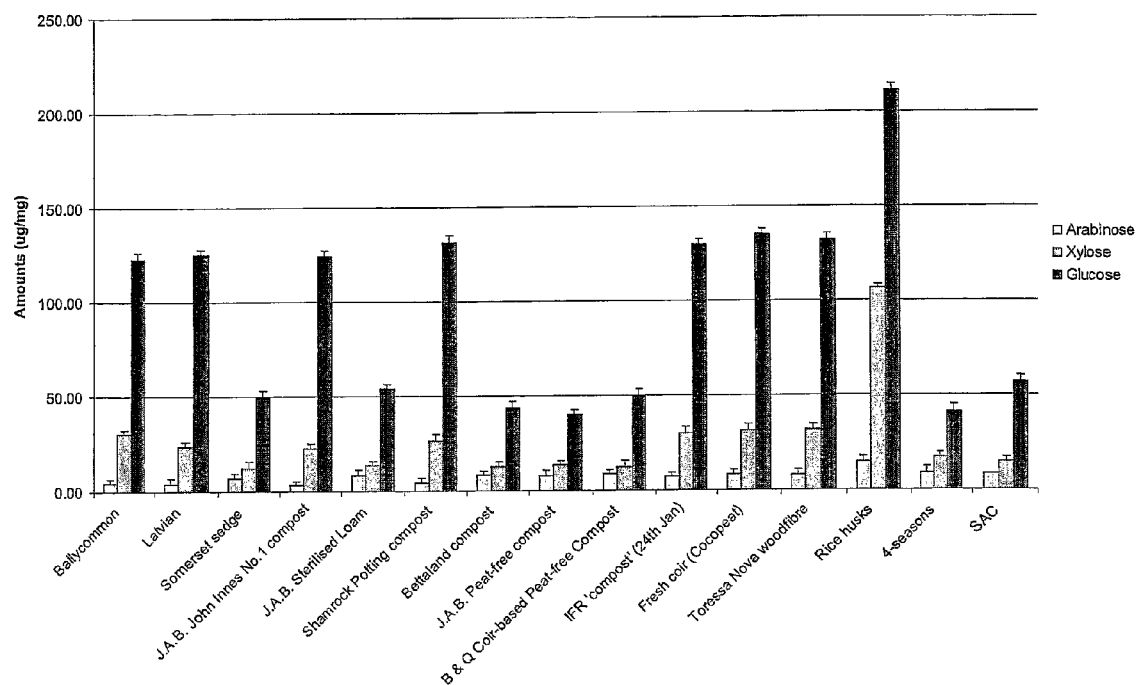

FIG. 41: The amount of sugars present in AIRs of commercially available growing media and IFR compost samples A-D.

Figure 42:
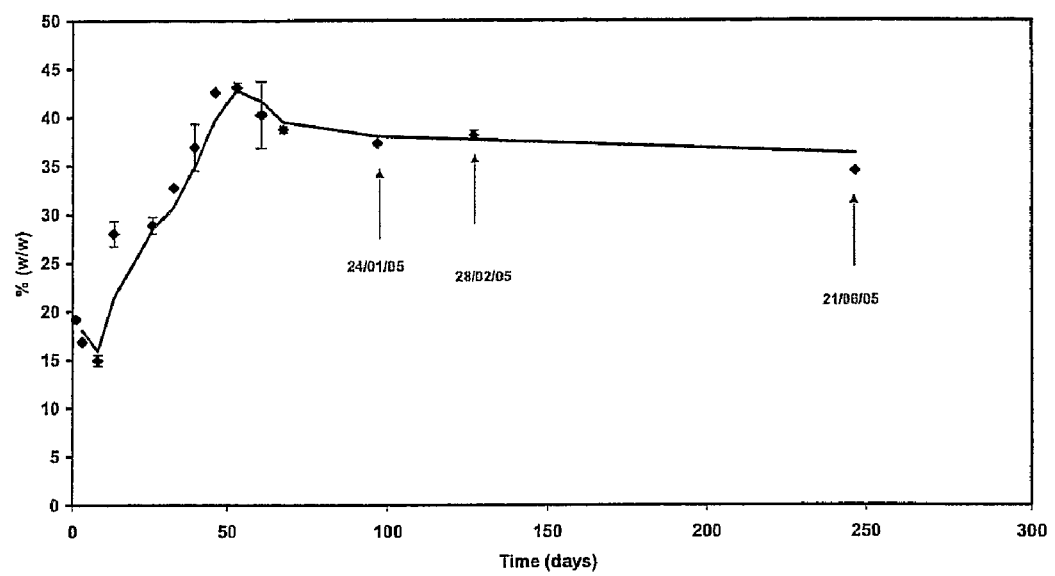
Figure 42:
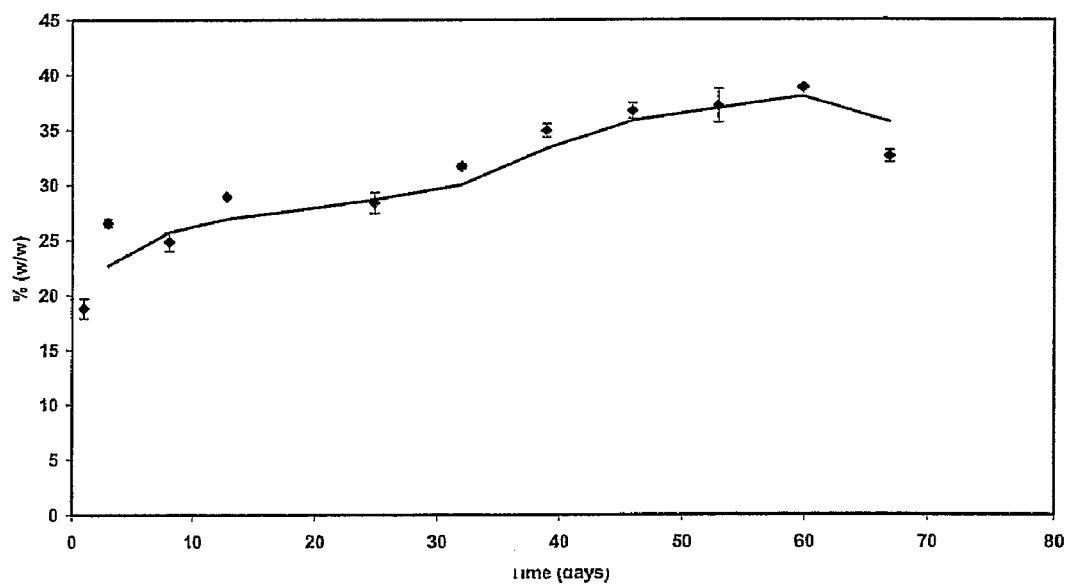

FIG. 42: Klason lignin in Brewer's Grain windrow compost.

Figure 43:
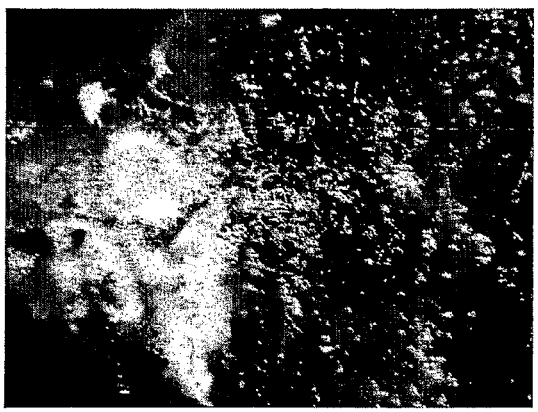
Figure 43:
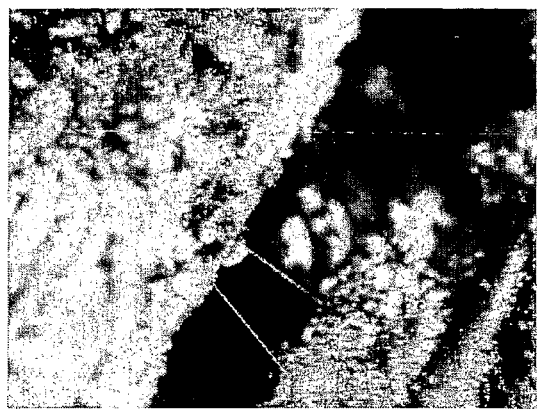
Figure 43:
Figure 43:

FIG. 43: Microscopy—(1) onion mix, (2) mixed leaf, (3) melon and (4) Brewers' grain.

Figure 44:
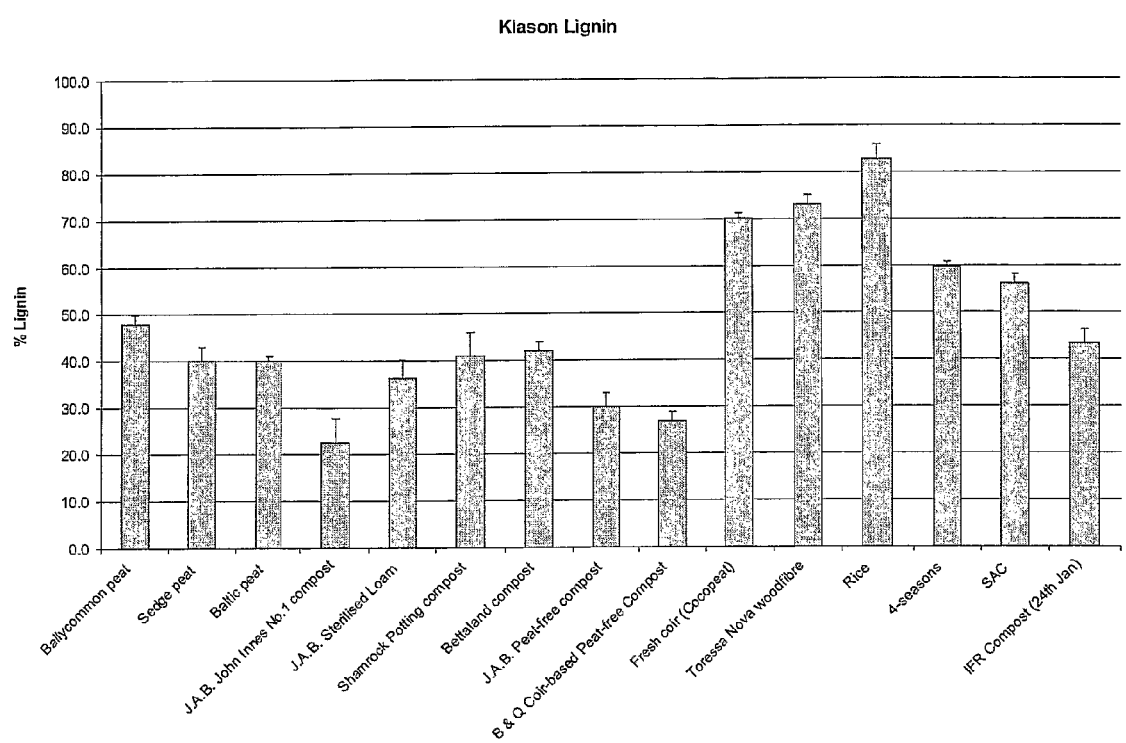

FIG. 44: Klason lignin in commercial growing media and IFR compost.

FIG. 45: Second trial windrow cell wall sugars.

FIG. 46: Numbers of aerobic mesophilic bacteria.

FIG. 47: Numbers of aerobic thermophilic bacteria.

Figure 48:
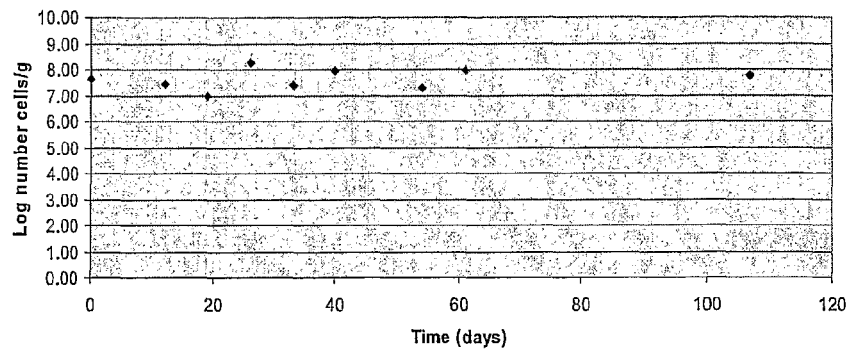

FIG. 48: Numbers of *Pseudomonas* spp.

Figure 49:
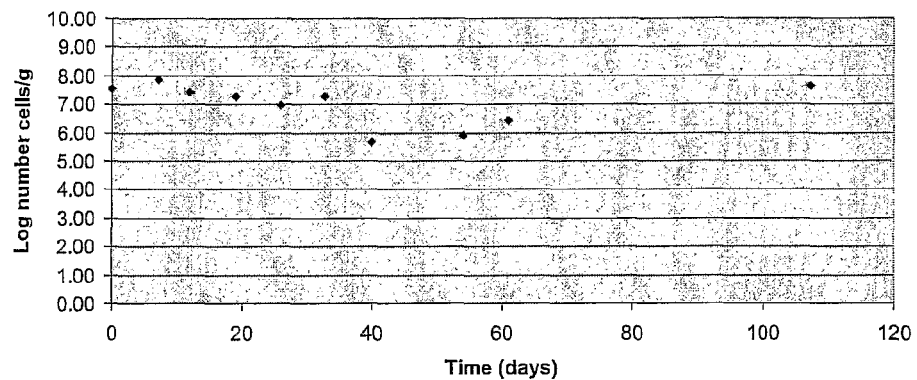

FIG. 49: Numbers of yeasts and moulds.

Figure 50:
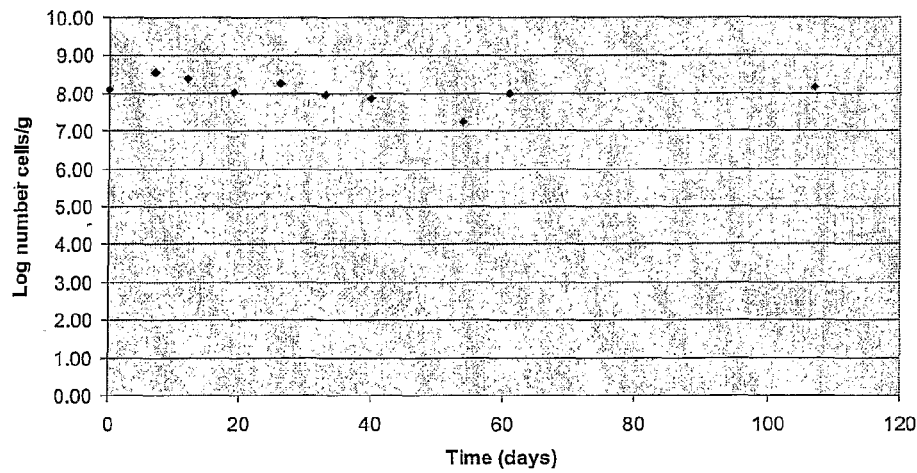

FIG. 50: Numbers of micro aerophilic bacteria.

Figure 51:
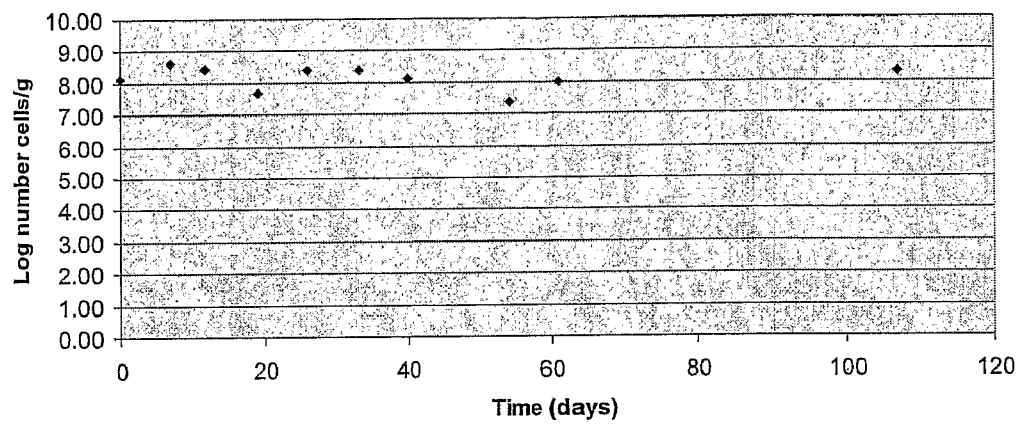

FIG. 51: Numbers of strictly aerobic mesophilic bacteria.

Figure 52:
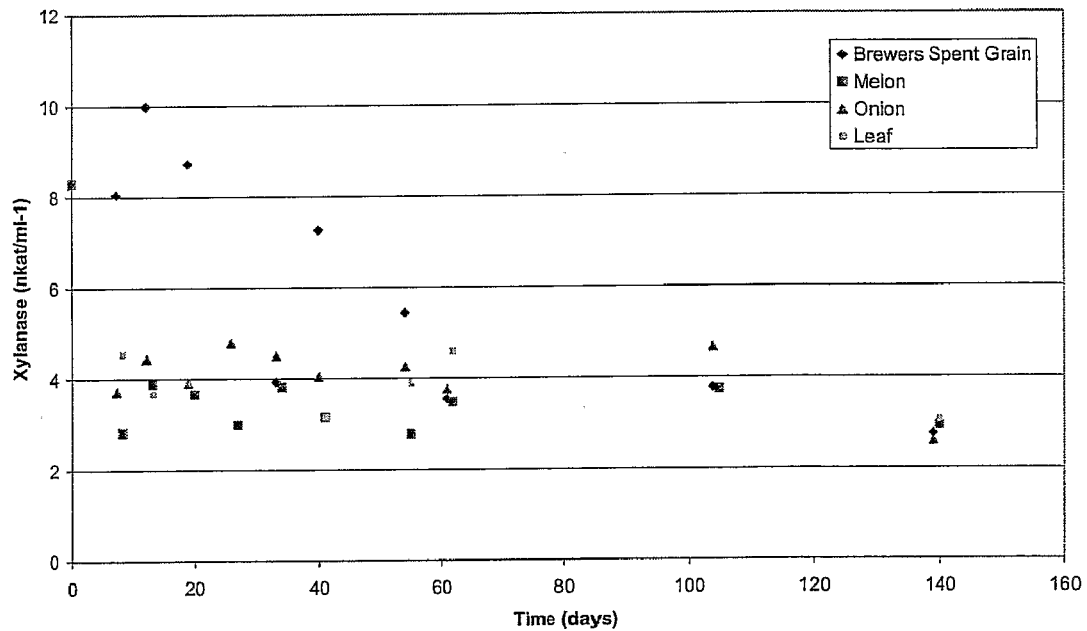

FIG. 52: Xylanase activity in first trial windrows.

Figure 53:
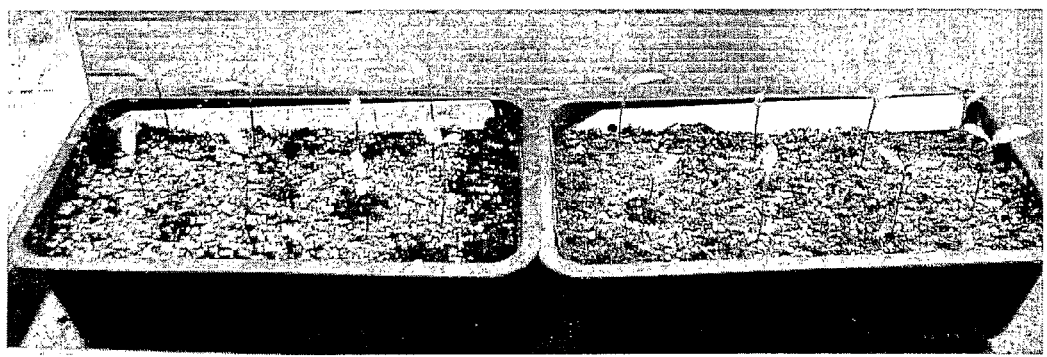
Figure 53:
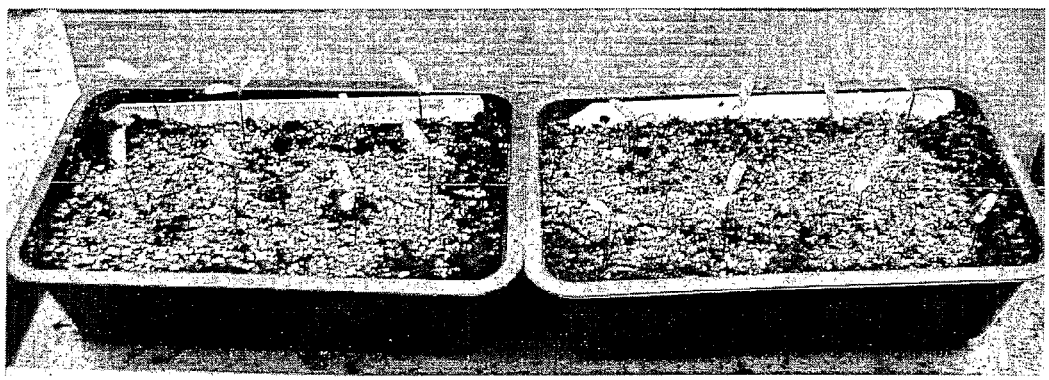

FIG. 53: Germination of marigold seedlings on a range of mixes. Photos taken 27th Mar. 2005 by Neil Bragg.

Figure 54:
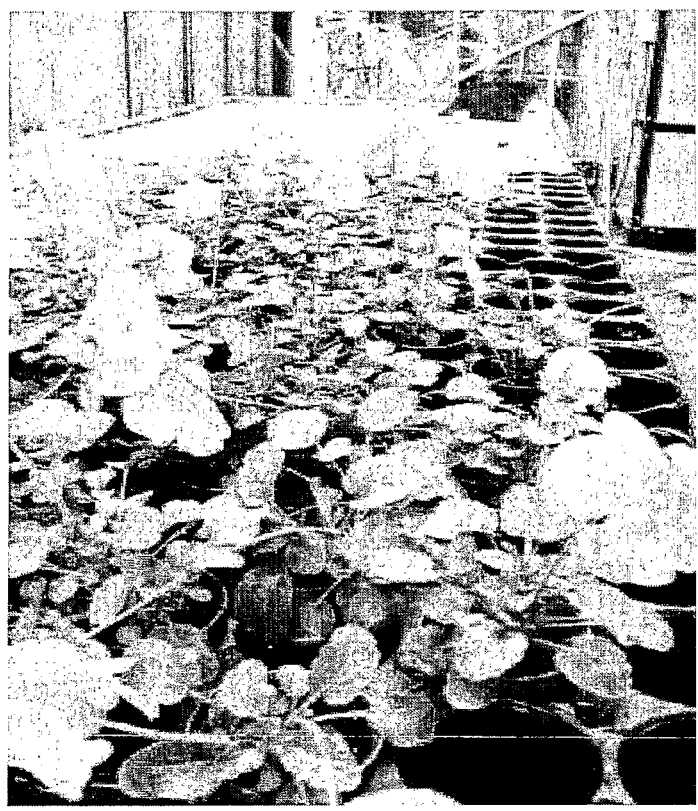

FIG. 54: Photo of the viola trials underway at IFR Norwich.

Figure 55:

FIG. 55: Germination of coriander seeds in compost mixes 5 & 6.

Figure 56:
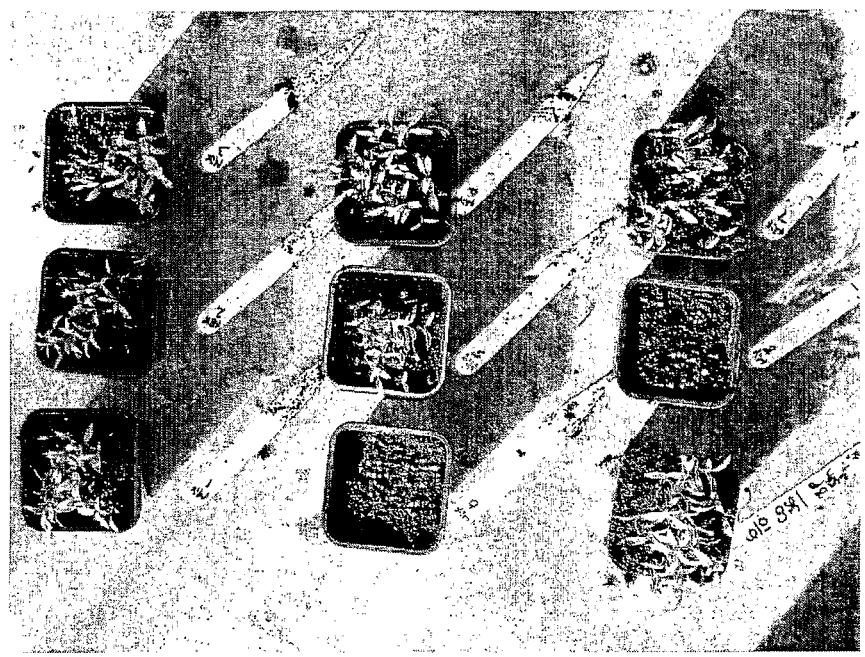

FIG. 56: Relative germination of coriander seeds in all compost mixes.

Figure 57:
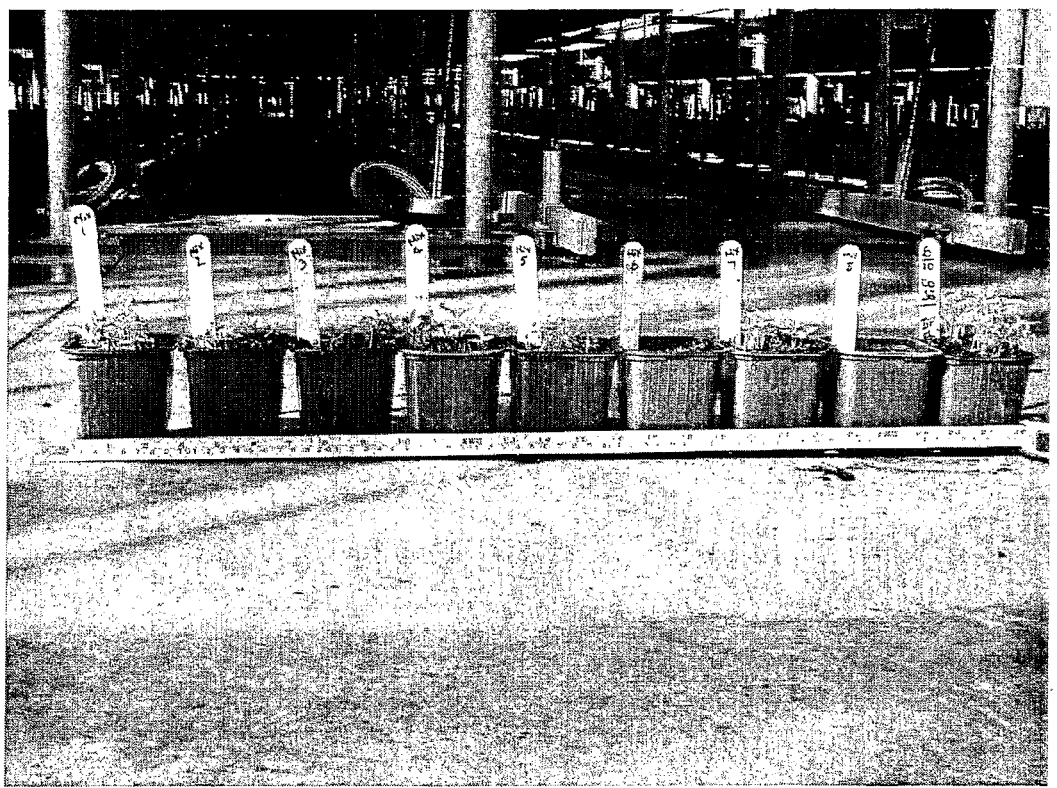

FIG. 57: Side-view of coriander seed trial.

Figure 58:
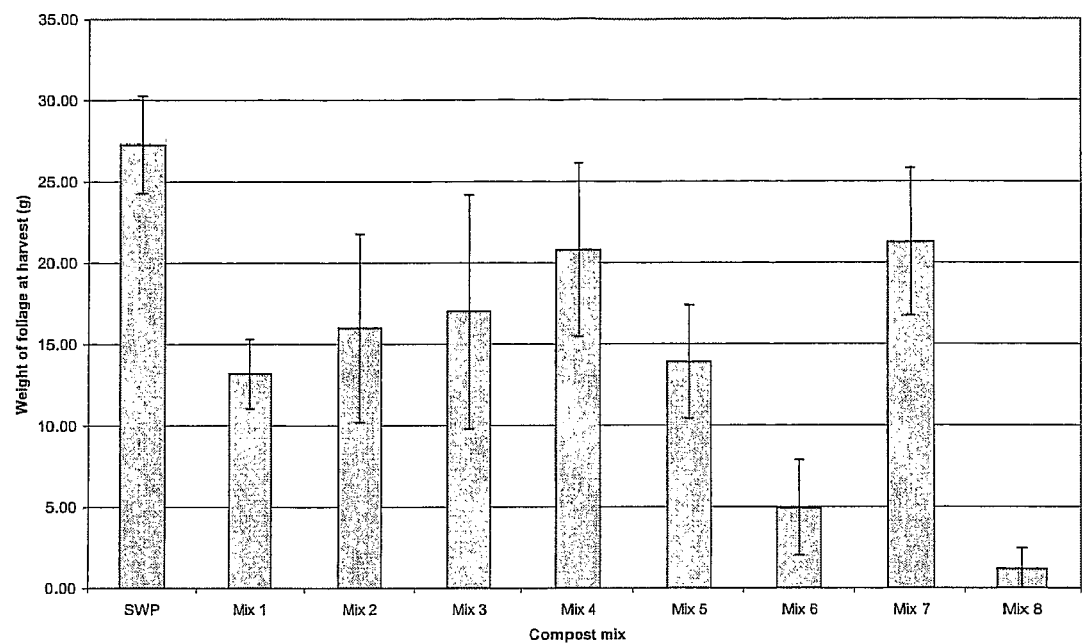

FIG. 58: Weight of foliage at harvest for coriander seed trials undertaken at Swedeponic.

Figure 59:
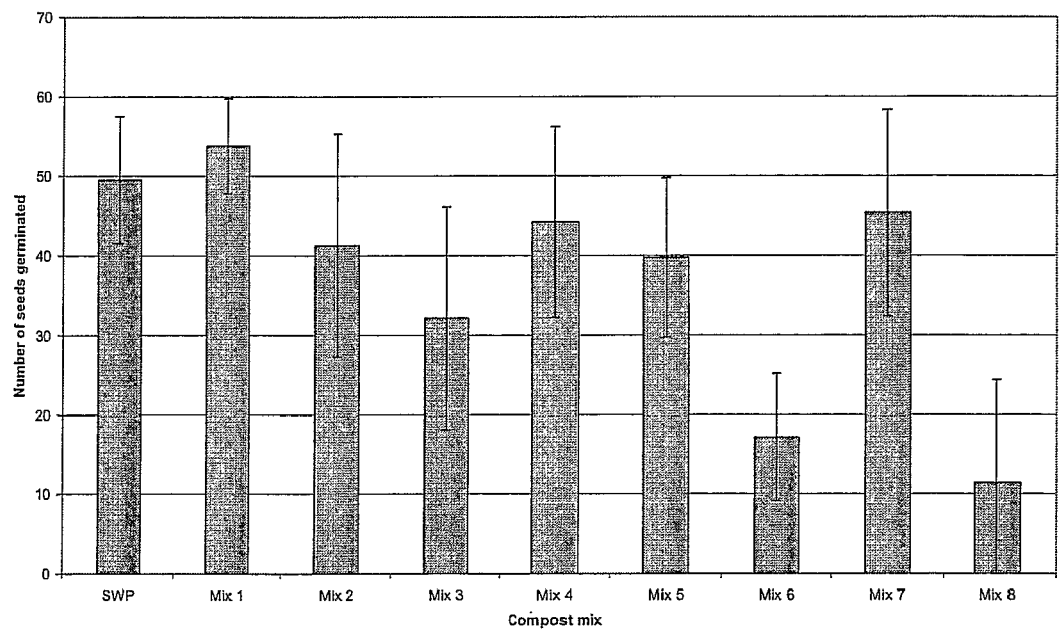

FIG. 59: Number of seeds germinated for coriander seed trials undertaken at Swedeponic.

Figure 60:
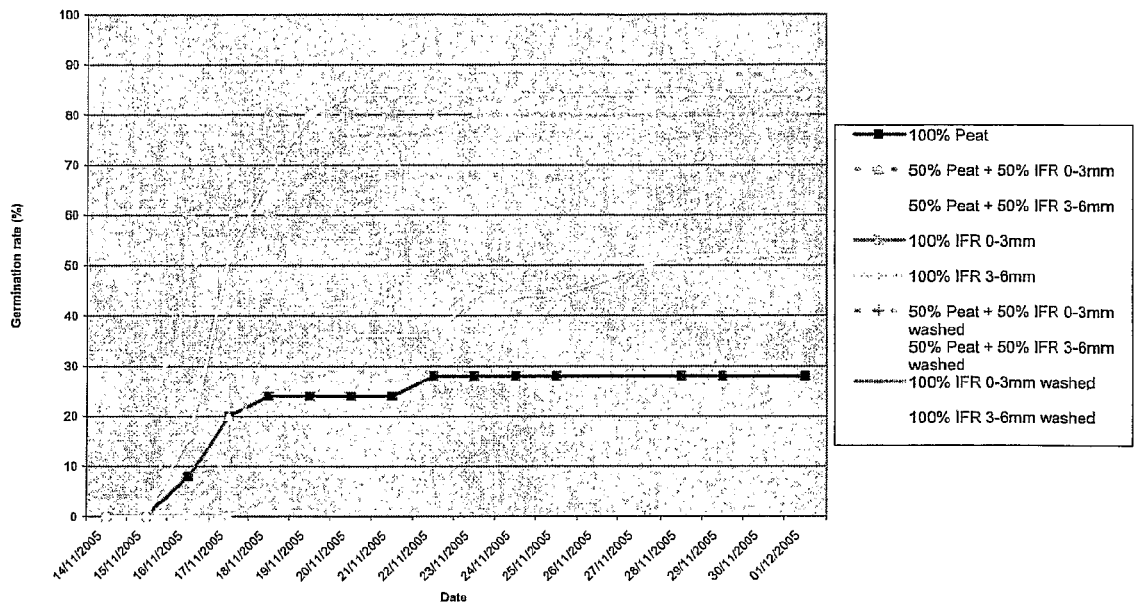

FIG. 60: Germination rate of viola seeds in Growing trial 04 at IFR Norwich.

Figure 61:
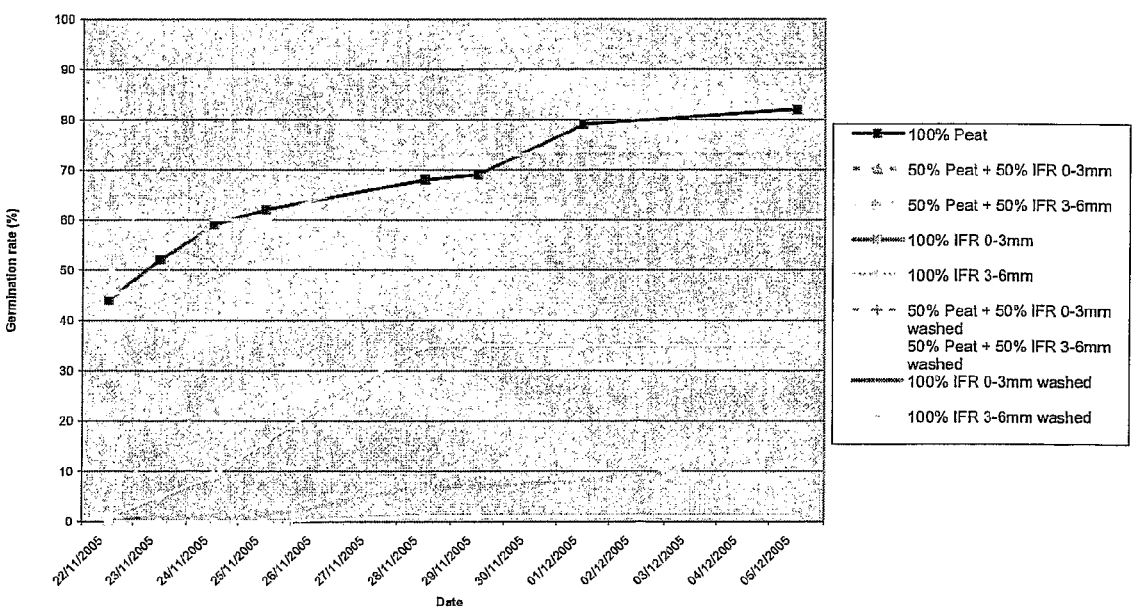

FIG. 61: Germination rate of coriander seeds in Growing trial 04 at IFR Norwich.

Figure 62:
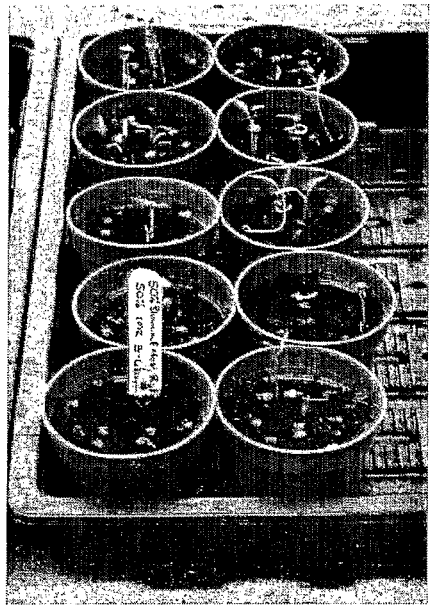
Figure 62:
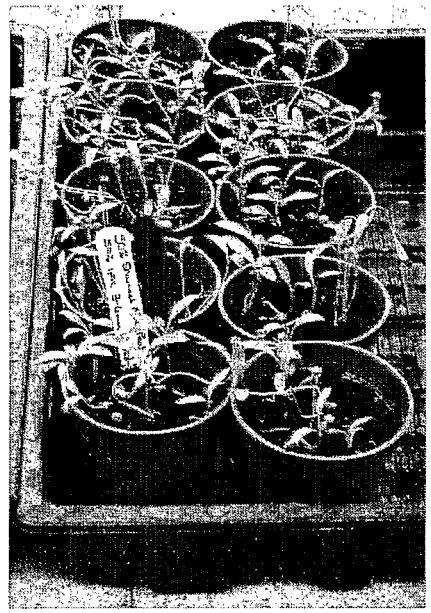
Figure 62:
Figure 62:

FIG. 62: Coriander seedlings in Growing trial 04 at IFR Norwich—(a) 50% moss peat: 50% IFR 3-6 mm unwashed; (b) 50% moss peat: 50% IFR 3-6 mm washed; (c) 100% IFR 0-3 mm unwashed; (d) 100% IFR 0-3 mm washed.

Figure 63:

FIG. 63: *Erysimum* trials underway at Yoder Toddington (Farplants Group)

Figure 64:

FIG. 64: Side view of *Erysimum* trials showing relative root growth in different compost mixes.

Figure 65:
Figure 65:

FIG. 65: Side view of *Erysimum* growing trial—(a) *Erysimum* grown in 75% peat:25% bark; (b) *Erysimum* grown in Mix E (100% IFR compost).

Figure 66:
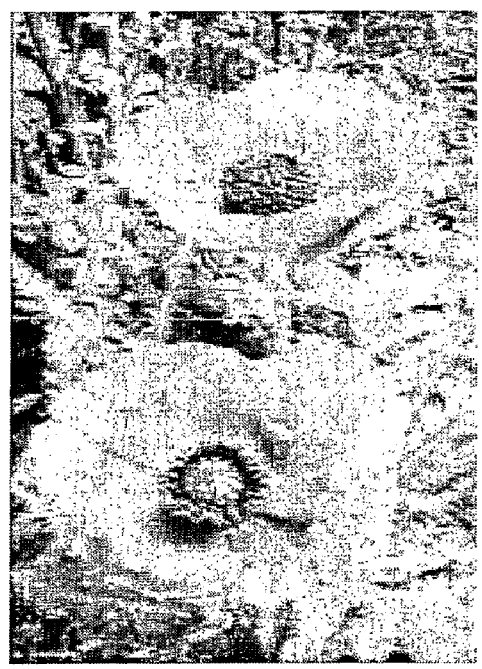

FIG. 66: *Papaver orientalis*.

Figure 67:
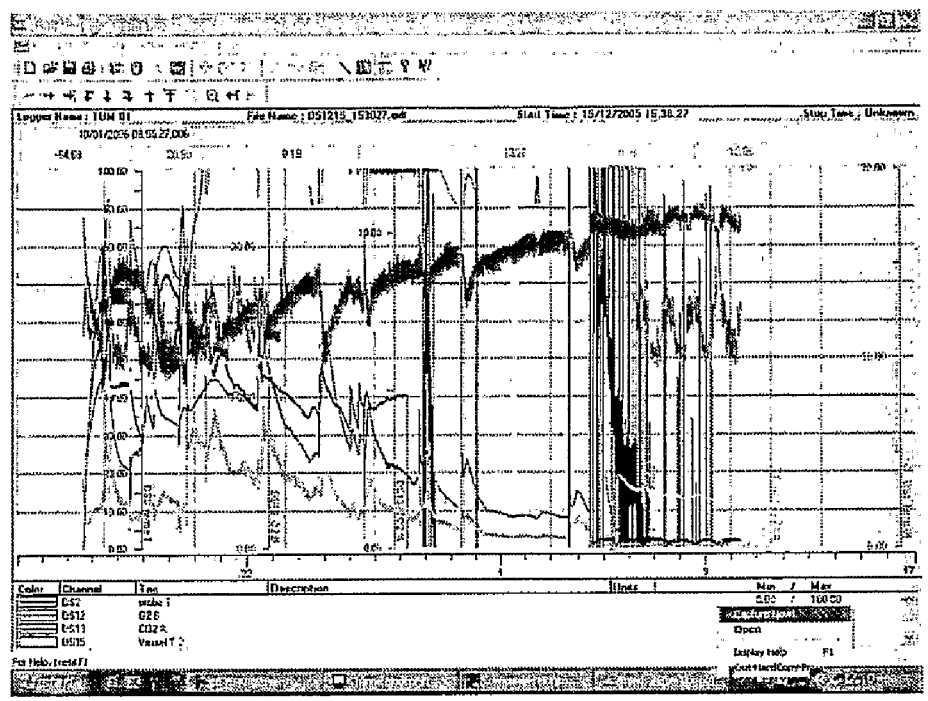

FIG. 67: Example of data logger output plot

Figure 68:
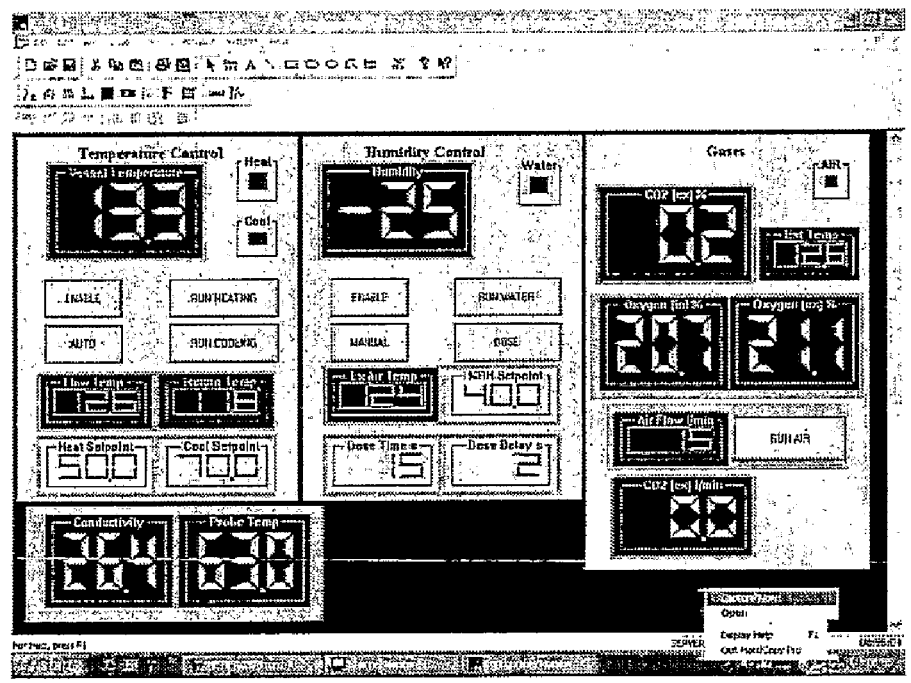

FIG. 68: User interface depicting active monitor display

Figure 69:
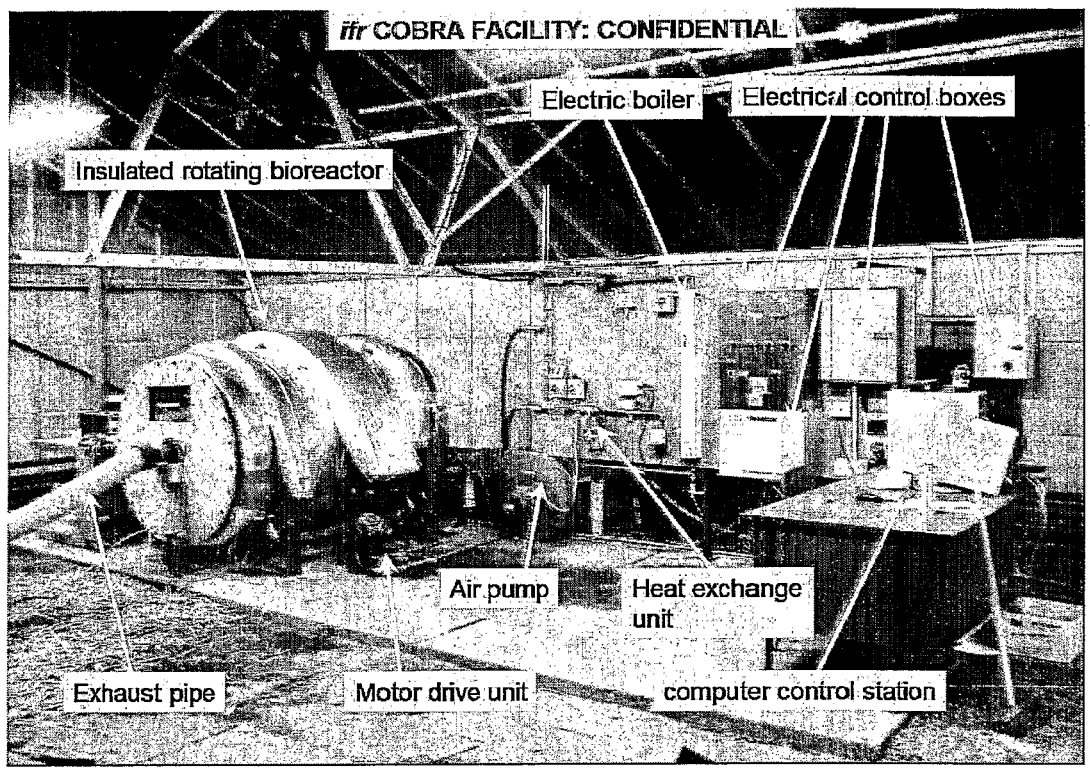

FIG. 69: COBRA facility

Figure 70:

FIG. 70: Typical small-scale, 60 m³ windrow for comparison.

Figure 71:
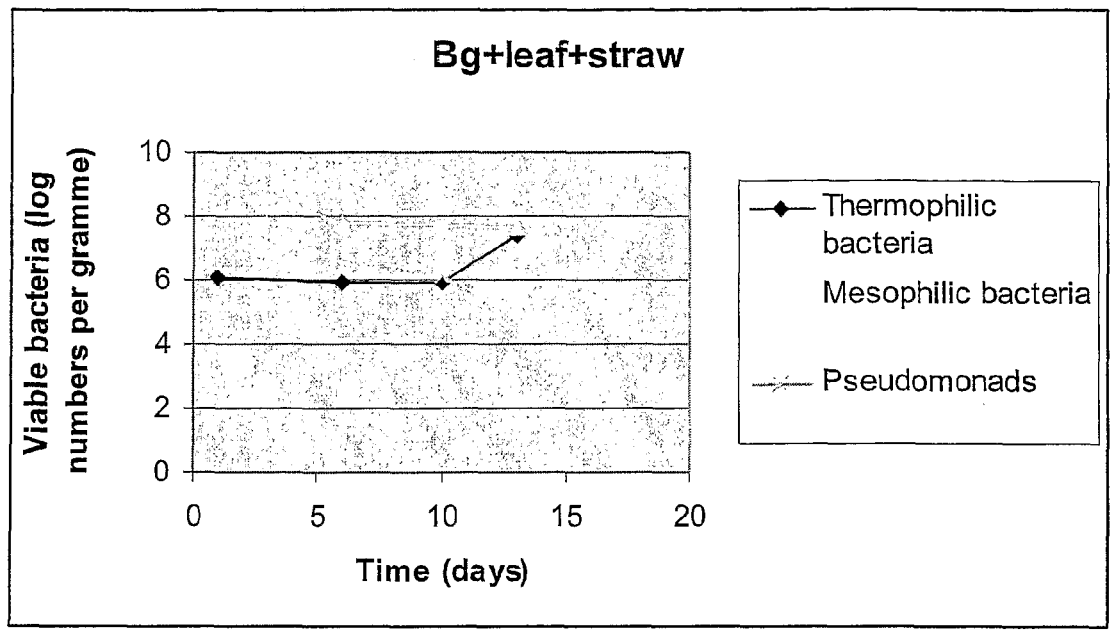

FIG. 71: Microbiological analysis of COBRA Run 2.

Figure 72:

FIG. 72: Low-power light micrograph of growing media created by COBRA run 2.

Figure 73:
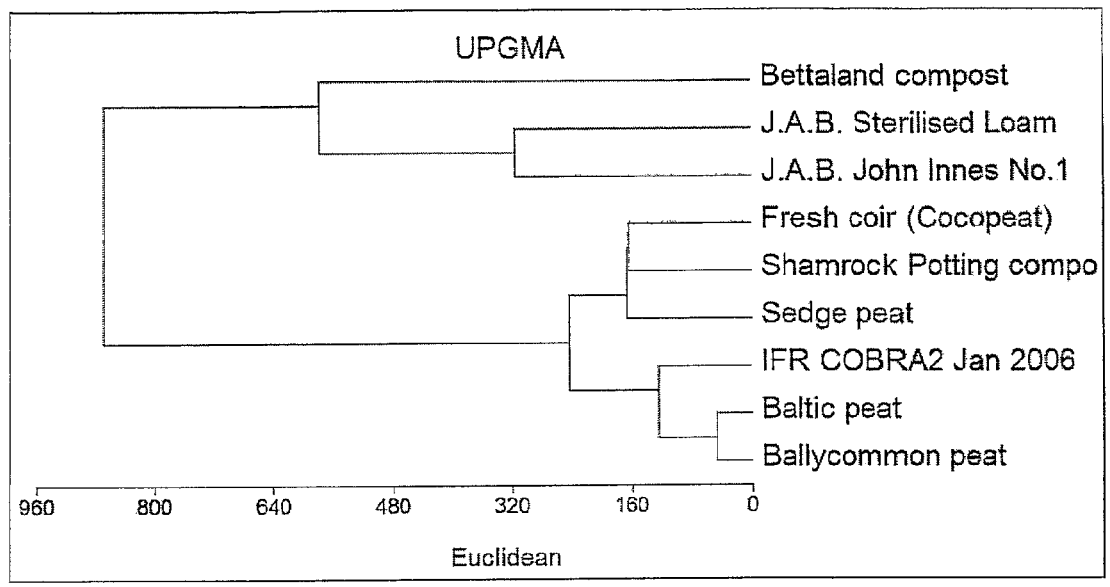

FIG. 73: Dendritic presentation of growing media based on physical properties.

Figure 74:
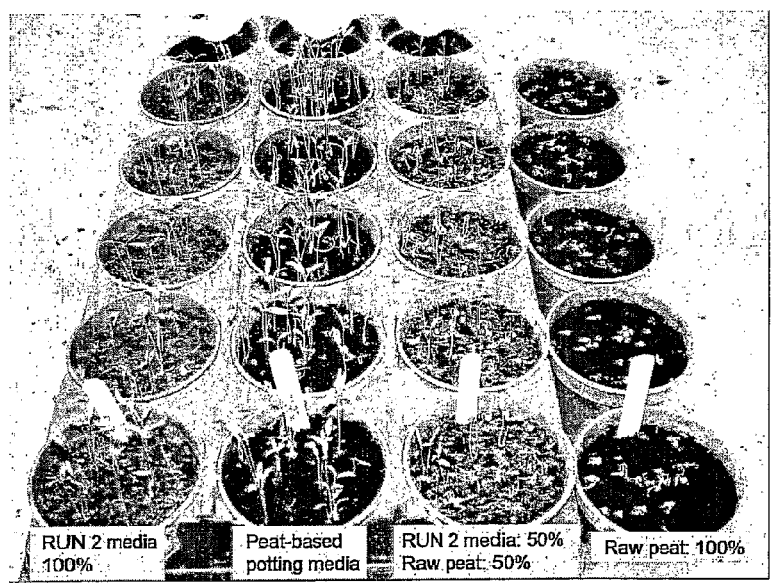

FIG. 74: Coriander germination trials to evaluate COBRA Run 2 growing media.

Figure 75:
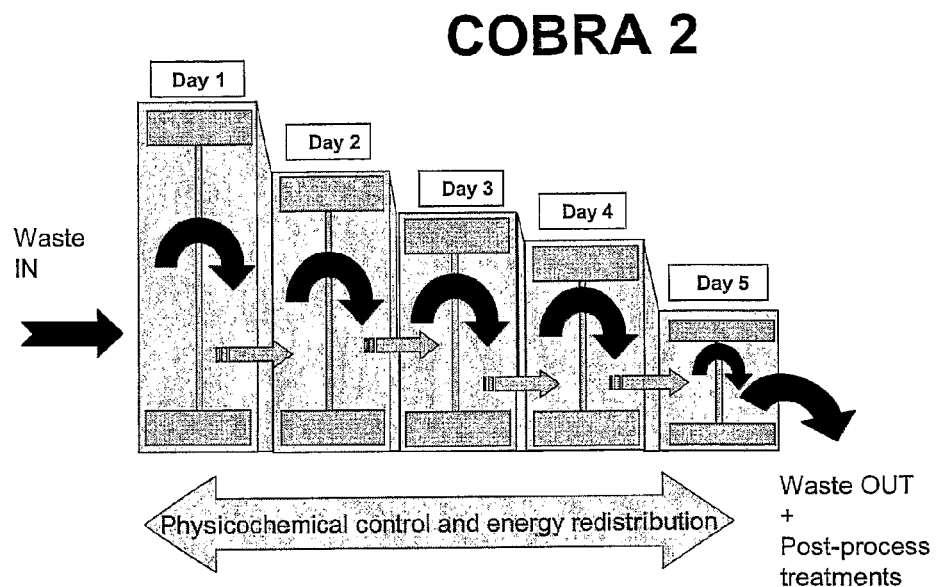

FIG. 75: COBRA 2: advanced continuous bioreactor facility.

Figure 76:
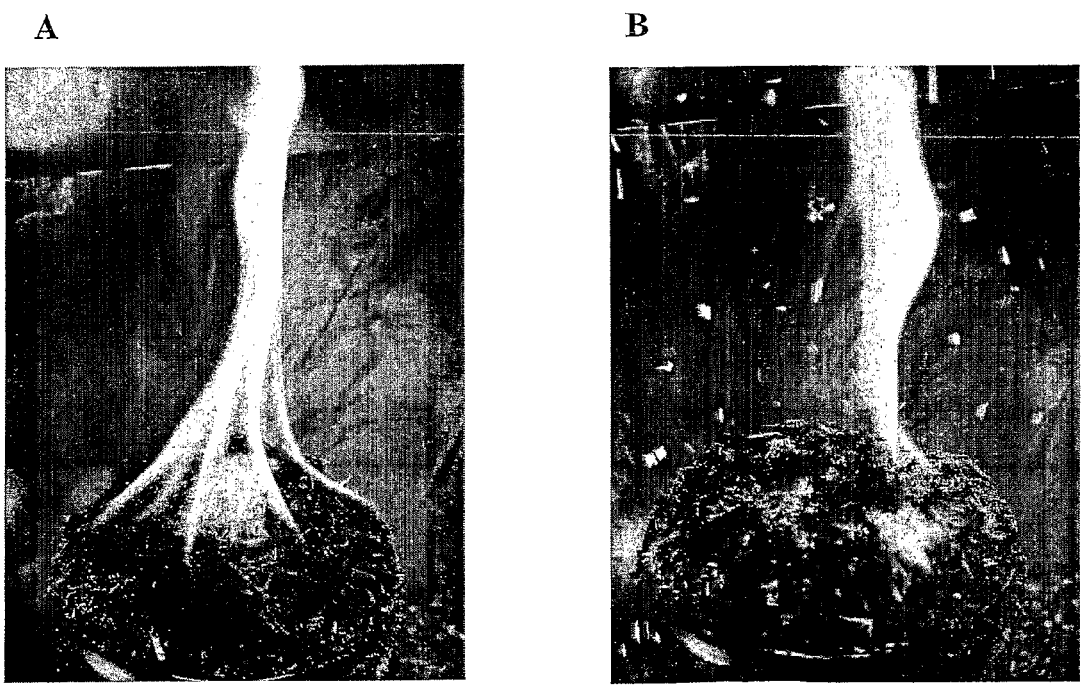

FIG. 76: Combustion of the peat-substitute material of the invention.

EXAMPLES

Introduction

The aims of the experiments described in the following Examples are
1) Examine and define the molecular and structural basis for the key physicochemical characteristics of peat-based growing media; (i.e. assessment of peat structure at different length scales, molecular through to cellular and tissue);
2) Elucidate the microbial and biochemical nature, and changes in structure of a range of defined plant materials during closely-monitored composting with particular reference to properties identified in (1) and horticultural suitability; this will involve close collaboration with compost producers, major growers, representative bodies and food processors.
3) Exploit data from 1 &2, above, to identify criteria for monitoring, controlling and enhancing growing-media quality from composted food process waste.

Materials & Methods

Objective 1: Elucidate Structure-Function of Current High-Quality Growing Media.

Aim: to evaluate structure-function relationships of current high-quality (HQ) growing media.

Task 1.1: Procurement of Peat and Related Growing Media

Peat layers and associated material were collected from Newferry bog, Bellaghy, Magherafelt, Northern Ireland. A drainage ditch between an untouched area of bog and an area which had been harvested exhaustively enabled the collection of samples through the section of a bog from green Sphagnum moss following the process of humification to the base of the bog. The material at the base of the bog is usually not harvested as it lacks the desirable properties for horticultural purposes (see FIGS. 1-3).

Additional growing media were obtained from commercial sources. A summary of high quality growing media studied is presented in Table 1.

TABLE 1

Peat and growing media

| Material | Description |
|---|---|
| Baltic (Latvian) Blonde Peat | Unprocessed, H2-3 |
| Irish (Ballycommon) Peat | Unprocessed, H4-5 |
| Somerset Sedge Peat | Unprocessed, H7-8 |
| J. Arthur Bowers Sterilised Loam | Commercial |
| J. Arthur Bowers John Innes potting compost No. 1 | Commercial |
| Shamrock Potting Compost - General Potting Medium | Commercial |
| Bettaland compost | Commercial |
| Four Seasons Organic Compost | Commercial |
| Scottish Agricultural College Compost | Commercial |
| J. Arthur Bowers Peat-free Compost | Commercial |
| B & Q Coir-based Peat-free Compost | Commercial |
| ECO Composting Ecomix | Commercial |
| ECO Composting Supersoil | Commercial |
| Fresh coir (Cocopeat) | Commercial |
| Toressa Nova woodfibre | Commercial |
| Rice husks | Commercial |
| *Sphagnum* moss from Newferry bog, Northern Ireland | Experimental only |
| Vegetated layer (top) from Newferry bog, Northern Ireland | Experimental only |
| Vegetated layer (sub-surface) from Newferry bog, Northern Ireland | Experimental only |
| Vegetated layer (basal) from Newferry bog, Northern Ireland | Experimental only |
| Peat layers from Newferry bog, Northern Ireland (P1-P6) | Unprocessed, H4-5 |

Task 1.2: Characterisation of HQ Growing Media

HQ growing media were evaluated for current industry-relevant characteristics and physicochemical properties described in Task 2.3 below.

Objective 2: Elucidate Microbiological and Biochemical Basis of Compost Characteristics Aim: to compost a range of food processing co-products and to investigate the microbiological and biochemical basis for the biodegradation.

Task 2.1: Method Development

Aim: a single trial of four windrows was carried out to (a) evaluate the windrow process for selected co-products, and (b) to develop methods for analysis.

Preparation of the Windrows

Trial 1 windrows: four of these were produced at Organic Recycling. The feedstocks (Brewers' spent gain, leafy greens, fruit waste and onions) were each mixed with straw to a formulation poised to optimise the water content and the C:N ratio.

TABLE 2

Composition of trial windrows (courtesy of Claire Donkin, Swedeponic UK Ltd.)

| Leaf Mix | |
|---|---|
| Loose leaf (T or Kg) | 20 |
| Straw (T or Kg) | 3.8 |
| Moisture content (%) | 73 |
| C:N (ratio) | 30 |
| Brewers grain mix | |
| Bgrains (T or Kg) | 20 |
| Straw (T or Kg) | 8.34 |
| Moisture content (%) | 59.4 |
| C:N (ratio) | 30 |
| Melon Mix | |
| Melon (T or Kg) | 20 |
| Straw (T or Kg) | 8 |
| Moisture content (%) | 60 |
| C:N (ratio) | 69.5 |
| Onion Mix | |
| Onions (T or Kg) | 20 |
| Straw (T or Kg) | 2.21 |
| Moisture content (%) | 79.3 |
| C:N (ratio) | 30 |

Sampling the Windrows

Temperature was measured periodically by inserting a probe 15 cm ("surface temperature") and 1 metre ("core temperature") into the windrow. Samples were removed for laboratory analysis after each turning of the windrows.

Task 2.2: Full Composting Study

Aim: on the basis of trial 1 (Task 2.1 above) and results thereof, a full composting study was carried out.

Preparation of the Windrows

A further twelve windrows were constructed at Organic Recycling Ltd. Six different mixes were prepared in duplicate based on straw & brewers' grain together with mixed leaf or fruit in four of the mixes.

TABLE 3

Composition of second (main) trial windrows (courtesy of Claire Donkin, Swedeponic UK Ltd.)

| Brewer's Grain + Leaf 1 | |
|---|---|
| Brewers' grain (Tonnes) | 20 |
| Leaf (Tonnes) | 5 |
| Straw (Tonnes) | 8.99 |
| Moisture content (%) | 59.6 |
| C:N (ratio) | 30 |
| Brewers grain mix | |
| Brewers' grains (Tonnes) | 20 |
| Straw (Tonnes) | 8.34 |

TABLE 3-continued

Composition of second (main) trial windrows
(courtesy of Claire Donkin, Swedeponic UK Ltd.)

| | |
|---|---|
| Moisture content (%) | 55.5 |
| C:N (ratio) | 30.7 |
| Brewer's Grain + Fruit 1 | |
| Brewers' grain (Tonnes) | 40 |
| Fruit (Tonnes) | 10 |
| Straw (Tonnes) | 15 |
| Moisture content (%) | 61.5 |
| C:N (ratio) | 28.7 |
| Brewers' Grain + Leaf 2 | |
| Brewers' grain (Tonnes) | 50 |
| Leaf (Tonnes) | 10 |
| Straw (Tonnes) | 15 |
| Moisture content (%) | 63.5 |
| C:N (ratio) | 25.6 |
| High Brewers' Grain Test | |
| Brewers' grains (Tonnes) | 40 |
| Straw (Tonnes) | 5 |
| Moisture content (%) | 67.3 |
| C:N (ratio) | 20 |
| Brewers' Grain + Fruit 2 | |
| Brewers' grain (Tonnes) | 50 |
| Fruit (Tonnes) | 5 |
| Straw (Tonnes) | 20 |
| Moisture content (%) | 58.1 |
| C:N (ratio) | 29.8 |

All windrows incorporated some brewers' grain since this appeared to give the best results from the first trial windrows. The formulations (provided by Claire Donkin) were again designed to optimise the water content and the C:N ratio.

Sampling the Windrows

Temperature was measured as previously on a weekly basis and samples taken on a fortnightly basis.

Task 2.3: Physicochemical Analysis

Aim: This section describes the methods used for evaluating physicochemical characteristics of high quality growing media, and composted material.

Material Properties

Soil Moisture-Retention Studies

Moisture retention studies were performed using a 5 bar pressure plate extractor (Soil Moisture Equipment Corporation, Santa Barbara, Calif., USA) equipped with a ceramic pressure plate cell rated to 0.5 bar (FIG. 4).

Duplicate 25 g soil samples (15 g for peat samples) were placed on the pressure plate cell retained by brass soil retaining rings with a section of gauze cloth on the base of each ring. The samples were levelled in each ring and allowed to stand overnight with an excess of water on the plate to saturate the samples. When the samples were ready, the excess water was removed from the ceramic plate with a syringe. The extractor was then closed and pressure increased to the required value via a regulated compressed air supply. After the initial outflow of water, the outflow tube was connected to the tip of a burette to enable the approach to equilibrium to be followed.

At the end of a run, before releasing the air pressure in the extractor, the ends of the outflow tubes were sealed to prevent backflow of water to the samples. The equilibrated samples were then transferred quickly to Petri dishes and weighed. The moisture content was determined by drying to constant weight at 105° C. using a fan-assisted oven (Gallenkamp Hotbox oven).

Water Potential Measurements

Water potential measurements were performed using a Decagon WP4-T Dewpoint Potentiameter (Decagon Devices, Inc., Pullman, USA) (FIG. 5).

After allowing the instrument to warm-up for 30 minutes, the instrument was calibrated using the standards supplied (Decagon KCl Performance Verification Standard). If necessary, the instrument was adjusted to the correct value.

Samples were measured by placing in a disposable sample cup, completely covering the bottom of the cup, if possible, taking care not fill the sample cup more than half full. After ensuring that the rim and outside of the sample cup were clean, the sample drawer was closed. When the sample was close to the measuring temperature, the drawer knob was turned to the READ position. The samples are measured in continuous mode until stable to give an accurate value of water potential.

Water potential, $\Psi$, can be related back to water activity through the following equation:

$$a_w = \exp\frac{\Psi M w}{RT}$$

where R is the universal gas constant, T is the absolute temperature in Kelvin, M is the molecular weight of water (g/mol) and $a_w$, is the water activity.

Dry Weight Determinations (Infra-Red Dryer)

Dry weight measurements were also performed using an infra-red dryer balance (Mettler LP-16, Mettler Instruments, Beaumont Leys, Leicester, UK). Samples were dried at 105° C. for a fixed time of 30 minutes. The time course was monitored at 2 minute intervals.

Water Sorption Isotherms

Aliquots of each sample were equilibrated in plastic Petri dishes over salt solutions in closed desiccators at 20° C. for three weeks. After equilibration, the samples were dried using an infra-red dryer balance at 105° C. for 15/20 minutes to determine the moisture content.

The determined moisture contents were then fitted to the GAB (Guggenheim-Anderson-de Boer) & BET (Bruner-Emmett-Teller) models using Water Analyser 97.4 software (Webb Tech, Australia).

Compaction

Compaction tests were performed using a Texture Analyser (Stable Micro Systems, UK) equipped with a 30 kg load cell and compaction plate (Ollett et al, 1993) (FIG. 6).

The Heckel stress was derived through the following equation:

$$\ln(1/(1-D))=p/\sigma+A$$

where:

D is relative density (=ρ compost/ρ matrix), p is applied pressure and

σ is mean deformation (Heckel) stress pH & Electrical Conductivity Measurements

Suspensions of 5 g of compost: 25 g distilled water were prepared for each sample in duplicate for pH measurement and shaken using an orbital shaker for 1 hour. The pH electrode was immersed in each suspension and the meter reading recorded when the pH stabilised. The conductivity electrode was immersed in the same compost-water suspension after the one hour shake and the meter reading recorded.

Particle Size Distribution by Sieve Analysis

The particle size distributions of the peat & peat alternatives were examined using the method given in the PAS 100:2002 standard. All samples were dried overnight to below 15% moisture in a fan oven at 40 C before sieving for 7 minutes at a pre-determined amplitude using a Fritsch Vibratory Sieve Shaker (Fritsch, Idar-Oberstein, Germany). All determinations were performed in triplicate.

Bulk Density

The method for bulk densities of soil given in British Standard EN 12580:2000 was modified to allow for smaller quantities.

A section of plastic tube (i.d. 153 mm) with a height to diameter ratio of 1.1 was glued to a Perspex base. An additional section of tube was located on top of this by means of 3 locating pins. A 16 mm sieve was used as a fall controller on top of this section. The apparatus was determined to have a volume of 2.035 litres.

The tube was filled with the sample before removing the collar and levelling using a straight edge in a sawing manner. The total sample and pot was weighed and the tare weight subtracted to give the weight of a known volume.

The dry weight of the sample was ascertained at the same time using the Mettler LP16 dryer balance.

Air-Filled Porosity

The air-filled porosity of the range of peat and peat alternatives was determined using the method of Bragg & Chambers (1988). All determinations were carried out in triplicate using apparatus supplied by Bulrush Horticulture.

Plant Cell Wall Characteristics

Preparation of Alcohol Insoluble Residues (Airs)

Frozen tissue (approximately 250 g) was purified according to a modified method of Parker & Waldron (1995). The windrow mix was blended, homogenised and hot-ethanol extracted. After several washes with acetone the alcohol-insoluble residue (AIR) was air-dried overnight and the final recovery obtained was approximately 20% of the original weight.

Sequential Extraction of Wall Bound Ester Linked Phenolics

AIR (30 mg) was extracted by the method adapted from Hartley and Morrison (1991) modified according to Parker & Waldron (1995). Trans-cinnamic acid (200 μl, 1.67 mg/50 ml methanol) was added as an internal standard and extracts analysed by HPLC.

Analysis of Carbohydrate Composition

Neutral sugars were released from AIR by suspending 2 mg into 200 μl of 72% $H_2SO_4$, reduced with $NaBH_4$ and acetylated by the method of Blakeney et al (1983) using 2-deoxyglucose (200 μl, 1 mg/ml) as an internal standard. Alditol acetates were quantified by gas chromatography (Perkin Elmer, P.E. Auto system XL Gas Chromatograph).

Klason Lignin Analysis

Klason lignin was quantified gravimetrically by a modification of the method of Theander and Westerlund (1986). The residues were recovered by filtration through pre-weighed sintered glass funnels. The glass funnels were dried until a constant weight was obtained and Klason lignin calculated gravimetrically.

Task 2.4: Microbiological and Biochemical Analysis

Aim to evaluate the microbiology and selected enzyme profiles of the composted materials.

Microbiological Assessment

Samples were removed from each windrow. Sample heterogeneity was great, but the particle size was decreased by using a proprietary food mixer fitted with a cutting blade. The resultant material could be reliably sub-sampled. Aliquots (40 g) were taken in duplicate and each blended with 360 mls of a peptone salt dilution fluid (PSDF) in a Stomacher Lab-blender for 1 minute.

Samples of the supernatant were removed immediately and this suspensions (and further dilutions of it made in PSDF) were plated to the surface of a range of microbiological culture media in duplicate using a Spiral Plate Maker.

Culture media, incubation conditions and the microflora enumerated on those media are shown in the following table.

TABLE 4

Incubation conditions for different microflora

| Medium | Conditions of incubation | Microorganisms enumerated |
|---|---|---|
| Plate Count Agar (PCA) | Air, 20° C. | Mesophilic Aerobic bacteria |
| Plate Count Agar (PCA) | Air, 55° C. | Thermophilic Aerobic bacteria |
| Cephaloridine, Fucidin, Cetrimide Agar (CFC) | Air, 25° C. | *Pseudomonas* spp. |
| Oxytetracyline, Dextrose, Yeast Extract Agar (ODY) | Air, 20° C. | Yeasts and moulds |
| De Man, Rogosa, Sharpe Agar (MRS) | Not pre-reduced, but incubated in $H_2:CO_2$, 9:1 v/v 25° C. | Microaerophilic bacteria |
| Reinforced Clostridial Medium (RCM) | Pre-reduced and incubated in $H_2:CO_2$, 9:1 v/v 25° C. | Strictly anaerobic bacteria |

Further Sampling

In addition, the following samples were also analysed:

IFR seedling trial compost, harvested from the Brewer's Spent Grain Windrow, February 2005

IFR seedling trial compost, harvested from the Brewer's Spent Grain Windrow, June 2005

The samples harvested in June were enumerated with and without a heat treatment intended for the inactivation of vegetative cells.

Presumptive Identification of Key Components of the Microflora

The aim here was to isolate and identify the components of the microflora responsible for the degradation of plant tissues.

It was inevitable that the windrows were contaminated with a wide range of microorganisms, some of which would multiply to large numbers, but without being responsible for the degradative processes.

Accordingly, the following protocol was adopted. The predominant colony forms on each of the enumeration media described above were isolated and purified. They were then presumptively grouped by using tests shown below:

Gram reaction
Possession of Oxidase
Possession of Catalase
Ability to grow in broth at 20° C.
Ability to grow in broth at 55° C.
Ability to degrade plant tissues Cell-Wall Degrading Enzymes Measurement of Xylanase Activity Xylanase activity was measured according to the method of Bailey et al. using birchwood substrate.

Substrate 1.0 g of birchwood xylan (X-502, Sigma Chemical Company) was mixed with 80 ml of 0.05M Na citrate buffer, pH 5.3 at 60° C. before heating to boiling point on a heated magnetic stirrer. The suspension was cooled with continued stirring, covered and stirred slowly overnight. The suspension was filtered through glass wool before making up to a volume of 100 ml with buffer. The substrate was stored in a freezer.

Standard Curve

Xylose stock solution (1 mg/ml) was prepared in Na citrate buffer (0.05M, pH 5.3). The stock solution was diluted so that the final concentration of xylose in a series of test tubes was 0.1-0.6 mg/ml by adding 0.9-0.4 ml of buffer to 0.1-0.6 ml of stock solution. An additional 1 ml of buffer was added and then 3 ml of DNS* reagent before mixing and heating in an oil bath (Grant W14, Grant Instruments, Cambridge, UK) for 5 minutes at 100° C. and cooling with cold water. The colour developed was measured in a spectrophotometer (Varian Cary 3 UV-Visible Spectrophotometer) at 540 nm using the reagent blank as control.

*The DNS reagent was prepared by dissolving 20 g dinitrosalicylic acid, 4 g phenol, 1 g sodium sulphite and 400 g of sodium potassium tartarate in 1 litre of 2% w/v NaOH. When a clear solution was obtained, the solution was diluted using water to 2 litres and stored wrapped in foil. All chemicals used were of analytical grade.

Extraction of Enzymes from Compost Samples 1 g of compost sample was extracted at room temperature using 9 g of deionised water for 1 hour on a magnetic stirrer. The supernatant was filtered through GF/C filter paper and retained.

Procedure

Xylan substrate (1.8 ml) was added to test tubes and heated to 50° C. before adding 200 μl of enzyme solution and mixing. The tubes were incubated for 300 s at 50° C. 3.0 ml of DNS reagent were added to the tubes before mixing and removing from the water bath (Grant W28, Grant Instruments, Cambridge, UK). The tubes were then heated to 100° C. in an oil bath and then cooled in cold water. The colour produced was measured using a spectrophotometer at 540 nm against the reagent blank correcting for the enzyme blank. Using the standard curve, the corrected absorbance was converted to give the enzyme activity in the original sample.

Results and Discussion

Objective 1: Elucidate Structure-Function of Current High-Quality Growing Media.

Aim: to evaluate structure-function relationships of current high-quality growing media.

For ease of comparison, much of the data pertaining to this section is presented in later parts of the Examples.

Task 1.1: Procurement of Peat and Related Growing Media

See Materials and Methods for Task 1.1 for details of procurement of high quality growing media.

Task 1.2: Characterisation of HQ Growing Media

Aim: the peat samples will be assessed at IFR for current industry-relevant characteristics in relation to structure-function relationships.

Microscopic Analysis

Figure 8:
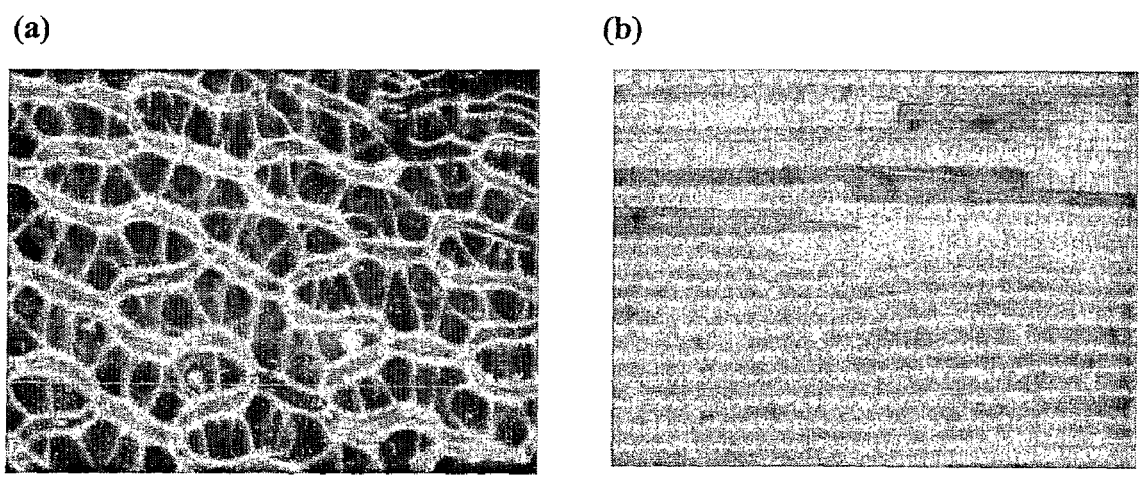

As stated in the original proposal the cell walls and tissue structures are largely intact in moss-derived peat, possibly because of the presence of cell-wall simple phenolics (FIGS. 7 & 8). FIG. 9 shows the sphagnum moss from which the peat is derived. FIG. 10 provides examples of woody fibres found in other commercial growing media.

Chemical Composition of Peat Layers

Peat samples were extracted to prepare alcohol-insoluble residues. These were then analysed for their cell-wall chemical composition. The results are shown in FIGS. 11-13.

Conclusions from Task 1.2

Microscopic analysis shows that the aerial material and upper bog layers are dominated by sphagnum and related moss components. Further down into the bog, cotton grass becomes more prominent, and is the dominant remaining material in the most basal layers 5&6.

Cell wall composition data shows that moss layers and top peat layers 1&2 exhibit very similar wall compositions. However, in peat layers 3 and beyond, the carbohydrate components drop rapidly to very low levels in layers 5 & 6 reflecting bio- or chemical-degradation during the humification process.

Accompanying the decrease in cell-wall carbohydrate, lignin shows a concomitant increase to over 40% in the lowest layers.

The wall phenolic esters also exhibit changes. In the top aerial layers, these phenolics generally decrease with depth. In the bog layers, the moss-derived components generally decrease as the moss degrades, but the cotton-grass dominance in the lower levels results in an increase in ferulic acid and coumaric acid in monomeric forms only.

Interestingly, it is layers 3 & 4 that provide the best quality peat material, layers 1 & 2 being too immature, and layers 5 and 6 being of poor quality.

Objective 2: Elucidate Microbiological and Biochemical Basis of Compost Characteristics.

Aim: to compost a range of food processing co-products and to investigate the microbiological and biochemical basis for the biodegradation.

Task 2.1: Method Development

Aim: a single trial of four windrows was carried out to (a) evaluate the windrow process for selected co-products, and (b) to develop methods for analysis.

Windrow Design

Four windrows each of about 30 m$^3$ have been constructed at Organic Recycling Ltd. They contain straw and one of the following food processing waste streams (provided by the Partners):

mixed leaf (*brassicas*),
onion,
brewers' grain,
fruit (melon and pineapple peel).

The compositions (mixes) of the windrows are shown in the Materials & Methods Section of the Examples above.

The windrows have been turned on a weekly basis for 3 months (prior to each sampling) and then monthly up to a total of approximately 120 days. A typical windrow is shown (FIG. 14). Temperature was monitored regularly—the results are presented in FIGS. 15-18.

The results demonstrate that the windrows in all trials rapidly achieved high internal temperatures commensurate with a successful windrow operation. The PAS requirement of 60° C. was achieved, and maintained for several weeks in most cases. However, the quality of material was certainly not uniform within the windrows:

Firstly, there was great heterogeneity in nature, rate and extent of composting throughout each windrow due to the temperature gradient.

Secondly, the impact of weather conditions differed between windrows. The autumn and winter conditions included considerable precipitation. The vegetable-based windrows became waterlogged by early January, and then appeared to become quite anaerobic within. This probably reflects the propensity for water retention by the vegetable components. In contrast, the Brewers Spent Grain windrow drained more efficiently, and remained well aerated.

The onion windrows failed to degrade properly due to the resistant nature of the onion organs. Despite being put through the "Organic Recycling" shredder, most remained intact and resisted breakdown for 4-5 months.

These characteristics are considered further in the sections below.

Conclusions of Task 2.1.

Trial windrows of 30 m$^3$ were successfully created, and demonstrated differences in composting behaviour as a function of weather conditions and composition.

Task 2.2: Full Composting Study

Aim: Based on the results of Trial 1 (Task 2.1 above), a second trial of twelve windrows (six duplicates) was carried out to evaluate co-product mixtures in more detail.

Windrow Design

Twelve windrows each of about 60 m³ were constructed at Organic Recycling Ltd. They contained straw, brewers spent grain and were selectively supplemented with the food processing waste streams (provided by the Partners):
- mixed leaf (leeks),
- fruit (melon and pineapple peel).

The compositions (mixes) of the windrows are shown in the Materials & Methods Section of the Examples, above.

The windrows were turned on a weekly basis for 3 months (prior to each sampling) and then monthly up to a total of approximately 120 days. A typical windrow is shown (FIG. 19).

Samples were taken on a fortnightly basis for further analysis. The samples were generally taken from the top of the windrows (but several feet down) for consistency although there was widespread variation in the moisture content and level of degradation within the trial windrow. The relatively dry weather throughout the course of the second trial tended to retard the level of degradation. In this respect, the composting activities were very different to those of trial 1. Indeed, the fruit and vegetable windrows composted more rapidly because they retained more water (due to the vegetable material). In contrast, the brewer's grain windrows that were identical to those in Trial 1 became quite dry and eventually failed to compost properly. Interestingly, the high BG windrows seemed to compost quite well. These issues are discussed later in relation to physical and chemical properties.

The leaf-supplemented BG-containing windrows were sufficiently composted to provide material for main trials.

Conclusions from Task 2.2
- Windrows behaved differently to trial 1 mainly due to differences in precipitation.
- Leaf-BG windrows provided material sufficiently composted for trials.
- The inherent variability of the windrow system justifies the consideration of a vessel-type system for future trials.

Task 2.3: Physicochemical Analysis

Aim: To characterise the physicochemistry of high quality growing media, and composted material from Trials 1 & 2.

Material Properties

Introduction

The materials properties of compost, peat and their mixtures include soil mechanics terms such as stress transmission, compaction and cohesion related to structural characteristics such as porosity and particle size distributions as well as water content (Briscoe et al 1987; Ollett et al 1993; Zeytin and Barab 2003; Pefferkorn 1997; Das and Keener 1997). The water potential shows hysteresis effects with water content when drying and wetting. Their relationship constitutes the moisture release curve which will be constructed, analysed and compared for the different materials. The particular contribution of the matric potential will be measured. All of the properties may vary spatially within a given volume of material (Van Ginkel et al 1999), but representative samples will be taken within the scope of this study.

Soil Water Availability Studies

The pressure plate cell extractor works by removing soil moisture from soil samples through the creation of a pressure gradient in an extractor (see materials and methods). Moisture flows around each of the soil particles and out through a ceramic plate which serves as a hydraulic link. Equilibrium is reached when water flow ceases. Water availability curves relate the soil suction at which moisture is held in the soil to its moisture content.

Samples examined (see materials and methods section also):
- Latvian Peat
- Ballycommon Peat
- Sedge Peat
- J. Arthur Bowers John Innes Potting Compost No. 1
- J. Arthur Bowers Sterilised Loam
- Shamrock Potting Compost—General Potting Medium
- Bettaland compost
- Four Seasons Organic Compost
- Scottish Agricultural College Compost
- ECO Composting Ecomix
- ECO Composting Supersoil
- J. Arthur Bowers Organic Peat-free Compost
- B & Q Coir-based Peat-free Multipurpose Compost
- Fresh coir (Cocopeat)
- Toressa Nova woodfibre
- Rice husks
- IFR compost (Trial 1, BG & straw; 29 Feb. 2005; 0-3 mm fraction)
- IFR compost (Trial 1, BG & straw; June 2005; 0-6 mm fraction)
- IFR compost (Trial 2, BG & straw & leaf; December 2005; 0-6 mm fraction)

The results (FIG. 25) show that the IFR compost has water availability characteristics similar to those of the 4 peats examined, and much higher than the John Innes, Bettaland & S. Arthur Bowers Organic Peat-free products. It is also interesting to note that the coir-based product also has a very high water availability. Fresh coir (Cocopeat) and Toressa Nova woodfibre were added for comparison.

TABLE 5

Moisture retention values of samples (at 0.1 bar).

| Sample | Moisture retention at 0.1 bar | S.D. |
|---|---|---|
| ECO Composting Supersoil | 15.8 | 0.6 |
| J. Arthur Bowers Sterilised Loam | 17.3 | 1.1 |
| J. Arthur Bowers John Innes No. 1 Potting Compost | 21.7 | 0.3 |
| Bettaland compost | 37.4 | 1.8 |
| Rice husks | 40.1 | 2.5 |
| ECO Composting Ecomix | 40.7 | 0.3 |
| Scottish Agricultural College Compost | 47.8 | 0.4 |
| J. Arthur Bowers Organic Peat-free Potting Compost | 48.3 | 0.8 |
| IFR Compost (Second trial, December 2005, <6 mm, unwashed) | 55.4 | 0.1 |
| IFR Compost (Second trial, December 2005, <6 mm, washed) | 59.9 | 0.4 |
| IFR Compost (First trial, BG June 2005, 0-6 mm) | 62.2 | 0.3 |
| Four Seasons Organic Compost | 65.9 | 0.0 |
| Toressa Nova wood fibre | 65.9 | 2.1 |
| Baltic peat | 67.1 | 1.3 |
| Shamrock Potting Compost - General Potting Medium | 70.7 | 0.6 |
| Sedge peat | 74.5 | 1.1 |
| B & Q Coir-based Peat-free Multipurpose Compost | 76.5 | 0.4 |
| Fresh coir (Cocopeat) | 77.8 | 0.1 |
| Ballycommon peat | 77.9 | 0.3 |

More Detailed Evaluation of IFR Compost

Material collected from the IFR compost windrow (BG & straw, 28 Feb. 2005) was size fractionated by sieving in its "as recovered" form to ascertain the sensitivity of water availability characteristics to the particle size distribution of a particular compost (FIG. 26).

No particular trends were observed but it should be remembered that the "wet" material will contain aggregates of material of a wide particle size distribution potentially masking any differences which may be present. Nevertheless, all fractions exhibited high water characteristics similar to values obtained with peat.

Water Potential Measurements

The Dewpoint water potential apparatus was delivered and commissioned in early February 2005. Selected samples of soils, composts and cereals having a wide range of water potentials were measured and the corresponding dry weights determined using the infra-red dryer.

The apparatus measures the sum of the osmotic and matric water potential in a given sample. Soils bind water mainly through matric forces. The results (Table 6) show that all the growing media exhibit similar $a_w$ values.

TABLE 6

Water potential and $a_w$ of samples.

| Sample | Water potential (MPa) | $a_w$ | Dry wt (%) |
|---|---|---|---|
| Destarched wheat bran | −176.12 | 0.278 | 92.66 |
| Microcrystalline cellulose | −139.96 | 0.362 | 95.64 |
| Barley | −168.64 | 0.293 | 92.98 |
| Brewers Spent Grain | −127.41 | 0.396 | 92.95 |
| Rice husks | −55.64 | 0.668 | 88.67 |
| IFR Compost (Second trial, December 2005, <6 mm, unwashed) | −2.08 | 0.985 | 56.47 |
| Bettaland Product | −1.60 | 0.988 | 72.22 |
| IFR Compost (First trial, BG June 2005, 0-6 mm) | −1.50 | 0.989 | 40.90 |
| IFR Compost (First trial, BG 28 Feb. 2005, 0-3 mm) | −1.08 | 0.992 | 39.37 |
| J. Arthur Bowers John Innes No. 1 Potting Compost | −0.88 | 0.994 | 84.30 |
| IFR Compost (Second trial, December 2005, <6 mm, washed) | −0.65 | 0.995 | 45.87 |
| Shamrock Potting Compost - General Potting Medium | −0.59 | 0.996 | 44.90 |
| Latvian Peat | −0.40 | 0.997 | 48.03 |
| J. Arthur Bowers Peat-free Organic Garden Compost | −0.34 | 0.998 | 58.67 |
| ECO Composting Supersoil | −0.33 | 0.998 | 82.40 |
| J. Arthur Bowers Sterilised Loam | −0.32 | 0.998 | 85.28 |
| Sedge Peat | −0.30 | 0.998 | 30.99 |
| Ballycommon Peat | −0.28 | 0.998 | 33.42 |
| Toressa Nova wood fibre | −0.23 | 0.998 | 46.74 |
| Four Seasons Organic Compost | −0.09 | 0.999 | 38.43 |
| Fresh coir (Cocopeat) | −0.06 | 1.000 | 19.52 |
| ECO Composting Ecomix | −0.04 | 1.000 | 61.28 |
| Scottish Agricultural College Compost | 0.00 | 1.000 | 57.73 |

Water Sorption Characteristics

The water sorption isotherms of a range of peat/compost samples were determined. All results were fitted using the GAB models. The generally observed behaviour for microporous substrates is that the amount of water sorbed increases sharply as the relative humidity approaches 100%. The amount of water sorbed will also be influenced by the degree of crystallinity of the sample (Moates, 1997) (FIGS. 27-37).

TABLE 7

Sorption parameters from GAB model

| | $m_o$ | c | k | $R^2$ |
|---|---|---|---|---|
| Sedge peat | 0.1492 | 14.7726 | 0.6500 | 0.9557 |
| Ballycommon peat | 0.1058 | 5.9779 | 0.7281 | 0.9951 |

TABLE 7-continued

Sorption parameters from GAB model

| | $m_o$ | c | k | $R^2$ |
|---|---|---|---|---|
| Shamrock potting compost | 0.0924 | 424.5596 | 0.8012 | 0.7852 |
| Baltic peat | 0.0888 | 32.4267 | 0.7421 | 0.9730 |
| B&Q coir-based compost | 0.0631 | 226.561 | 0.8960 | 0.8810 |
| Brewers Grain | 0.0605 | 13.1463 | 0.8385 | 0.9865 |
| J. Arthur Bowers Peat-free compost | 0.0520 | 36.6891 | 0.8396 | 0.9264 |
| IFR compost 0-3 mm, 28 Feb. 2005 | 0.0490 | 156.1534 | 0.9134 | 0.9215 |
| Bettaland compost | 0.0235 | 48.6612 | 0.8315 | 0.8573 |
| J. Arthur Bowers J. I. No. 1 compost | 0.0159 | 23.4597 | 0.7609 | 0.9252 |
| J. Arthur Bowers Sterilised loam | 0.0082 | 200.000 | 0.7468 | 0.9624 |

Table 7 shows that the peats have different sorption parameters to the three alternatives studied.

$m_o$ is an estimate of the water monolayer determined by extrapolation of the sorption isotherm at the lower water activities. The three peats together with Shamrock potting compost have the highest values whilst John Innes No. 1, Bettaland compost & Loam have the lowest values.

k is a measure of the association of the water. The GAB model assumes multiple layers of water. For comparison, starchy products would typically give a k value of 0.70-0.77 whilst proteins a value of 0.82-0.88 (Chirife, 1992).

c is a measure of the ease with which water can be removed from the substrate.

Compaction

Compaction results are shown in FIG. 38. The general scheme is similar to previous observations for food components and larger cereal particles (Georget et al., 1994) in that the Heckel stress decreases with increasing moisture content. The Heckel stress was related to a material property, the yield stress (Heckel 1961). Subsequently it has been described as having contributions due to elastic deformation, plastic flow and particle fragmentation (Paronen and Juslin, 1983). Particle failure and re-arrangement are involved in the compaction process. A consideration of bulk density values and the relationship to other properties, e.g. particle size, will be carried out to understand the origin of the observed differences between samples.

pH & Electrical Conductivity Measurements

The pH and electrical conductivity measurements taken in accordance with the PAS 100 method are shown in the table below.

TABLE 8 pH and electrical conductivity of selected samples.

| Sample | pH | Electrical conductivity |
|---|---|---|
| Ballycommon peat | 3.95 | 10.4 mS/m |
| Baltic peat | 3.87 | 12.2 mS/m |
| Sedge peat | 4.43 | 67 mS/m |
| Shamrock Potting Compost | 5.06 | 167 mS/m |
| B&Q Coir-based compost | 5.08 | 230 mS/m |
| IFR Compost (Second trial, December 2005, <6 mm, unwashed) | 5.87 | 422 mS/m |
| Fresh coir (Cocopeat) | 6.16 | 6.7 mS/m |
| IFR Compost (First trial, BG June 2005, 0-6 mm) | 6.23 | 396 mS/m |
| IFR Compost (Second trial, December 2005, <6 mm, washed) | 6.25 | 142 mS/m |

TABLE 8-continued pH and electrical conductivity of selected samples.

| Sample | pH | Electrical conductivity |
|---|---|---|
| Four Seasons Organic Compost | 6.45 | 291 mS/m |
| Rice husks | 6.34 | 39 mS/m |
| Toressa Nova wood fibre | 7.26 | 71 mS/m |
| J. Arthur Bowers John Innes No. 1 | 7.27 | 75 mS/m |
| J. Arthur Bowers Sterilised Loam | 7.43 | 36 mS/m |
| Bettaland compost | 7.60 | 381 mS/m |
| Scottish Agricultural College Compost | 7.92 | 90.4 mS/m |
| ECO Composting Ecomix | 8.38 | 141 mS/m |
| J. Arthur Bowers Peat-free Compost | 8.39 | 153 mS/m |
| ECO Composting Supersoil | 8.72 | 30.8 mS/m |

It is particularly noticeable that most of the composted materials exhibit naturally high electrical conductivity. This may limit incorporation rates for composted material due to its negative effect on germination, rates of root growth and flower development compared with peat-based mixes. (See plant trials and approaches to successfully address the issue, in the Examples below).

Evaluation of Particle Size Distribution by Sieve Analysis

The particle size distributions of the peats & peat alternatives are shown in the following graphs (FIG. 39 A-W). It can be seen that the IFR compost collected on 28 Feb. 2005 has a noticeably different particle size distribution to the other materials. The IFR compost collected on 8 Jun. 2005 would seem to have undergone further structural degradation.

Particle size and distribution has an important impact on the aeration, water-holding and compaction of the growing medium. The peat samples gave a broad range of sizes. The IFR compost evaluated in this section was derived from the 0-3 mm grade and hence the particles are distributed towards the right-hand end of each graph. Larger grades (3-6, 6-12 etc) gave a wider profile as expected. Thus, LFR compost may be tailored through sieving and re-blending to suit growers requirements.

Bulk Density

The bulk density of the various peat & peat alternatives (determined in accordance with a modified version of BS EN 12580:2000) is given in the table below:

TABLE 9

Bulk density values of samples.

| Sample | Bulk density (g/l) | Dry wt. (%) |
|---|---|---|
| Toressa Nova wood fibre | 151 | 46.74 |
| Rice husks | 173 | 88.67 |
| Ballycommon peat | 295 | 41.64 |
| Baltic peat | 337 | 44.56 |
| IFR Compost (Second trial, December 2005, <6 mm unwashed) | 441 | 56.47 |
| IFR Compost (Second trial, December 2005, <6 mm, wasted) | 441 | 45.87 |
| Fresh coir (Cocopeat) | 446 | 19.52 |
| Shamrock Potting Compost - General Potting Medium | 466 | 23.99 |
| IFR Compost (First Trial, June 2005, 0-3 mm) | 536 | 41.14 |
| IFR Compost (First Trial, June 2005, 3-6 mm) | 542 | 38.40 |
| IFR Compost (First Trial, June 2005, 0-6 mm) | 586 | 40.90 |
| Sedge Peat | 598 | 42.80 |
| Four Seasons Organic Compost | 739 | 38.43 |
| ECO Composting Ecomix | 827 | 61.28 |
| Bettaland compost | 914 | 75.96 |
| Scottish Agricultural College Compost | 974 | 57.73 |
| J. Arthur Bowers John Innes No. 1 Potting Compost | 1226 | 82.70 |
| ECO Composting Supersoil | 1494 | 82.40 |
| J. Arthur Bowers Sterilised Loam | 1539 | 95.51 |

The bulk density of the IFR compost is just over 500, and therefore similar to the PAS requirements. The value of bulk density will need to be evaluated further in relation to moisture content, and its propensity for tailoring in relation to particle size and settling characteristics.

Air-Filled Porosity

An advisory classification system relating air-filled porosity (AFP) values to the ease of compost management (Bragg & Chambers, 1988) is reproduced below:

TABLE 10

Advisory classification system for air-filled porosity values.

| Classification | | Suggested suitability | Conditions |
|---|---|---|---|
| Index 0 | AFP (%) <7 | Short term pot plants/ bedding plants | Very careful watering, especially under low transpiration conditions (capillary matting) |
| Index 1 | AFP (%) 7-10 | Nursery stock in large pots Pot & foliage plants (large pots) Bedding plants | Drained sand beds for overwintering Careful watering management |
| Index 2 | AFP (%) 10-15 | Pot and foliage plants Bedding plants Nursery stock (small/ medium pots) | Watering management less critical, as compost relatively freely draining. |
| Index 3 | AFP (%) 15-25 | Pot and foliage plants (small pots) Long term nursery stock Azaleas, orchids (eriphytes) | Frequent watering will be required |

AFP values were determined for a range of peat/peat alternatives and soils at IFR. The values are shown in the table below:

TABLE 11

Air-filled porosity values of samples.

| Sample | AFP (%) | S.D. |
|---|---|---|
| ECO Composting Supersoil | 1.6 | 0.1 |
| J. Arthur Bowers Sterilised Loam | 4.5 | 2.4 |
| J. Arthur Bowers John Innes No. 1 Potting Compost | 4.8 | 0.8 |
| J. Arthur Bowers Organic Peat-free Potting Compost | 9.6 | 3.1 |
| Four Seasons Organic Compost | 10.6 | 0.3 |
| Fresh coir (Cocopeat) | 10.9 | 0.8 |
| ECO Composting Ecomix | 11.1 | 1.7 |
| Sedge Peat | 11.6 | 0.6 |
| Bettaland compost | 13.6 | 3.5 |
| Shamrock Potting Compost - General Potting Medium | 15.8 | 4.8 |
| Scottish Agricultural College Compost | 18.2 | 1.1 |
| IFR Compost (Second trial, December 2005, <6 mm, unwashed) | 24.2 | 0.7 |
| IFR Compost (Second trial, December 2005, <6 mm, washed) | 25.2 | 4.5 |
| IFR Compost (First trial, BG June 2005, 0-6 mm) | 27.9 | 3.6 |
| B & Q Coir-based Peat-free Multipurpose Compost | 34.8 | 4.3 |

TABLE 11-continued

Air-filled porosity values of samples.

| Sample | AFP (%) | S.D. |
|---|---|---|
| Toressa Nova wood fibre | 43.3 | 1.2 |
| Rice husks | 78.9 | 0.8 |

Discussions with Neil Bragg indicate that (apart for the Bettaland compost), the values obtained are in the expected range for the various samples.

The air filled porosity (AFP) of compost is a function of the quality of the original waste material and the degree of control exerted during composting. Conventional composts lack the necessary structure and therefore would normally be expected to have a lower AFP than that of peat. Growers require growing media with sufficiently high air-filled porosity—typically nursery stock growers require an AFP value around 25% whilst bedding plant producers require a value of 15-18%. AFP is important in preventing growing media from becoming anaerobic. Hence, IFR compost provides a good AFP.

Plant Cell Wall Chemistry

Trial 1

Yields of AIRs and Carbohydrate Content

The AIRs were prepared by purifying the compost mixes so that the remaining residue consisted solely of the cell wall material (CWM) minus the cellular contents. The yields of the AIRs obtained were ~25% on average which increased with time except for the brewer's grain (BG) mix. The increases in the yields were correlated by depletion in the carbohydrate content (see FIG. 40) suggesting that in these mixes all the readily-available carbon source had been utilised. The yield of BG mix remains stable over time suggesting carbon reserve capable of maintaining metabolism.

Composted material was analysed for the cell wall carbohydrate composition. The results (FIG. 40) showed that in all cases (except for mixed leaf) the sugars had declined to a stable value after 70 days.

The BG windrow material, being of a quality which lent itself to potential exploitation, was sampled up to 150 days. It is clear that some further but slow degradation occurred during that period.

Comparison of compost mixes with peat yielded alcohol-insoluble residues (AIRs) ranging from 48% to 24%. Interestingly, Somerset sedge, Bettaland, JAB peat-free compost and Coir depicted the least amount of sugars and correspondingly the lowest yield of AIR (FIG. 41).

Phenolic Acid Analysis

Phenolics are ubiquitous plant components which have a function in plant defence and structure. The phenolic profile between BG mix and straw was very similar affording a total of 5 and 14 µg/mg dry weight. In all the other mixes a similar but lower level of phenolic content of 2 µg/mg dry weight was measured on average (results not shown). The results showed a general decrease in the compounds over time but we could not unequivocally designate any specific trends in relation to degradation. The total amount of phenolics measured in the peat were similar to the other windrow mixes but lower than either straw or BG.

Klason Lignin Analysis

Lignin is derived (in part) from the same pathway as the phenolics and imparts strength and rigidity to plant structure. Klason lignin is a gravimetric measure of the residue remaining after acid hydrolysis and normally indicates the toughness of a tissue. Lignin analysis of AIRs depicted a gradual increase in the lignin content of BG and melon mixes. By far the highest lignin content was measured in the BG mix at 42% followed by the melon mix at 22% respectively. Analysis of commercial peats demonstrated maximum values of 48% and minimum values of 22% (FIG. 44).

Microscopy

See FIG. 43: (1) onion mix, (2) mixed leaf, (3) melon and (4) brewer's grain Microscopy After Composting (Jan. 24, 2005)

(a) Onion: onions are relatively intact amongst the semi-rotted straw although the tissues are discoloured and waterlogged. Fungal colonies and slimy bacterial colonies are present on the surface of the onion scales and probably within the onion flesh. A heavy, wet and blackened malodorous sample (FIG. 43—1).

(b) Mixed leaf: the leaf material has collapsed into a slime amongst the semi-degraded straw. Only the lignified xylem survives in the slime in this wet, dark malodorous sample (FIG. 43—2).

(c) Fruit: as in mixed leaf, the fruit tissue has mostly degraded, apart from the melon seeds which have rotted internally. This sample does not contain the wet, slimy and malodorous components seen in the mixed leaf compost (FIG. 43—3).

(d) Brewers' Grain: the internal tissues of the grain have degraded and there is an abundance of surface fungal mycelium throughout the sample. The outer glumes (galea and lemma) of the grain, being of similar composition to the straw, have resisted major breakdown, and together with the semi-degraded straw have produced a light-coloured, relatively-dry and pleasant-smelling sample (FIG. 43—4).

In all cases, the straw was largely intact, but had become spongy in texture, allowing water penetration. The Brewers' Grain compost was the best-drained sample. That derived from onion or mixed leaf waste was the heaviest and foulest smelling.

Second Windrow Trials

Chemical Analysis

See FIG. 45.

The second trial of windrows showed a range of composting activities. The BG-mix windrow, which comprised the same mixture as the BG windrow in trial 1, showed little degradation over the 3 months reported. This is consistent with the observation that the windrow dried out, and failed to compost properly. In contrast, the high BG windrow showed significant degradation of cell wall material, with a rapid decrease in hemicellulosic arabinose and xylose. A similar degradation rate was seen with the BG+fruit mix. However, the most rapidly composting mixture was the BG-leaf mix, which showed a ¾ reduction in key structural cell wall sugars during the 4 month period.

Several months later, the leaf-BG mixture windrow was chosen as the source material for full trials.

Conclusions from Task 2.3

IFR compost (24 Jan. 2004) demonstrated water availability characteristics similar to the 4 high quality peats, and was much higher than the John Innes, Bettaland & J. Arthur Bowers Organic Peat-free products. It is also interesting to note that the coir-based product also has very high water availability.

Different grades of the IFR compost (size fractionated) also showed these high moisture retention characteristics.

Water potential of IFR compost was similar to other growing media.

pH of IFR compost was naturally neutral

Electrical conductivity of IFR compost was much higher than peat growing media and has had to be addressed. It has now been reduced to within PAS requirements by aqueous extraction (see below).

Sieve analysis of IFR compost showed a good particle size distribution, providing an opportunity for tailoring the characteristics through fractionation and re-blending.

Analysis of plant cell walls show that the carbohydrate components degrade to a basal level after about 60 days and that residual material is rich in lignin. The high levels of lignin in Bettaland compost reflects the high level of sand and wood fragments. The IFR compost (January 24$^{th}$) has similar carbohydrate composition and levels to peat and peat-rich growing media, indicating the retention of comparable quantities of plant cell wall structure.

Microscopy of the composting samples showed declining structural material.

Second windrow trials showed that weather conditions can impact on rate and nature of composting process. Leaf-supplemented BG & Straw windrows appear to compost satisfactorily.

Task 2.4: Microbiological and Biochemical Analysis

Aim: to measure the numbers and types of predominant micro-organisms during the composting process Microbiological Assessment First Windrow Trial The microflora was categorised as either:
aerobic mesophilic bacteria,
aerobic thermophilic bacteria,
*Pseudomonas* spp.,
yeasts and moulds,
microaerophilic bacteria
strict anaerobic bacteria.

Interestingly, the microbiological composition of the windrows was broadly similar, with the exception of the initial numbers of thermophilic aerobic bacteria. The numbers of these bacteria are tabulated below, and (as representative data), the microbiological composition of the windrows containing onion and straw is shown (Table 12, FIGS. 46-51).

TABLE 12

Numbers of thermophilic aerobic bacteria isolated from the separate feedstocks and from the windrows below

| | Numbers of bacteria ($\log_{10}$ colony forming units per gramme): | | |
|---|---|---|---|
| | In the individual feedstocks at: | In the windrows at: | |
| Windrow feed stock | Day zero | 40 days | 61 days |
| Straw | 3.97 | | |
| Onion | 3.89 | 7.48 | 7.60 |
| Melon | 5.43 | 7.73 | 7.47 |
| Leafy greens | 4.54 | 7.36 | 7.65 |
| Brewers' Spent Grain | 6.86 | 7.62 | 7.71 |

Further Sampling

Table 13 compares the numbers of key micro-organisms in the IFR seedling trial compost, harvested from the Brewer's Spent Grain Windrow, February 2005, and the IFR seedling trial compost, harvested from the Brewer's Spent Grain Windrow, June 2005 (with and without a heat treatment).

TABLE 13

| IFR seedling trial compost harvested: | Number of viable micro-organisms ($\log_{10}$) per gramme compost: | | | | | |
|---|---|---|---|---|---|---|
| | aerobic mesophilic bacteria | aerobic thermophilic bacteria | *Pseudomonas* spp. | yeasts and moulds | micro-aerophilic bacteria | strict anaerobic bacteria |
| February | 7.61 | 7.72 | 5.80 | 4.81 | 5.70 | 6.53 |
| June (with heat treatment) | 6.59 | 7.70 | <2 | <2 | 6.12 | 6.38 |
| June (without heat treatment) | 7.29 | 7.33 | 6.08 | 5.62 | 6.18 | 6.44 |

TABLE 14

Presumptive identification of key components of the microflora.

| | Colony | Gram | | | Growth in broth at: | |
|---|---|---|---|---|---|---|
| Windrow source | description | reaction | Oxidase | Catalase | 20° C. | 55° C. |
| | *Pseudomonas* spp. | | | | | |
| Onion | 1. large dry white | – rods | + | + | + | |
| | 2. pink dimpled | – rods | – | + | + | |
| | 3. cream/pink high domed mucoid | – rods | + | + | + | |
| Melon | 1. flat yellow spreading | – rods | + | + | + | |
| | 2. cream/white domed | Tiny – rods (coccobacilli) | – | + | + | |

TABLE 14-continued

Presumptive identification of key components of the microflora.

| Windrow source | Colony description | Gram reaction | Oxidase | Catalase | Growth in broth at: 20° C. | 55° C. |
|---|---|---|---|---|---|---|
| Leafy greens | 1. flat yellow translucent spreading | Small feint − rods | + | Slow weak + | + | |
| | 2. cream/white domed mucoid | − rods | Slow + | + | + | |
| | 3. flat cream/pink | − rods | + | + | + | |
| Brewer's spent grain | 1. flat yellow translucent spreading | − rods | + | + | + | |
| | 2. cream domed mucoid | − rods | + | + | + | |
| | 3. red shiny | − rods | − | + | + | |
| | Aerobic thermophilic bacteria | | | | | |
| Onion | 1. flat grey/clear spreading | + rods | + | + | + with pellicle | + |
| Melon | 1. flat grey/clear spreading | + rods with spores | + | + | + as above | + |
| Leafy Greens | 1. grey/clear spreading | + rods | + | + | + as above | + |
| | 2. small dry white irregular | + cocci | | | + cloudy growth but pellicle | + |
| Brewer's spent grain | 1. grey/clear spreading | + rods some distended by spores | slow + | + | + as above with pellicle | + |
| | Aerobic mesophilic bacteria | | | | | |
| Onion | 1. medium domed centre white/grey | + coccobacilli | − | + | + | − (5 days) |
| Melon | 1. large flat dry | Fat + rods with spores | − | + | + | − (5 days) |
| Leafy greens | 1. medium domed shiny pink/cream (pseud like sheen) | Small − rods | + | + | + | − (5 days) |
| Brewer's spent grain | 1. small shiny white | Small + rods | − | + | + | − (5 days) |
| | Yeasts and moulds | | | | | |
| Onion | 1. small white dry | Yeasts | − | + | | |
| | 2. white cols fungal hyphae | | | | | |
| Melon | 1. medium grey shiny with oily sheen | + rods some long | − | + | | |
| | 2. small grey dry dimpled | − rods | − | + | | |
| Leafy greens | 1. Small white shiny/wet | very small − rods/cocci bacilli | − | + | | |
| Brewer's spent grain | 1. grey medium slimy | small − rods/cocco bacilli | − | + | | |
| | Microaerophilic bacteria | | | | | |
| Onion | 1. small white shiny | + rods | − | − | | |
| Melon | 1. medium pink/matt | Yeasts | − | + | | |
| | 2. small white shiny | + cocci | − | − | | |
| Leafy greens | 1. small white shiny | + small rods or cocci | − | − | | |

TABLE 14-continued

Presumptive identification of key components of the microflora.

| Windrow source | Colony description | Gram reaction | Oxidase | Catalase | Growth in broth at: 20° C. | 55° C. |
|---|---|---|---|---|---|---|
| Brewer's spent grain | 1. small white shiny | + cocci | – | – | | |
| | | Strict anaerobic bacteria | | | | |
| Onion | 1. small white shiny | + rods | – | – | | |
| | 2. medium pink/white matt | Yeasts | – | + | | |
| Melon | 1. medium cream/pink shiny | – rods | + | – | | |
| Leafy greens | 1. small white/cream shiny | – rods v feint | + | + | | |
| Brewer's spent grain | 1. small white shiny domed | + cocci | – | – | | |

Cell-Wall Degrading Enzymes
Measurement of Xylanase Activity

Hemicellulolytic (xylanase) activity was selected for measurement in samples collected at different stages of composting using standard methods. The results obtained are shown in FIG. 52.

As expected, there is no change in xylanase activities during the degradation of the melon, leaf and onion windrows. There is however variation in the xylanase activity in the brewer's grain windrow which is significantly higher for the first 60 days. This is assumed to be due to the concentration of the microflora on pectinaceous substrates in the other composts. This has not been evaluated further. It should be noted that the brewers' grain substrate contained no xylanase activity at the start of the composting process presumably due to heat inactivation during the brewing process.

Conclusions from Task 2.4
  Microflora of windrows in Trial 1 were of similar numbers and types
  The population was dominated by thermophilic bacteria, predominantly Actinomycetes and a *Bacillus*-like organism (Gram+ve, spore former)
  Xylanase activity reflected the levels of hemicellulose and pectic polysaccharides as potential substrates for bacterial growth and development.

Task 2.5. Horticultural Potential
Growing Trial 01—Germination of Marigold Seeds In advance of the evaluation trials by the Commercial Growers, small quantities of IFR compost (Trial 1, BG+Straw, 24 Jan. 2005, 0-3 mm fraction) were subjected to germination trials by Bulrush Horticulture Ltd. The results showed that a 30% IFR compost—peat mix had no negative impacts on germination of marigold seedlings. The mixes compared were as follows:

Mixes: Standard Levington seeding compost
  Standard seeding with 30% Toressa woodfibre
  Standard seeding with 30% IFR selected material The results are shown in FIG. 53 and show no appreciable difference in germination rate and seedling growth at 30% incorporation of IFR Compost (January 2005, 0-3 mm).

Germination in all mixes was 100% and plants have all grown successfully to $1^{st}$ true leaf.

Growing Trial 02—Propagation of Viola Plugs

Further more detailed propagation trials were carried out at Stockbridge Technology Centre (Yorkshire), Farplant Sales (Fleurie Nursery, Chichester) and IFR (Norwich) using single colour pansy plug-plants (*Viola cornuta* sp. Ultima Supreme Yellow). The compost mixes (prepared by Bulrush Horticulture) are given in Table 15. Results are shown in Table 16.

TABLE 15

Composition of trial mixes and nitrogen:phosphorus:potassium levels

| Mix no: | Contents | Fertilizer | g/l | N | P | K | Lime g/l |
|---|---|---|---|---|---|---|---|
| 1 | 100% peat 12 mm | 15 10 20 | 1.5 | 225 | 62 | 240 | 4.5 |
| 2 | 25% IFR 75% peat | MAP CaNO$_3$ | 0.1 0.7 | 82 12 130 | 37 25 | 570 | 3.3 |
| | | totals | | 224 | 62 | 570 | |
| 3 | 25% Bettaland 75% peat | MAP CaNO$_3$ | 0.1 0.45 | 129 12 85 | 40 25 | 724 | 3.3 |
| | | totals | | 226 | 65 | 724 | |
| 4 | 25% Toressa 75% peat | 15 10 20 CaNO$_3$ | 1.2 0.25 | 177 48 | 50 | 240 | 3.3 |
| | | totals | | 225 | 50 | 240 | |
| 5 | 50% IFR 50% peat | CaNO$_3$ | 0.3 | 167 60 | 75 | 1000 | 2.3 |
| | | totals | | 227 | | | |
| 6 | 50% Bettaland 50% peat | | | 259 | 79 | 1449 | 2.3 |
| 7 | 50% Toressa 50% peat | CaNO$_3$ 15 10 20 | 0.5 0.86 | 95 130 | 35 | 138 | 2.3 |
| | | totals | | 225 | | | |
| 8 | 100% IFR | | | 334 | 150 | 2000 | |

Approximately thirty plug-plants (supplied by Wilgro) were grown in each compost mix at each of the three trial sites. These were split into two blocks—both blocks receiving plain water for the duration of the trial. (NOTE: the blocks were later combined as it was decided not to proceed with application of fertiliser to one of the blocks).

An overhead photograph of each batch of plants grown in the different composts was taken on a weekly basis at each location (FIG. 54).

The time to rooting out of plants in the different composts was recorded as well as the time to first flower for 50% of the plants and 100% of the plants.

On a weekly basis, the plants were scored on the basis of the following attributes, using a scale of 1-5 where 1 is poorest and 5 is best: Foliage colour; Vigour.

The plants grown in 100% IFR compost appear stunted in their growth and show signs of nitrogen deficiency (chlorosis).

TABLE 16

Viola growing trial results:

| Mix | Weekly Score (Foliage colour) | | | | | Weekly Score (Vigour) | | | | | Time to rooting (days) | 1st flower (days) 50% | 1st flower (days) 100% |
|---|---|---|---|---|---|---|---|---|---|---|---|---|---|
| IFR Norwich | | | | | | | | | | | | | |
| 1 | nd | 5 | 5 | 5 | 5 | 5 | 5 | 5 | 5 | 5 | 11 | 24 | 29 |
| 2 | nd | 5 | 5 | 4 | 4 | 5 | 5 | 5 | 5 | 5 | 11 | 22 | 30 |
| 3 | nd | 5 | 5 | 4 | 4 | 5 | 4 | 5 | 5 | 5 | 11 | 22 | 31 |
| 4 | nd | 5 | 5 | 4 | 5 | 5 | 5 | 5 | 5 | 5 | 11 | 22 | 31 |
| 5 | nd | 2 | 3 | 3 | 4 | 5 | 2 | 4 | 4 | 4 | 11 | 22 | 42 |
| 6 | nd | 5 | 4 | 3 | 3 | 3 | 2 | 3 | 2 | 3 | 15 | 24 | 30 |
| 7 | nd | 5 | 5 | 4 | 5 | 5 | 5 | 5 | 4 | 4 | 11 | 22 | 30 |
| 8 | nd | 1 | 1 | 1 | 1 | 4 | 1 | 1 | 1 | 1 | 15 | 24 | 42 |
| Farplant Sales | | | | | | | | | | | | | |
| 1 | nd | 5 | 5 | 4 | 4 | nd | 5 | 5 | 5 | 4 | 14 | 27 | 27 |
| 2 | nd | 5 | 5 | 5 | 4 | nd | 5 | 4 | 5 | 4 | 14 | 27 | 27 |
| 3 | nd | 5 | 4 | 4 | 4 | nd | 4 | 3 | 3 | 3 | 14 | 27 | >34 |
| 4 | nd | 4 | 4 | 3 | 3 | nd | 4 | 4 | 4 | 4 | 14 | 27 | 34 |
| 5 | nd | 4 | 3 | 4 | 4 | nd | 4 | 4 | 5 | 4 | 14 | 20 | 27 |
| 6 | nd | 4 | 4 | 3 | 4 | nd | 3 | 2 | 2 | 1 | 14 | 27 | >34 |
| 7 | nd | 4 | 3 | 3 | 2 | nd | 5 | 4 | 3 | 2 | 14 | 27 | 27 |
| 8 | nd | 3 | 2 | 2 | 3 | nd | 3 | 3 | 3 | 3 | 14 | 27 | >34 |
| Stockbridge Technology Centre | | | | | | | | | | | | | |
| 1 | 4.8 | 4.7 | 4.8 | 4.2 | n.d | 3.5 | 4.2 | 4.5 | 4.7 | n.d | | | |
| 2 | 3.5 | 4.4 | 4.2 | 3.7 | n.d | 2.9 | 3.7 | 4.2 | 4.6 | n.d | | | |
| 3 | 3.0 | 4.5 | 4.7 | 4.1 | n.d | 2.1 | 2.6 | 3.7 | 4.2 | n.d | | | |
| 4 | 4.5 | 4.8 | 4.1 | 3.8 | n.d | 3.5 | 4.3 | 4.7 | 4.8 | n.d | | | |
| 5 | 4.4 | 4.6 | 3.9 | 3.5 | n.d | 3.2 | 3.5 | 4.3 | 4.4 | n.d | | | |
| 6 | 1.8 | 2.2 | 5.0 | 4.3 | n.d | 1.6 | 1.9 | 2.0 | 2.4 | n.d | | | |
| 7 | 4.2 | 4.9 | 4.6 | 3.9 | n.d | 3.4 | 4.0 | 4.3 | 4.3 | n.d | | | |
| 8 | 3.8 | 3.1 | 2.3 | 2.5 | n.d | 2.8 | 2.5 | 3.0 | 3.0 | n.d | | | |

(A photograph of the 5 plants that are used as assessment standards for vigour/foliage scoring was taken for reference purposes). In addition, four weeks into the trial a marketing score was made based on the following scoring system.

| | |
|---|---|
| 1 | Unmarketable - high level of foliar discoloration, disease and/or excessive stretching suitable only for dumping |
| 2 | Poor quality plants - some incidence of above, but less pronounced |
| 3 | Marketable plants - material that would be suitable for sale at major box stores |
| 4 | Above average marketable plants |
| 5 | Premium marketable plants - very high quality plants generally not seen for sale at major chains. |

TABLE 17

Overall marketing scores for viola trials

| Mix | Overall Marketing Score IFR | Farplant Sales | Stockbridge | Average Score |
|---|---|---|---|---|
| 1 | 3 | 3 | 4.4 | 3.5 |
| 2 | 3 | 4 | 4.1 | 3.7 |
| 3 | 2 | 2 | 3.3 | 2.4 |
| 4 | 3 | 3 | 3.6 | 3.2 |
| 5 | 2 | 4 | 3.3 | 3.1 |
| 6 | 2 | 1 | 1.6 | 1.5 |
| 7 | 3 | 1 | 3.4 | 2.5 |
| 8 | 1 | 2 | 1.7 | 1.6 |

The above results show that IFR Compost can be incorporated into reduced peat products at a level between 25 & 50%.

Further trials were instigated at IFR (Norwich) to investigate this problem using F1 hybrid viola seeds 'Penny Orange Jump Up' purchased from Mole Seeds, Colchester, Essex and coriander seeds.

Growing Trial 03—Germination of Coriander Seeds I

A separate germination trial was conducted at Swedeponic using coriander seed (*Coriandrum sativum*) grown in the same peat/compost mixes.

For this trial, coriander seed was sown mechanically in approximately 30 pots of each of the eight compost mixes used for the viola trials and a peat mix regularly used by Swedeponic.

The time to germination or 1st true leaf was recorded during the trial with a final assessment at the expected time of harvest (around four weeks) measuring the following criteria:
Number of seeds germinated
Weight of foliage
(Possibly) height of plant A visual observation of the different mixes revealed that the seeds in 100% IFR compost & 50% Bettaland failed to germinate after 11 days. All of the other seedlings germinated although it should be noted that none of the seedlings appeared to grow as well as those sown in the Swedeponic peat mix.

As expected, the standard deviations are quite large. Nevertheless, the results are quite promising—IFR compost can be incorporated into a peat mix at 50% with no significant effect on the weight of foliage at harvest.

The results for 75% Bettaland:25% peat and 100% IFR compost are noticeably worse than the other mixes in common with the viola trials (FIGS. 55-59).

Growing Trial 04—Coriander and Viola Germination Studies in Relation to Conductivity of IFR Compost Further exploratory trials were carried out at IFR Norwich to examine the effect of lowering the conductivity of the compost mixes (aqueous extraction) and reducing the amount of un-degraded straw in the mix by grading on size.

IFR composts were re-washed and homogenised to reduce the concentration and amount of salts in the medium. The resulting washed composts had an electrical conductivity of 142 mS/m, which was a lower level of conductivity than in the pre-washed IFR composts.

Twenty five seeds (*Viola cornuta* sp. Penny Orange Jump Up) purchased from Mole Seeds, Colchester, Essex were planted in a 3.5" pot containing each of the following mixes.
Mix 1: 100% Shamrock moss peat (commercial, non-supplemented)
Mix 2: 50% Shamrock moss peat: 50% IFR compost (0-3 mm BG Jun. 6, 2005)
Mix 3: 50% Shamrock moss peat: 50% IFR compost (3-6 mm BG Jun. 6, 2005)
Mix 4: 100% IFR compost (0-3 mm BG Jun. 6, 2005)
Mix 5: 100% IFR compost (3-6 mm BG Jun. 6, 2005)
Mix 6: 50% Shamrock moss peat: 50% IFR compost (0-3 mm BG Jun. 6, 2005), reduced conductivity
Mix 7: 50% Shamrock moss peat: 50% IFR compost (3-6 mm BG Jun. 6, 2005), reduced conductivity
Mix 8: 100% IFR compost (0-3 mm BG Jun. 6, 2005), reduced conductivity
Mix 9: 100% IFR compost (3-6 mm BG Jun. 6, 2005), reduced conductivity.

In general, the germination of the viola seedlings was much enhanced (probably optimal) through the use of reduced-conductivity compost as opposed to unwashed material. It should be noted that the mixes were not equalized prior to the design of this experiment and this may explain why peat is apparently poorer than the IFR composts.

The effect of increasing the amount of undegraded straw in the mix through using the 3 to 6 mm fraction was not clear although in this trial and the subsequent coriander trial, the 100% IFR (3-6 mm unwashed) behaved poorly. We believe this is due to poor water migration to the seeds due to the large particle size in this mix, and lack of capillary action (FIG. 60).

Ten viola seedlings from each compost mixture were then transplanted into pots containing the same mixes for onward growing. Initial observations showed that the seedlings were more advanced in the washed mixes compared with the unwashed equivalents.

The transplanted seedlings performed well in the reduced conductivity mixes (50% peat:50% IFR 0-3 mm washed, 50% peat:50% IFR 3-6 mm washed and 100% IFR 0-3 mm washed). These three mixes resulted in healthy plants all reaching flower. The seedlings died in the high conductivity mixes and also the 100% IFR 3-6 mm washed sample. The failure of the IFR 3-6 mm washed sample is probably due to poor water movement in the compost due to the large particle size.

A similar experiment looking at the germination of coriander seeds was undertaken. Again the germination and growth in the washed material was much superior to that in the unwashed materials (FIGS. 61-62).

Growing Trial 05—Nursery Stock Trial on Poppies (*Papaver orientalis*) and Perennial Wallflowers (*Erysimum*)

Further IFR compost (0-6 mm) was prepared from the second trial windrows by mixing the following samples:
BG+LEAF 1 collected 29 Sep. 2005
BG+LEAF 1 collected 3 Nov. 2005
BG+LEAF 2 collected 5 Oct. 2005
BG+LEAF 2 collected 3 Nov. 2005

A total of 400 litres of material was mixed and split into two equal aliquots. One aliquot was washed twice to lower the electrical conductivity and allowed to dry.

The prepared material was sent to Bulrush Horticulture for mixing and onward transportation to Farplant Group for nursery stock trials—these trials are now underway using poppies (*Papaver orientalis*) and perennial wall flowers (*Erysimum* Apricot Delight).

The use of Toressa woodfibre and propagation grade bark as peat replacements along with IFR compost as a 50:50 mix is designed to achieve a 100% peat-free mix without the need for washing and drying. Whilst the initial IFR trials of washed material are very encouraging, it is obviously necessary to evaluate the costs of this process.

TABLE 18

Composition of trial mixes

| Mix Code | IFR | Peat | Bark | Toresa | Washed |
|---|---|---|---|---|---|
| A | 75% | 25% | | | Y |
| B | | 100% | | | |
| C | 50% | | 50% | | N |
| D | 50% | 50% | | | N |
| E | 100% | | | | Y |
| F | 50% | | | 50% | N |
| G | 100% | | | | N |
| H | 50% | 50% | | | Y |
| I | | 50% | | 50% | |
| J (Nursery) | | 75% | 25% | | |

*Erysimum* plants were potted in each of twenty 2 litre pots during week 51 (16 Dec. 2005) at Kirin Agribio Toddington Ltd (part of the Farplants Group). These were assessed for root growth and overall plant development (FIG. 65).

TABLE 19

Initial results

| Assessment | Date | A | B | C | D | E | F | G | H | I | J |
|---|---|---|---|---|---|---|---|---|---|---|---|
| Handling of Compost/Flowability 1 (lowest) to 5 (highest) | 16/01/2006 | 3 | 4 | 3 | 3 | 3 | 4 | 2 | 4 | 4 | 4 |
| Dryness (requirement for additional water) 1 (lowest) to 5 (highest) | 16/01/2006 | 3 | 4 | 3 | 1 | 4 | 2 | 1 | 4 | 2 | 5 |
| Weeks to root to side of pot | Ongoing | 4 | 3 | | 4 | 4 | | | 3 | 4 | 4 |
| Weeks to root around base of pot | Ongoing | 6 | 4 | | | 5 | | | 4 | 6 | 5 |

The plant was removed along with the soil to assess the amount of root growth. The time taken for the roots to reach the side of the pot and the base of the pot were recorded on a weekly basis. The lack of structure/collapse of the removed soil indicated lack of root growth.

In addition, poppies (*Papaver orientalis*) were potted in 1 litre pots containing the same compost mixes during week 2

(Sep. 1, 2006) at Sandfield Plants Ltd, Littlehampton, West Sussex—again twenty plants were used per treatment (FIG. 66).

The nursery stock trials are on-going and are scheduled to be re-assessed in May 2006 to enable further conclusions to be drawn on the effectiveness of the different compost mixes.

Conclusions from Task 2.5

Propagation of viola plugs demonstrate that IFR compost, subject only to size grading, is suitable for supplementing other (peat)-based growing media up to 50% and possibly up to 75% with no adverse effects.

Germination trials with coriander seeds have highlighted a potential problem of high conductivity in un-treated IFR compost.

The problem of high conductivity has been successfully addressed by aqueous extraction which reduces the conductivity by 80%. Further trials (at IFR) with coriander and viola seeds have demonstrated that the lower conductivity IFR compost no longer reduces the rate and extent of seed germination and subsequent seedling growth.

IFR compost produced from windrows (second windrow trials) has been treated for use in a fall growing trial with nursery stock plants.

Initial results are very encouraging with good root growth observed in IFR compost comparable to that seen for the standard nursery stock mix.

Conclusions from Objectives 1 and 2

The main aim of the research in Objectives 1 and 2 was to assess the feasibility of producing high-quality horticultural growing media from the controlled composting of traceable, sustainable and locally-produced plant-based food processing waste. This involved replicating plant-structure-dependent physicochemical characteristics found in high-quality growing media.

That research has demonstrated:

Peat Development

High quality peat results from the partial degradation (mechanism not clear) of plant cell wall material, resulting in lower carbohydrate and higher phenolic components. If degradation is prolonged, the quality of the peat is reduced (as in the lower levels).

Composting of Food-Processing Co-Products:

1) The composting process can be controllably terminated at a point where high-levels of plant structure remain in the compost
2) Microflora were of similar numbers and types across windrows, and were dominated by thermophilic bacteria, predominantly Actinomycetes and a *Bacillus*-like organism;
3) The retained structure provides the following physicochemical characteristics important in high-quality growing media:
   a. Residual plant cell wall structure as indicated by the retention of cell wall sugars and lignin commensurate with the functional levels found in high-quality peat;
   b. Relevant particle size distribution which can be tailored for Grower requirements;
   c. Good water retention, similar to that in peat and considerably higher than in loans and traditional composts;
   d. Good air-filled porosity;
   e. High conductivity, which can be lowered to PAS requirements by appropriate extraction processes
4) There are several characteristics which require attention in order to optimise the growing media as a potential peat alternative:
   a. Windrow composting is not sufficient to create a uniform product
   b. Possible nitrogen deficiency in trialled plants may result from a surfeit of insufficiently degraded straw;
5) Propagation of viola plugs demonstrate that IFR compost, subject only to size grading, is suitable for supplementing other (peat)-based growing media up to 50% and possibly up to 75% with no adverse effects.
   a. The problem of high conductivity has been successfully addressed by aqueous extraction which reduces the conductivity by 80%. Further trials (at IFR) with coriander and viola seeds have demonstrated that the lower conductivity IFR compost no longer reduces the rate and extent of seed germination and subsequent seedling growth.
   b. IFR compost produced from windrows (second windrow trials) is currently being treated for use in a full growing trial with nursery stock (poppies and perennial wallflowers). The initial results appear promising.

Objective 3: Producing Plant Growth Medium Using a Bioreactor

Background:

Research in the preceding Examples has established that:
(a) residual plant structure components in peat provide the polymeric basis for key growing media quality criteria;
(b) food processing wastes contain similar structural components which are generally fully degraded during composting;
(c) controlled cessation of the composting process can create materials in which retained functional components can emulate key physicochemical characteristics of peat-based growing media.

The purpose of the experiments in Objective 3 is to demonstrate that previously recognised physical and chemical parameters are suitable for closely controlling the composting process.

Aims:
to develop a compost bioreactor research facility (CO-BRA);
to use it to confirm that previously recognized physical and chemical parameters are suitable for closely controlling the composting process.

In particular, the experiments aim to:
To run a bioreactor with a range of selected food-processing waste streams, individually and in combination. The bioreactor is fitted with monitoring and controlling systems relevant to the environmental factors identified as being critical for the control of the bio-degradative composting process;
To verify that the key environmental factors can to be sufficiently monitored and controlled and to derive performance parameters;
To ensure that by controlling these performance parameters the final composted product is of the quality standard required by the Horticultural Growers as a peat alternative;
It may be possible to use the obtained performance parameters to develop a mathematical model for determining the engineering specifications necessary for the design of a fall-scale prototype bioreactor.

Task 3.1. Development of a Bioreactor

Aim:
to produce a 1.7 $m^3$ cylindrical vessel bioreactor with environmental monitoring equipment and environmental control equipment to regulate the conditions under which the composting occurs and enable experiments to be performed which assess the impact of key variables.

Subtask 3.1.1 Install Environmental Monitoring Apparatus

A computer-controlled system was sourced and installed. The key parameters of the bioreactor are temperature (at various positions), humidity, gas composition ($O_2$ and $CO_2$) and air supply, additionally electrical conductivity. These are monitored and logged.

Computer software (Orchestrator) and logging and control hardware (Datascan) were obtained from Measurement Systems Limited UK. This allowed the real time logging of multiple data streams (expandable if required), online handling of these data producing control outputs for system control, such as whether heating or cooling was required and to control this automatically, or the addition of water if the composting material was too dry.

Temperature is seen to be a key parameter in this system, both in terms of knowing what the temperature is within the vessel and also the energy balance. Temperature of the ambient air, flow and return temperatures of the water in the heating/cooling system, four points within the vessel and the air exiting the vessel are monitored/logged. The in-vessel temperatures are used by the computer system to produce control inputs for the heating/cooling system for temperature control. FIGS. 67 and 68 depict the data logger output and the user interface.

Gas analysis is seen as being a key measure of the level of activity within the vessel. To this end online monitoring of the relative humidity (Vaisala), oxygen (paramagnetic sensor supplied by SERVOMEX limited) and carbon dioxide (infra red sensor supplied by ADC Ltd.) in the exhaust gas.

Subtask 3.1.2 Install Environmental Control Apparatus

The vessel consisted of a drum, 1.8 m long and 1.08 m in diameter. The drum was been mounted on a system of rollers upon a concrete pad, and its rotation controlled by a geared motor and chain drive (FIG. 69).

The vessel rotates one and one third revolutions before reversing. This reciprocating action together with internal baffles and pipes ensures good mixing.

A system of internally-mounted pipes (21 m of ¾ in stainless steel) allow controlled transfer of heat into or out of the vessel. This heat exchanger has water circulating, which can be heated (6 kw heater) or cooled (6 kw crossflow water/water heat exchanger; FIG. 69). The flow and return temperatures of the water are measured and logged. This together with the flow rate of the water may be used as a measure of the energy demand or production of the vessel and composting process.

Air is forced into the system via sparge pipes within the vessel. The flow rate is measured and logged. This is manually adjusted but could easily be automated.

Water may be added to the vessel through internal spray bars. This may be initiated manually or controlled by the computer if a specific dose is required. The plethora of electrical items such as motors, heater and solenoid valves are controlled by a purpose built control box which is interfaced to the computer through the hardware logger and control unit (FIG. 69).

The vessel is loaded through the open end, this is closed with a bolt on poly carbonate door (reinforced with marine ply wood). The exhaust gasses are ducted away by flexible hose.

Task 3.2—Evaluate and Confirm Key Control Parameters

Aim: To perform a range of experiments to evaluate the role of food processing wastes and environmental conditions on biodegradation of plant structure.

Subtask 3.2.1 Obtain Food Processing Wastes and Co-Products

Food processing waste material was provided by industrial partners, which provided tonne-quantities of cereal co-products and mixed fruit and vegetable waste streams.

Subtask 3.2.2 Set Up Pilot Plant and Evaluate Roles of Environmental Variables and Subtask 3.2.3 Run Windrow Comparisons The COBRA facility has been used to carry out five experimental runs. Windrow comparisons have been set up.

Subtask 3.2.4 Description of Experimental Runs 1-5

Run 1:
A mixture of cereal processing co-products and fruit and vegetable-based green material was loaded into the vessel and a live systems test was carried out—the run was terminated when these were complete.

Run 2:
Same mixture as in run 1 with a total mass of 120 Kg. The composition was chosen to mimic a successful windrow from Objectives 1 and 2, above. This ran for two weeks and provided the material for the growing trials currently underway.

Run 3:
A single waste stream comprising 240 kg of cereal co-products alone.

Run 4:
A non composting run with inert contents which cycled temperatures etc. to provide data on thermal characteristics of the system.

Run 5:
A single waste stream comprising 218.6 Kg vegetable green waste alone.

Windrow
In addition, in parallel to Runs 1&2, a duplicate mix has been produced and digested as a 60 $m^3$ windrow for comparison (FIG. 70).

Subtask 3.2.5 Evaluation of COBRA Run 2 and of the Resulting Growing Media

Given the very short duration of this project, we chose to concentrate efforts on an in-depth investigations into the output from Task 3.2, Run 2.

The material produced in Run 2 was subjected to post-digestion treatments at the IFR and facilitated the production of a potentially high-quality growing-media with a high degree of structure.

3.2.5.1 Microbiology

In the case of the "Run 2" experiment (FIG. 71), the numbers of pseudomonadsI declined throughout the experiment from log 8.9 at day 1 to log 4.65 at day 13 (probably in response to increasing temperature within COBRA). Other mesophilic bacteria also declined in numbers, but less rapidly (from log 9.24 at day 1 to log 7.61 at day 13), and were replaced by populations of thermophilic bacteria, which increased from log 6.07 at day 1 to log 7.43 at day 13. Similar results were shown for Run 3 (results not shown).

3.2.5.2 Microscopy

The growing media had a very high degree of structure as shown in FIG. 72. The retention of plant structure is a fundamental element of the hypothesis that this project is testing.

3.2.5.3 Analysis of Polymeric Structuring Components

Cell wall composition was analysed and showed a high level of retained cell wall polysaccharides. Indeed, the arabinose and xylose levels in the final growing media showed similarity to the original material indicating a high retention of cell wall structure at the polymeric level. Simple phenolics (ferulic acid and coumaric acid) showed a small decrease, as did lignin composition.

3.2.5.4 Analysis of Growing Media Physicochemical Composition (a) Chemical Composition (Horticultural Industry Standard Analysis of Mineral Composition)

The results are shown in Table 20. Interestingly, the protein nitrogen in the growing media was approximately 7% (w/w)—a significant decrease from the original levels of approximately 15%.

TABLE 20

Mineral composition of Run 2 Growing Media

| SAMPLE NAME | pH | COND uS/cm | DENS kg/m3 | NH4-N mg/l | NO3-N mg/l | TON mg/l | Cl mg/l | SO4 mg/l | P mg/l |
|---|---|---|---|---|---|---|---|---|---|
| COBRA2 | 7.93 | 111 | 170 | 1.2 | 192.3 | 193.5 | 154 | 312 | 16.9 |

| SAMPLE NAME | B mg/l | K mg/l | Cu mg/l | Mg mg/l | Mn mg/l | Ca mg/l | Zn mg/l | Na mg/l | Fe mg/l |
|---|---|---|---|---|---|---|---|---|---|
| COBRA2 | 0.09 | 165 | <0.06 | 4.6 | 0.06 | 25.6 | 0.12 | 16 | 0.46 |

(b) Physical and Water-Holding Characteristics

The results are shown in Table 21. Of particular significance is the observation that the COBRA Run 2 growing media has a very high water-holding capacity, but also has a very high air porosity, thereby enabling the growing media to retain water without becoming waterlogged or anaerobic.

TABLE 21

Physical and water-holding characteristics of Run2 growing media.

| Sample | Dry weight (%) | Water potential (MPa) | $a_w$ | Moisture retention at 0.1 bar | pH | Electrical conductivity | Bulk density g/l |
|---|---|---|---|---|---|---|---|
| COBRA2 January 2006 | 31.04 | 0.00 | 1.000 | | 7.8 | 54 mS/m | 217 |

| | Sieve Analysis | | | | | |
|---|---|---|---|---|---|---|
| Sample | 8 | 4 | 2 | 1 | <1 | Air porosity |
| COBRA2 January 2006 | 4 | 15 | 26 | 38 | 17 | 50.1 |

TABLE 22

(c) Solvita maturity test (Industrial standard):

| Test | Score | Interpretation |
|---|---|---|
| $CO_2$ | 7 | Very low level (Scale 1-8, with 8 being lowest level detectable) |
| $NH_3$ | 5 | Very low level (Scale 1-5, with 5 being lowest detected) |
| Maturity index | 7 | Well matured, aged compost, Cured; few limitations for use |

These extraordinary results indicate high suitability as a horticultural growing medium and have resulted in very great interest from the Horticultural partners.

3.2.5.5 Comparison of COBRA Run 2 Growing Media with Other Commercial Growing Media.

The above physical data has been compared with that of other commercially-available growing media which have been analysed in Objectives 1 and 2, above. The results are presented as a dendritic plot (FIG. 73) and demonstrate that Run 2 growing media is similar to other high-quality peat-based growing media and differs considerably from soil and compost-based growing media such as the Bettaland compost, and John limes No. 1.

4.2.5.6 Growing Trials

Two sets of growing trials were carried out on the COBRA Run 2 growing media.

1) Seedling Germination.

Rapid seedling germination trials were carried out at the IFR using coriander seeds. The results are shown in FIG. 74 and demonstrate that un-supplemented (i.e. raw) Run 2 growing media is able to successfully support a very good percentage seedling germination. This compares will with supplemented peat-based potting media, and contrasts with un-supplemented peat in which germination and seedling growth is very poor. It is envisaged that the media will be improved considerably when supplemented and possibly pH adjusted as for normal growing media.

2) Full Plant Growth Trials

These trials involve the professional supplementation of the Run 2 growing media to the same degree and composition as other commercial growing media. The design criteria are as follows (Table 23):

TABLE 23

Composition of trial mixes

| Mix No | % IFR Run 2 Media | % Commercial 12 mm Peat | Details |
|---|---|---|---|
| 1 (control) | 0 | 100 | 1.5 g/l 15-10-20 (NPK) pH 5.5-6.0 |
| 2 | 50 | 50 | 0.8 g/l 15-10-20 - pH range adjusted for the 50% peat, |

TABLE 23-continued

Composition of trial mixes

| Mix No | % IFR Run 2 Media | % Commercial 12 mm Peat | Details |
|---|---|---|---|
| 3 | 75 | 25 | 0.55 g/l 15-10-20 - pH adjusted 25% peat, |
| 4 | 100 | | MAP at 0.1 g/l & KNO3 at 0.2 g/l. |

The result should be on analysis that we have fixed the N & K and that the P is just slightly lower in the mixes 2-4, but similar in each of them. A single colour Pansy plug will be used since this will enable full comparison with earlier studies in Objectives 1 and 2, above.

Summary of Results Obtained in Objective 3

The results obtained in Objective 3, above, demonstrate that the "composting" process may be closely controlled and terminated in order to retain plant structure and produce a potential peat alternative from safe, uniform, traceable and reliable sources of food processing waste.

The project has successfully developed a bioreactor system with monitoring and control systems relevant to the environmental factors identified as being of importance for the control of the bio-degradative composting process. These include: temperature, humidity, pH, $O_2$ consumption, $CO_2$ production.

The project has successfully run the bioreactor 5 times with test materials and a range of selected food-processing waste streams, individually and in combination.

One of the waste stream combinations has been prepared as a growing medium in less than 2 weeks.

Industry-standard physical and chemical analysis, and early seed germination trials indicate that this growing medium has the correct properties to act as a peat replacement.

The project has verified that key environmental factors can be sufficiently monitored and controlled and has derived performance parameters.

It may be possible to use the obtained performance parameters to develop a mathematical model for determining the engineering specifications necessary for the design of a full-scale prototype bioreactor.

A continuous processing bioreactor unit has been designed which has enabled:
i) the design of an optimized control system;
ii) accurate estimation of the net heat in and out in order to maximize energy efficiency and maximize exploitation of the considerable heat produced by the process;
iii) assessment of the peat-replacement quality in relation to the dynamics of the production process and the substrate ratios.

Conclusions from Objective 3

Objective 3 has demonstrated for the first time, that the bioreactor system can be sufficiently controlled to produce a potentially high quality peat alternative from food processing waste streams. It may be possible to use the obtained performance parameters to develop a mathematical model for determining the engineering specifications necessary for the design of a full-scale prototype bioreactor.

A continuous process is preferred to a batch-based system for the following reasons:

no down-time to empty and refill, and get back up to temperature;

exploitation of the vast amount of heat energy produced during the mid stages for (a) accelerating the initial stages of digestion; (b) maintaining a high reaction rate once the thermal output starts to fall; (c) additional processes such as drying of the growing media;

resultant quicker processing (estimated to be less than 1 week to stable product)

The COBRA bioreactor may be adapted for continuous processing in the following ways:

Use of a thermal transfer system sufficient to enable good thermal mass transfer to occur;

Use of an efficient mixing system.

A rotating drum system may be too complicated in relation to developing thermal transfer systems for continuous processing and a shaft-driven scraped-surface heat exchanger in a non-moving, modular-based facility may be preferable (FIG. 75).

Such a bioreactor will enable NPV assumptions to be accurately assessed, particularly concerning volume yield, time of digestion, and waste stream evaluation.

REFERENCES

Bailey, M. J., Beily, P. and Poutanen, K. (1992). Interlaboratory testing of methods for assay of xylanase activity. J. Biotechnol. 23:257-270.

Blakeney, A. B., Harris, P. I., Henry, R. J. and Stone, B. A. (1983). A simple and rapid preparation of alditol acetates for monosaccharide analysis. Carbohydrate Research 113: 291-299.

Bragg, N. C. and Chambers, B. J. (1988). Interpretation and advisory applications of compost air-filled porosity (AFP) measurements. Acta Horticulturae 221:35-44.

Briscoe, B. S., Fernando, M. S. D. & Smith, A. C. (1987). The role of interface friction in the compaction of maize. In: Tribology in Particulate Technology (ed. Briscoe, B. T. & Adams, M. J.), Adam Hilger, Bristol, pp. 220.

Chirife J., Timmermann E. O., Iglesias H. A. and Boquet R. (1992). Some features of the parameter k of the GAB Equation as applied to sorption isotherms of selected food materials, Journal of Food Engineering 15:75-82.

Das, K. and Keener, H. M. (1997). Moisture effect on compaction and permeability in composts. Journal of Environmental Engineering 123:275-281.

Georget, D. M. R., R. Parker and Smith, A. C. (1994). A study of the effects of water content on the compaction behaviour of breakfast cereal flakes. Powder Technology 81:189-195.

Hartley, R. B. and Morrison, W. H. (1991). Monomeric and dimeric phenolic-acids released from cell walls of grasses by sequential extraction with sodium-hydroxide. Journal of the Science of Food and Agriculture 55:365-375.

Heckel, R. W. (1961). An analysis of powder compaction phenomena. Trans. A.I.M.E. 221:1001-1008.

Moates G. K., Noel T. R., Parker R. and Ring S. G. (1997). The effect of chain length and solvent interactions on the dissolution of the B-type crystalline polymorph of amylase in water. Carbohydrate Research 298:327-333.

Ollett, A.-L., Kirby, A. R., Parker, R. and Smith, A. C. (1993). A comparative study of the effects of water content on the compaction behaviour of some food materials. Powder Technology 75:59-65.

Parker, M. L. and Waldron, K. W. (1995). Texture of Chinese water chestnut—involvement of cell-wall phenolics. Journal of the Science of Food and Agriculture 68:337-346.

Paronen, P. and Juslin, M. (1983). Compressional characteristics of four starches, J. Pharm. Pharmacol., 35:627-635.

Pefferkorn, E. (1997). Structure and stability of natural organic matter/soil complexes and related synthetic and mixed analogues, Advances in Colloid & Interface Science 73:127-200.

Theander, O. and Westerlund, E. A. (1986). Studies on dietary fiber. 3. Improved procedures for analysis of dietary fibre. Journal of Agricultural and Food Chemistry 34:330-336.

Van Ginkel, J. T., Raats, P. A. C. and Van Haneghem, I. A. (1999). Bulk density and porosity distributions in a compost pile. Netherlands Journal of Agricultural Science 47:105-121.

Zeytin S and Baran A. (2003). Influences of composted hazelnut husk on some physical properties of soils, Biores Technol 88:241-244.

The invention claimed is:

1. A method for producing a plant growth medium comprising the following steps:
   a) providing an amount of bioorganic matter;
   b) contacting the bioorganic matter with one or more microbial agents capable of degrading the bioorganic matter to produce a decomposition product; and
   c) treating the decomposition product produced in step (b) to inhibit the degradation process prior to its completion, wherein treatment removes microbial nutrient sources, and the one or more microbial agents, and degrading enzymes from the decomposition product, such that the plant growth medium contains an amount of microbial agents, degrading enzymes and microbial nutrient sources that is insufficient to begin or allow further decomposition of the plant growth medium.

2. The method according to claim 1, wherein the bioorganic matter contains a component resistant or substantially resistant to degradation by the one or more microbial agents.

3. The method according to claim 2, wherein the component resistant or substantially resistant to degradation by the one or more microbial agents is selected from the group consisting of plant cell walls, cellulose and chitin.

4. The method according to claim 1, wherein the bioorganic matter comprises plant matter and/or animal matter and/or fungal matter and/or algal matter.

5. The method according to claim 4, wherein the plant matter contains phenolic cross-links, lignified plant matter and semi-lignified plant matter.

6. The method according to claim 5, wherein the lignified plant matter and/or semi-lignified plant matter comprises sheets and/or fibers of lignified plant matter.

7. The method according to claim 4, wherein the plant matter is selected from the group consisting of monocotyledonous plant matter and dicotyledonous plant matter.

8. The method according to claim 7, wherein the monocotyledonous plant matter is selected from the group consisting of straw, straw leaves, cereal leaves, brewer's grain, wheat bran, oat grain and rice bran.

9. The method according to claim 7, wherein the dicotyledonous plant matter is selected from the group consisting of lignified plant matter, vascular bundles, fibrous bundles, plant matter with little or no phenolic cross-links, plant matter with little or no lignin and non-lignified dicotyledonous plant tissue.

10. The method according to claim 7, wherein the dicotyledonous plant matter comprises hemp and/or nettle and/or vegetable matter and/or fruit matter.

11. The method according to claim 10, wherein the vegetable matter comprises *brassica* leaves and/or leek and/or onion and/or potato.

12. The method according to claim 1, wherein the bioorganic matter is selected from the group consisting of Brewers' grain, straw, leaf matter and fruit matter.

13. The method according to claim 1, wherein the bioorganic matter comprises:
   i) a ratio of between 2.4 to 8 parts Brewers' grain:1 part straw; or
   ii) a ratio of between 4 to 5 parts Brewers' grain:1 part leaf matter: between 1.8 to 3 parts straw.

14. The method according to claim 13, wherein the bioorganic matter comprises:
   i) a ratio of 4 parts Brewers' grain:1 part leaf matter:1.8 parts straw; or
   ii) a ratio of 5 parts Brewers' grain:1 part leaf matter:3 parts straw; or
   iii) a ratio of 2.4 parts Brewers' grain:1 part straw; or
   iv) a ratio of 8 parts Brewers' grain:1 part straw; or
   v) a ratio of 4 parts Brewers' grain:1 part fruit matter:1.5 parts straw; or
   vi) a ratio of 10 parts Brewers' grain:1 part fruit matter:4 parts straw.

15. The method according to claim 1, wherein the bioorganic matter further comprises a nutrient source for one or more microbial agents.

16. The method according to claim 15, wherein the nutrient source comprises starch and/or protein.

17. The method according to claim 1, wherein the bioorganic matter provided in step (a) comprises one or more microbial agents capable of degrading the bioorganic matter.

18. The method according to claim 1, wherein step (b) comprises adding one or more microbial agents capable of degrading the bioorganic matter to the bioorganic matter provided in step (a).

19. The method according to claim 17, wherein the one or more microbial agents is selected from the group consisting of pseudomonas species, aerobic thermophilic bacteria, aerobic mesophilic bacteria, microaerophilic bacteria, strict anaerobic bacteria, yeasts and moulds.

20. The method according to claim 1, wherein the amount of bioorganic matter provided in step (a) is at least an amount selected from the group consisting of: 10 kg, 20 kg, 30 kg, 40 kg, 50 kg, 60 kg, 70 kg, 80 kg, 90 kg, 100 kg, 150 kg, 200 kg, 250 kg, 300 kg, 400 kg, 500 kg, 10 tonnes, 20 tonnes, 50 tonnes, 100 tonnes, 200 tonnes, 300 tonnes, 500 tonnes, 1,000 tonnes, 2,000 tonnes, 5,000 tonnes, 10,000 tonnes, 20,000 tonnes, 50,000 tonnes, 100,000 tonnes, 200,000 tonnes, and 500,000 tonnes.

21. The method according to claim 1, wherein step (b) is performed in a windrow.

22. The method according to claim 1, wherein step (b) is performed in a controlled environment.

23. The method according to claim 22, wherein the controlled environment consist of controlling one or more environmental conditions selected from the group consisting of: temperature; moisture content; $CO_2$ to $O_2$ ratio; pressure; shear; and mixing.

24. The method according to claim 22, wherein the controlled environment comprises maintaining the bioorganic matter at a controlled temperature of between 25° C. and 60° C.

25. The method according to claim 22, wherein the controlled environment comprises subjecting the bioorganic matter to controlled mixing.

26. The method according to claim 22, wherein the controlled environment comprises maintaining the bioorganic matter at a controlled moisture content of between 5% w/v and 100%.

27. The method according to claim 22, wherein the controlled environment comprises maintaining the bioorganic matter at a controlled level of $CO_2$ and $O_2$, wherein the controlled level of $CO_2$ is selected from the group consisting of: 10% v/v (volume/volume) or less, 9% v/v or less, 8% v/v or less, 7% v/v or less, 6% v/v or less, 5% v/v or less, 4% v/v or less, 3% v/v or less, 2% v/v or less, 1% v/v or less, and 0% v/v, and the controlled level of $O_2$ is selected from the group consisting of: at least 15% v/v (volume/volume), at least 20% v/v, at least 30% v/v, at least 40% v/v, at least 50% v/v, at least 60% v/v, at least 70% v/v, at least 80% v/v, at least 90% v/v, and 100% v/v.

28. The method according to claims 22, wherein the controlled environment is within a bioreactor.

29. The method according to claim 1, wherein the bioorganic matter is contacted with one or more microbial agents capable of degrading the bioorganic matter for a period selected from the group consisting of: at least two days, at least three days, at least four days, at least five days, at least six days, at least seven days, at least eight days, at least nine days, and at least ten days prior to step (c).

30. The method according to claim 1 further comprising the step (b') of analyzing a sample of the decomposition product produced in step (b) to determine the level of decomposition, wherein step (b') is performed during or after step (b) but before step (c).

31. The method according to claim 30, wherein step (b') comprises the sub-steps of:
b'-1) providing a sample of the decomposition product;
b'-2) homogenizing the sample in water; and
b'-3) detecting the level of microbial nutrients present.

32. The method according to claim 31, wherein the microbial nutrients comprise or consist of insoluble starch and/or protein and/or lipid and/or cell-wall structuring material.

33. The method according to claim 32, wherein step (c) comprises the sub-steps of:
(c-1) inhibiting the activity of the one or more microbial agents and/or degrading enzymes thereof in the decomposition product; and
(c-2) homogenizing the decomposition product in water.

34. The method according to claim 33, wherein step (c-1) comprises of sterilizing the decomposition product.

35. The method according to claim 33, wherein step (c-1) comprises of heating the decomposition product to a temperature above the temperature in step (b) or cooling the decomposition product to a temperature below the temperature used in step (b).

36. The method according to claim 33, wherein step (c-1) comprises the step of altering the pH of the decomposition product to a pH selected from the group consisting of: at most pH4, at most pH3, at most pH2, at most pH1, at least pH10, at least pH11, at least pH12, at least pH13, and at least pH14.

37. The method according to claim 33, wherein step (c-1) is performed prior to, or after, step (c-2).

38. The method according to claim 33, wherein steps (c-1) and (c-2) are performed simultaneously.

39. The method according to claim 33, wherein step (c-2) is performed using a homogenizer.

40. The method according to claim 39, wherein the homogenizer is an industrial food-processing homogenizer.

41. The method according to claim 33, wherein step (c) further comprises sub-step (c-3) of treating the decomposition product to reduce the conductivity of the decomposition product.

42. The method according to claim 41, wherein conductivity is reduced by reducing the concentration and/or amount of salts in the decomposition product.

43. The method according to claim 41, wherein step (c-3) is performed by homogenizing the decomposition product in water.

44. The method according to claim 33, wherein step (c) further comprises sub-step (c-4) of removing moisture from the decomposition product.

45. The method according to claim 44, wherein step (c-4) is performed using a pressing system.

46. The method according to claim 33, wherein step (c) further comprises sub-step (c-5) of adding slow-release fertilizer to the decomposition product.

47. The method according to claim 33, wherein steps (c-1) to (c-5) are performed sequentially.

48. The method according to claim 33, wherein steps (c-1) and/or (c-2) and/or (c-3) are performed simultaneously.

49. The method according to claim 33, wherein steps (c-4) and (c-5) are performed simultaneously.

50. The method according to claim 1, wherein the plant growth medium exhibits one or more of the following properties:
i) no detectable decomposition or minimal detectable decomposition;
ii) a moisture retention at 0.1 bar selected from the group consisting of: at least 55% at least 60%, at least 70%, at least 80%, and at least 90%;
iii) a water potential selected from the group consisting of: at least −2.08 MPa, at least −1.50 MPa, at least −1.00 MPa, at least −0.50 MPa, and at least −0.25 MPa;
iv) a pH selected from the group consisting of: pH6.5 or less, pH6 or less, pH5 or less, pH4 or less, pH3 or less, pH2 or less, and pH1 or less;
v) an electrical conductivity selected from the group consisting of: 422 mS/m or less, 400 mS/m or less, 300 mS/m or less, 200 mS/m or less, 100 mS/m or less, 50 mS/m or less, and 10 mS/m or less;
vi) a bulk density value selected from the group consisting of: at least 200 g/L, at least 295 g/L, at least 300 g/L, at least 400 g/L, at least 500 g/L, and at least 600 g/L;
vii) a lignin content selected from the group consisting of: at least 40%, at least 50%, at least 60%, at least 70%, at least 80%, and at least 90%;
viii) an air-filled porosity value selected from the group consisting of: at most 40%, at most 30%, at most 27.9%, at most 25%, at most 20%, at most 10%, and at most 5%.

51. The method according to claim 50, wherein the plant growth medium exhibits the following properties:
i) no detectable decomposition;
ii) a moisture retention of 74.5% at 0.1 bar;
iii) a water potential of −0.30 MPa;
iv) pH 4.43;
v) an electrical conductivity of 67 mS/m;
vi) a bulk density value of 598 g/L;
vii) a lignin content of 40%;
viii) an air-filled porosity value of 11.6%.

52. The method according to claim 50, wherein the plant growth medium exhibits the following properties:
i) no detectable decomposition;
ii) a moisture retention of 55.4% at 0.1 bar;
iii) a water potential of −2.08 MPa;
iv) pH 5.87;
v) an electrical conductivity of 422 mS/m;
vi) a bulk density value of 44 µg/L;
vii) a lignin content of 43%;
viii) an air-filled porosity value of 24.2%.

53. The method according to claim 1, wherein the plant growth medium is a peat-substitute material.

54. A plant growth medium obtained by the method of claim 5.

55. A peat-substitute material comprising a plant growth medium according to claim 54.

56. A fuel comprising the peat-substitute material as defined in claim 55.

57. The fuel of claim 56, wherein the fuel is a biofuel in liquid form.

* * * * *